US011144854B1

(12) United States Patent
Mouawad

(10) Patent No.: US 11,144,854 B1
(45) Date of Patent: Oct. 12, 2021

(54) DIGITAL PINBOARD SYSTEM

(71) Applicant: Taskworld Holdings Pte. Ltd., Tradehub (SG)

(72) Inventor: Fred Mouawad, Bangkok (TH)

(73) Assignee: Taskworld Holdings Pte. Ltd., Singapore (SG)

( * ) Notice: Subject to any disclaimer, the term of this patent is extended or adjusted under 35 U.S.C. 154(b) by 57 days.

(21) Appl. No.: 15/947,745

(22) Filed: Apr. 6, 2018

Related U.S. Application Data

(63) Continuation-in-part of application No. 14/029,748, filed on Sep. 17, 2013, now abandoned.

(60) Provisional application No. 61/702,684, filed on Sep. 18, 2012, provisional application No. 61/848,163, filed on Dec. 26, 2012, provisional application No. 61/778,081, filed on Mar. 12, 2013.

(51) Int. Cl.
*G06Q 10/06* (2012.01)
*G06Q 10/10* (2012.01)

(52) U.S. Cl.
CPC . *G06Q 10/063114* (2013.01); *G06Q 10/0639* (2013.01); *G06Q 10/063112* (2013.01); *G06Q 10/105* (2013.01)

(58) Field of Classification Search
CPC ....... G06Q 10/063114; G06Q 10/0639; G06Q 10/063112; G06Q 10/105
See application file for complete search history.

(56) References Cited

U.S. PATENT DOCUMENTS

| 8,744,885 | B2 | 6/2014 | Johnson | |
|---|---|---|---|---|
| 2002/0194112 | A1* | 12/2002 | dePinto | G06Q 10/063112 705/37 |
| 2003/0182168 | A1* | 9/2003 | Lyons | G06Q 10/063 705/7.11 |
| 2003/0206203 | A1* | 11/2003 | Ly | G06Q 10/10 715/853 |
| 2005/0022198 | A1* | 1/2005 | Olapurath | G06Q 10/10 718/102 |
| 2005/0160084 | A1* | 7/2005 | Barrett | G06Q 10/06 |
| 2006/0069605 | A1 | 3/2006 | Hatoun | |
| 2006/0167736 | A1 | 7/2006 | Weiss | |
| 2006/0167737 | A1* | 7/2006 | Muller | G06Q 10/06311 705/7.13 |
| 2007/0282658 | A1 | 12/2007 | Brintle | |
| 2008/0065460 | A1 | 3/2008 | Raynor | |
| 2008/0172625 | A1* | 7/2008 | Montgomery | G06Q 10/06 715/764 |

(Continued)

OTHER PUBLICATIONS

Adam Engst. "Trello Offers Compelling Collaboration Tool" Jul. 9, 2012. https://tidbits.com/2012/07/09/trello-offers-compelling-collaboration-tool/ (Year: 2012).*

(Continued)

*Primary Examiner* — Robert D Rines
*Assistant Examiner* — Alissa D Karmis
(74) *Attorney, Agent, or Firm* — Kang S. Lim

(57) ABSTRACT

Systems and methods are provided for project and task management. A user interface may be provided, which may display an individual's identifier along with one or more performance indicators. The performance indicators may include information based on the evaluation of the individual's past performance.

12 Claims, 60 Drawing Sheets

(56) References Cited

U.S. PATENT DOCUMENTS

| | | | |
|---|---|---|---|
| 2008/0209417 A1* | 8/2008 | Jakobson | G06F 9/4856 |
| | | | 718/100 |
| 2009/0055737 A1* | 2/2009 | Borchardt | G06F 17/241 |
| | | | 715/708 |
| 2009/0199445 A1* | 8/2009 | Blaeser | G09F 7/04 |
| | | | 40/600 |
| 2010/0076803 A1 | 3/2010 | Deo et al. | |
| 2010/0162151 A1* | 6/2010 | Class | G06F 3/0483 |
| | | | 715/765 |
| 2010/0318470 A1* | 12/2010 | Meinel | G06Q 10/00 |
| | | | 705/300 |
| 2011/0072382 A1* | 3/2011 | Caldwell | G05B 23/0216 |
| | | | 715/772 |
| 2011/0184771 A1 | 7/2011 | Wells | |
| 2011/0288900 A1 | 11/2011 | McQueen et al. | |
| 2012/0042003 A1 | 2/2012 | Goetz et al. | |
| 2012/0130907 A1 | 5/2012 | Thompson et al. | |
| 2012/0309363 A1* | 12/2012 | Gruber | G06Q 10/06316 |
| | | | 455/414.1 |
| 2013/0024231 A1* | 1/2013 | Gordon | G06Q 10/06 |
| | | | 705/7.17 |
| 2014/0012616 A1 | 1/2014 | Moshenek | |
| 2014/0040767 A1* | 2/2014 | Bolia | G06F 3/1454 |
| | | | 715/751 |
| 2014/0095237 A1* | 4/2014 | Ehrler | G06Q 10/105 |
| | | | 705/7.15 |

OTHER PUBLICATIONS

Bobby Grace. "Card filter updates, cards page sorting, checklist copy, and more." Nov. 15, 2012. https://blog.trello.com/card-filter-updates-cards-page-sorting-checklist-copy-and-more (Year: 2012).*
Co-pending U.S. Appl. No. 14/029,748, filed Sep. 17, 2013.
Office action dated Dec. 30, 2016 for U.S. Appl. No. 14/029,748.
Office action dated Mar. 25, 2016 for U.S. Appl. No. 14/029,748.
Office Action dated Sep. 20, 2017 for U.S. Appl. No. 14/029,748.
U.S. Appl. No. 14/029,748 Office Action dated Apr. 4, 2018.

* cited by examiner

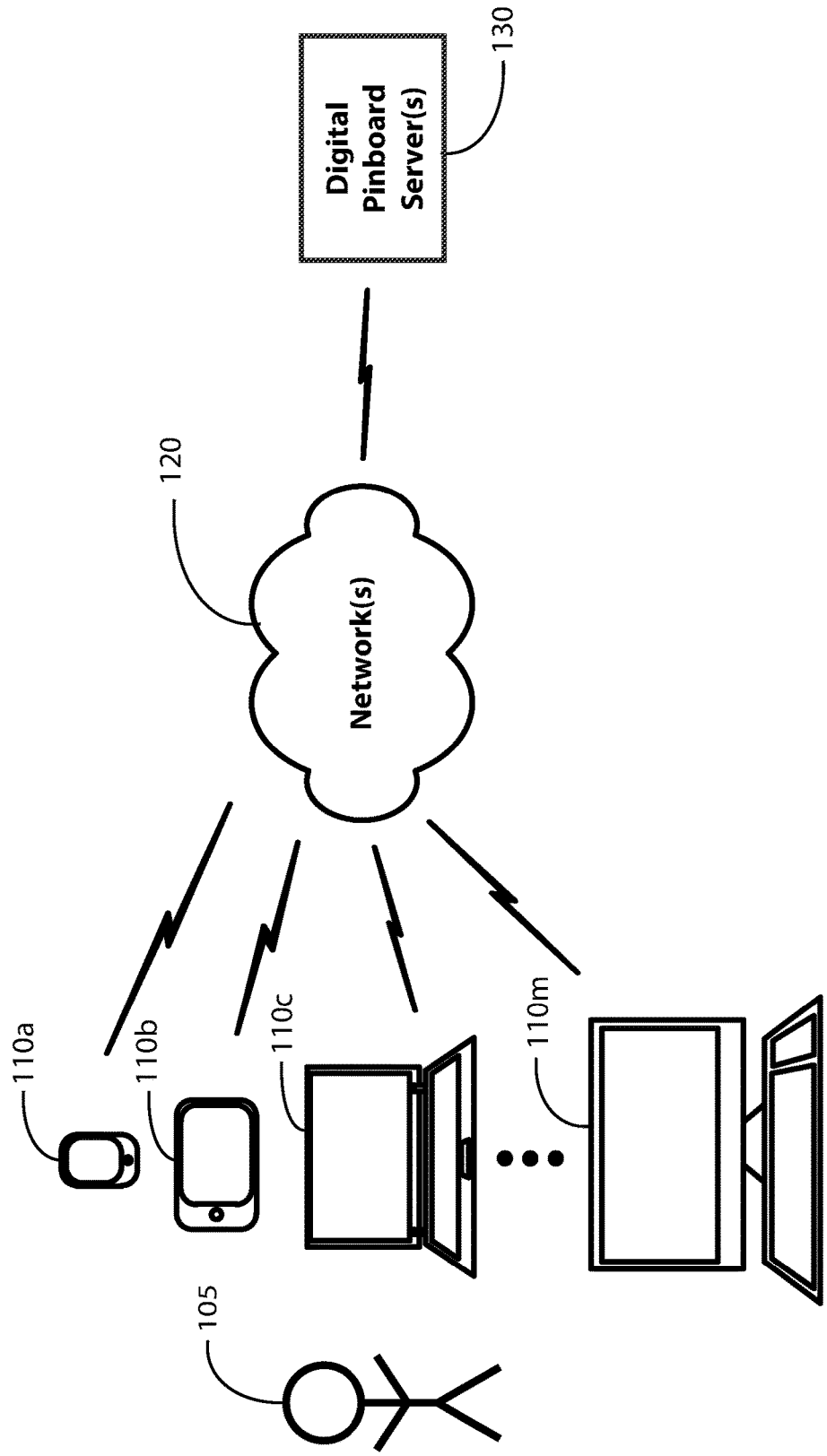

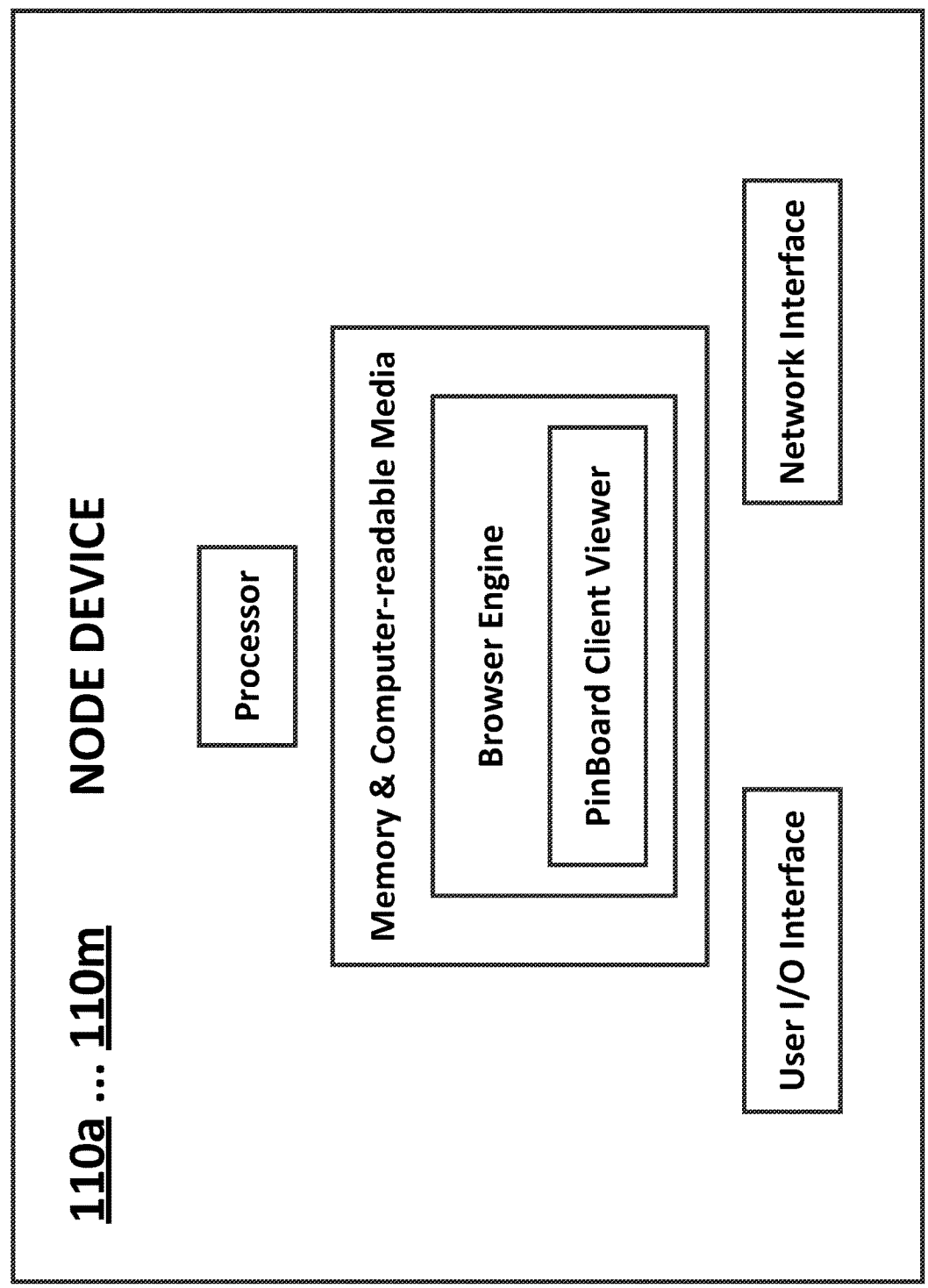

FIG. 2

DIGITAL PINBOARD SERVER  130

TASK MANAGEMENT MODULE  200
- Task Creation & Assignment Manager
- Task Feeder
- Reports Manager
  - Pinboard Viewer
  - Viewer Filter
  - Metrics Viewer
- Calendar Manager
- Notification/Alert/Reminder Generator

PERFORMANCE EVALUATION MODULE  210
- Individual/Team Performance Manager
- Achievement Rating Manager
- Satisfaction Score Manager

ORGANIZATIONAL NETWORK MANAGEMENT MODULE  240
- Organizational Structure Manager
- Dept/Team/Individual Profile Database
- Settings & Permission Manager

LIVE CHAT MODULE  250

MESSAGE MODULE  260

PROJECT MODULE  270
- Documents Manager
- Dashboard Manager

Top 5 Achievement Rating
| Rank | Colleague | | Achievement Rating | No. of Task |
|---|---|---|---|---|
| 1. |  | Teerawat Khomsonton | 100 | 12 |
| 2. |  | Benjawan Prayoung | 90 | 7 |
| 3. |  | Pisut Sritrakulchai | 76 | 3 |
| 4. |  | Mike Duke | 75 | 6 |
| 5. |  | Napaporn Utistham | 69 | 2 |
FIG. 18

Top 5 Satisfaction Score
| Rank | Colleague | | Average Satisfaction Score | No. of Task |
|---|---|---|---|---|
| 1. |  | Teerawat Khomsonton | 4.5 | 12 |
| 2. |  | Benjawan Prayoung | 4.3 | 7 |
| 3. |  | Pisut Sritrakukchai | 3.9 | 3 |
| 4. |  | Mike Duke | 3.6 | 6 |
| 5. |  | Napaporn Utistham | 3.5 | 2 |
FIG. 19

FIG. 22

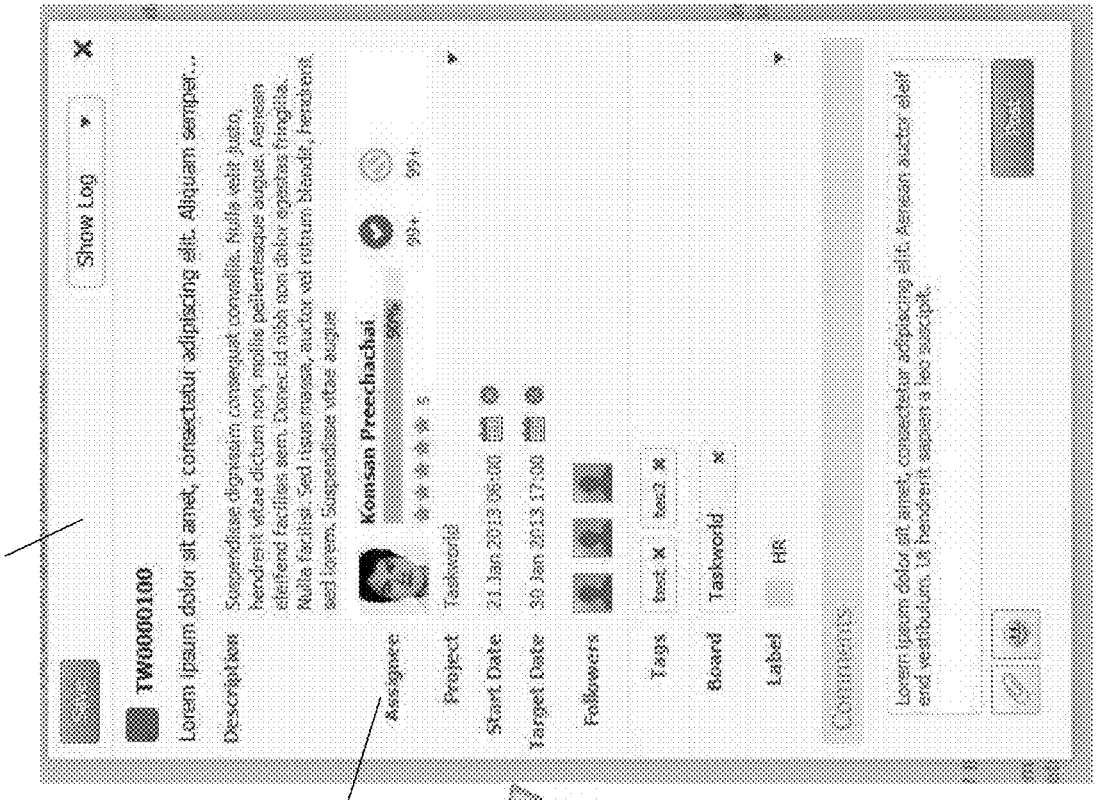
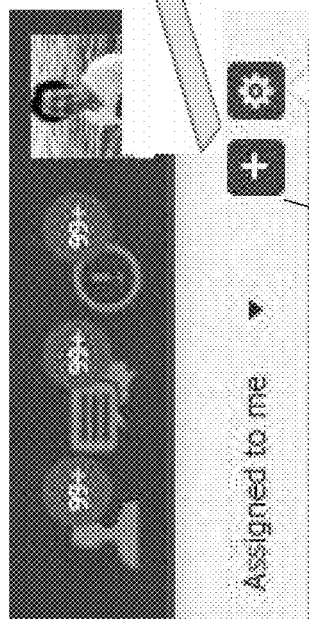
FIG. 41

DIGITAL PINBOARD SYSTEM

CROSS-REFERENCE

This application is a Continuation-in-Part Applications of U.S. application Ser. No. 14/029,748, filed Sep. 17, 2013, which claims the benefit of U.S. Provisional Application No. 61/702,684, filed Sep. 18, 2012, U.S. Provisional Application No. 61/848,163, filed Dec. 26, 2012, and U.S. Provisional Application No. 61/778,081, filed Mar. 12, 2013, each of which is incorporated herein by reference in its entirety.

BACKGROUND OF THE INVENTION

Currently, projects have become increasingly large, and the management of employees in order to handle the various tasks has become more complex. Task navigators have been created to assist with the management of project tasks. However, such task navigators do not assess member performance in order to provide improved task management for future projects or tasks (i.e. assigning the right task to the right person based on previous performance).

A need exists for systems and methods to manage tasks and projects in more efficient ways. A further need exists to evaluate and assess performances of members to make improved resource allocation decisions.

SUMMARY OF THE INVENTION

The invention provides systems and methods for managing employees and tasks using a digital pinboard. Various aspects of the invention described herein may be applied to any of the particular applications set forth below. The invention may be applied as a project management system or as a component of an integrated employee assignment and/or evaluation system. The invention can be optionally integrated into existing task management or employee evaluation systems. It shall be understood that different aspects of the invention can be appreciated individually, collectively or in combination with each other.

An aspect of the invention is directed to improved systems and methods for managing tasks and projects in efficient ways that utilize feedback. By evaluating and assessing performances of each member, improved resource allocation decisions may be made, so that a member that is suited for a particular task is assigned that task based on previous performance. The systems and methods herein may provide reminders and summaries to participants involved, freeing valuable time and manual follow-up.

An aspect of the invention is directed to a user interface that can display an identifier for an individual along with one or more performance indicators based on an evaluation of tasks completed by the individual. The performance indicators can be visual icons or symbols with numerical values indicative of various performance parameters. The performance indicators can be displayed with a user's name in a user interface that is used to assign tasks, or display a team list.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 shows an example of a digital pinboard network, in accordance with an embodiment of the invention.

FIG. 2 provides an illustration of a digital pinboard system in accordance with an embodiment of the invention.

FIG. 18 shows an example of a top achievement rating table, in accordance with an embodiment of the invention.

FIG. 19 shows an example of a top satisfaction score table, in accordance with an embodiment of the invention.

FIG. 22 provides an example of a task reminder, in accordance with an embodiment of the invention.

FIG. 41 shows an example of an interface to create a new task for a pinboard, in accordance with an embodiment of the invention.

DETAILED DESCRIPTION OF THE INVENTION

Figure 3A:
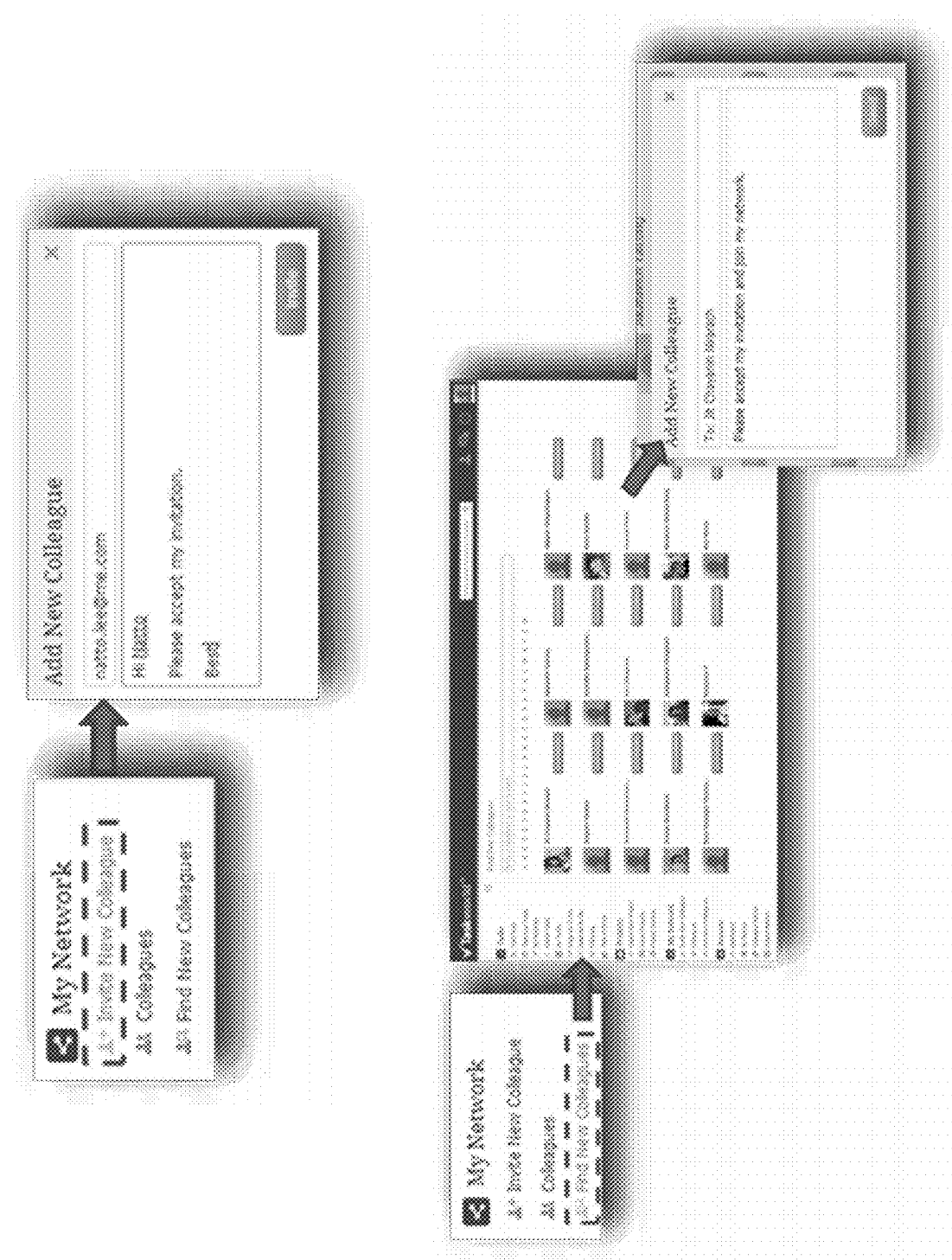
FIGS. 3A-C show examples of user interfaces for inviting and managing colleagues, in accordance with an embodiment of the invention.

In the following detailed description, numerous specific details are set forth in order to provide a thorough understanding of the invention. However it will be understood by those of ordinary skill in the art that the invention may be practiced without these specific details. In other instances, well-known methods, procedures, components and circuits have not been described in detail so as not to obscure the invention. Various modifications to the described embodiments will be apparent to those with skill in the art, and the general principles defined herein may be applied to other embodiments. The invention is not intended to be limited to the particular embodiments shown and described.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIG. 1 shows an example of a digital pinboard network 120 provided in accordance with an embodiment of the invention. An entity or individual may have one or more projects to be completed. The projects may be broken into one or more tasks or subtasks. For example, a project may comprise multiple tasks, each of the tasks may comprise multiple subtasks, and so on. One or more individuals or groups may perform the tasks or subtasks. The individual or groups may be assigned the tasks or subtasks. The individual or group may be evaluated on the performance of the tasks or subtasks. Visual performance indicators of the individual or group's past performance may be displayed.

In some embodiments, the digital pinboard network may include a plurality of devices 110a, 110b, 110c. The plurality of devices may be digital pinboard devices that allow one or more users to manage tasks and projects via a digital pinboard interface. A digital pinboard may be a virtual board upon which users may arrange any task freely. The tasks may be displayed on one or more 'note'. In some instances, a task note may have an aesthetic reminiscent of a sticky note. A user may be able to place a task note anywhere on the virtual board. The user may be able to place a task note without conforming the task note to predetermined locations or sizes. The user may be able to place the task note without regard to any pre-existing grids or markers on the board. The task notes may be freely arranged without having to conform to pre-existing columns or rows. The task notes may be placed anywhere on the board without being confined to a particular section of the board, regardless of the content of the task note. The digital pinboard may also provide real-time information, such as task and project status or performance of users involved in a task or project, to facilitate tasks management. Such real-time information may be an aggregation of information provided by the plurality of digital pinboard devices in the digital pinboard network.

In some embodiments, a user 105 may interact with a device. The devices may communicate over a network 120 with one or more servers 130. Any depiction of a single server may apply to multiple servers and/or databases. The servers and/or databases may be separate devices or may be integrated into a single device. In some instances a user 105 of the system may interact with the system over a network 120.

The user 105 may be an individual managing projects or tasks. The user may be able to view task/subtask progress or assign tasks/subtasks to assignees. The user may be capable of providing performance evaluation for one or more individual. The user may review performance evaluations. In some instances, the user may receive an assignment for projects/tasks/subtasks. The user may enter the user's progress into the system. The user may or may not view the user's performance evaluation. In another example, a user may be an administrator who may be managing the project management system.

One or more devices 110a, 110b, 110c may be provided within the system. A device may have a display. The display may permit a visual display of information. The display may include a display of a browser and/or application. A viewable area of a canvas on the display may be a viewport. The display may be provided on a screen, such as an LCD screen, LED screen, OLED screen, CRT screen, plasma screen, touchscreen, e-ink screen or any other type of display device. The devices may also include displays of audio information. The display may show a user interface. A user 105 of the system may interact with the device through a user interface. A user may interact via a user interactive device which may include but is not limited to a keypad, touchscreen, keyboard, mouse, trackball, touchpad, joystick, microphone, camera, motion sensor, IR sensor, heat sensor, electrical sensor, or any other user interactive device.

Examples of devices 110a, 110b, 110c may include but are not limited to a personal computer, server computer, laptop, tablet, satellite phone, smartphone (e.g., iPhone, Android, Blackberry, Palm, Symbian, Windows), cellular phone, personal digital assistant, Bluetooth device, pager, land-line phone, or any other network device. In some embodiments, the device may be a mobile device. A mobile device may be easily transportable (e.g., tablet, smartphone). In some instances, the mobile device may be a handheld device. The device may be capable of communicating with a network. In some instances, the device may be capable of communicating with the network wirelessly and/or over a wired connection. The device may have a programmable processor and/or a memory. The memory may be capable of storing tangible computer readable media which may comprise code, instructions, and/or logics for one or more steps described herein. The programmable processor may be capable of performing one or more steps described herein in accordance with the tangible computer readable media.

A user may be exposed to content, search as project management interfaces via a device. The user may or may not interact through the device. The content may be visual content. Visual content may be static and/or dynamic. The user may interact with the content via the device. In one example, the device may display or provide audio. Content may be visibly displayed on a browser on the user's device. The user may also respond to information via the device.

In some embodiments, a plurality of devices may be provided in a system. For example, two or more, 10 or more, 100 or more, 1,000 or more, 10,000 or more, 50,000 or more, 100,000 or more, 500,000 or more, 1,000,000 or more, 5,000,000 or more, 10,000,000 or more, 50,000,000 or more, 100,000,000 or more, or 1,000,000,000 or more devices may be provided. In some embodiments, a pre-selected group of devices may be provided. Devices may be accessing a software or application on the server 130. Devices may be displaying a browser with content provided through the server.

The digital pinboard network 120 may be a local area network (LAN) or wide area network (WAN) such as the Internet. The network may be a personal area network, a telecommunications network such as a telephone network, cell phone network, mobile network, a wireless network, a data-providing network, or any other type of network. The communications may utilize wireless technology, such as Bluetooth or RTM technology. Alternatively, various communication methods may be utilized, such as a dial-up wired connection with a modem, a direct link such as TI, ISDN, or cable line. In some embodiments, a wireless connection may be using exemplary wireless networks such as cellular, satellite, or pager networks, GPRS, or a local data transport system such as Ethernet or token ring over a LAN. In some embodiments, the system may communicate wirelessly using infrared communication components.

One, two or more servers 130 may be provided in accordance with an embodiment of the invention. A server may include a memory and/or a processor. The server may or may not be at a location that is remote to the devices. The server may communicate with the devices over a network. In some instances, a cloud computing infrastructure may be provided. Any functions described herein may be carried out using a cloud computing infrastructure, such as distributed processing and memory functions. In alternate embodiments, peer to peer architectures may be utilized by the system.

The server may store data relating to a website or application to be displayed on a browser on a user's device. The server may store data or access data relating to a search and search results. The server may store information such as training data relating to categorizing search results. The server may include information such as domain information, keywords, and/or categories. A server may provide content to the devices via the network. In some instances, two-way communication may be provided between the devices and the server.

Project and task information may be displayed on a user interface of a device. Member assignments to the various projects and tasks may be displayed. Information on progress and performance evaluation may also be displayed.

Any descriptions of the user interfaces provided herein may include user interfaces displayed on a device, such as those described herein. The devices may be part of the system.

FIG. 2 provides an illustration of an exemplary digital pinboard system in accordance with an embodiment of the invention. In some embodiments, the digital pinboard system may comprise a task assignment unit 200 and a performance evaluation unit 210.

Task assignment unit 200 may be configured to perform project management and/or task assignment. Task assignment may include breaking up a project into one or more tasks and/or subtasks. Any description herein of tasks may also apply to subtasks, or any level of breakdown of the project. One or more individuals or teams may be assigned to the tasks. Some tasks may have a single individual assigned to the task. Alternatively, multiple individuals or teams may be assigned to a task. A team may have one or more, or two or more members. A task assigned to an assignee may be reassigned or subassigned. When a task is reassigned, the task is transferred from the assignee to someone else. The task may be reassigned by the assignee to someone else. Alternatively the task may be reassigned by a requestor or team leader. Tasks received can be reassigned to another colleague. When a task is subassigned to someone else, the current assignee remains the assignor of the task. An assignor of a task has the option to block or allow reassignment and/or subassignment of the task. In some embodiments, a requestor of a task may or may not be the same as the assignor of the task.

In some embodiments, a task may be divided into multiple subtasks, each of which may be assigned to the same or different assignees, target dates, performance indicators and the like. In various embodiments, a task may have an arbitrary level of subtasks associated with it. In general, the discussion about tasks generally applies to subtasks.

Performance evaluation unit 210 may be configured to evaluate performance. The performance evaluation unit may be a component of the task assignment unit. Alternatively, the performance evaluation unit may be a separate component in communication with the task assignment unit. A member may perform an assigned task 220. For example, one or more individuals or teams may perform the task(s) to which they were assigned. The individuals or teams may be evaluated based on the specific task(s) that they performed. For example, for each task, the one or more individuals involved may be evaluated on their performance of the task. Performance of the task may include whether the one or more individuals completed the task on time, and the satisfaction with their performance of the task. Other factors, such as efficiency, may be considered. Alternatively, they may be evaluated on an overall level.

The performance evaluation unit 210 may be a form of feedback that may assist with future task assignments 230. For example, if an individual is particularly good at performing a type of task, that individual may be assigned similar types of tasks in future projects. This may assist a project manager with finding the appropriate individual or individuals or a particular task. In another example, if it is determined that an individual needs to develop certain skills further in order to increase their potential or productivity, they may be given such tasks that will develop those skills. If an in individual is good about getting projects in on time, the project manager may use the individual for time-sensitive tasks. Thus, based on the evaluation/feedback, the individual may be assigned future tasks, which are also evaluated and used to determine future tasks. Any number of cycles of task assignment and evaluation may occur, and build off of one another.

When assigning an individual to a task the project manager may be able to view information about the individual's previous performance. In some instances, the same user interface that is used to assign the tasks may also display information about the individual's previous performance. One or more performance indicators may be displayed adjacent to the individual's name. For example, a list of potential individuals to whom a task may be assigned, or who may be added to a team or project may be shown with one or more past performance indicators.

In some instances, performance evaluation may occur at any time after a task is completed. For example, once a task is indicated as having been completed, an option to evaluate the performance may be made available. An evaluation may occur within a window of time after the task is completed. In some instances, the length of the window of time may be predetermined.

In some examples, only a project manager, requestor or assignor of a task may perform the evaluation. In some instances, any individual that manages or supervises the individual who performed the task may perform the evaluation. In some instances, an option may be provided for an individual to perform a self-evaluation.

In some instances, a memory or records database may be provided which may keep track of the performance of various individuals on past tasks. The records may be sorted by requestor, assignee, task, project, or types of tasks. For example, memory may include an assignee's identifier information along with evaluation of tasks performed by the assignee. Such records may be reviewed in order to choose individual(s) to assign tasks. Such records may also assist with determining an individual's overall performance or performance trajectory. Such records may assist with the formulation of performance indicators displayed for the individual. Such records may be correlated with time at which the task was performed or the evaluation occurred. Such records of time may assist with creating a performance trajectory for an individual.

A user interface may be provided for a user to register for an account with the project management system described herein. The user may go to a registration website and sign up for an account by providing an email address. An account verification email may be sent to the user's email address. The user may confirm registration by clicking on a link contained in the verification email. As part of the registration process user be required to provide basic information such as username, password, location information and the like. In some embodiments, some of the functionalities of the system may be available only to registered users. In one embodiment, the users may access all functionalities of the systems without registration.

A user interface may be provided for a registered user to log in to the project management system described herein. The user may log in using username, password, and/or other credentials. The user may have the option to save the login credentials for later access. In addition, the user may be able to retrieve or reset lost password via the user interface.

According to an aspect of the present invention, a user of the project management system may invite other individuals to join the project management system and/or join the user's personal network. After the invitees accept the invitation and joins the user's network, the user can then assign tasks to and/or share projects with the invitees.

Figure 3B:
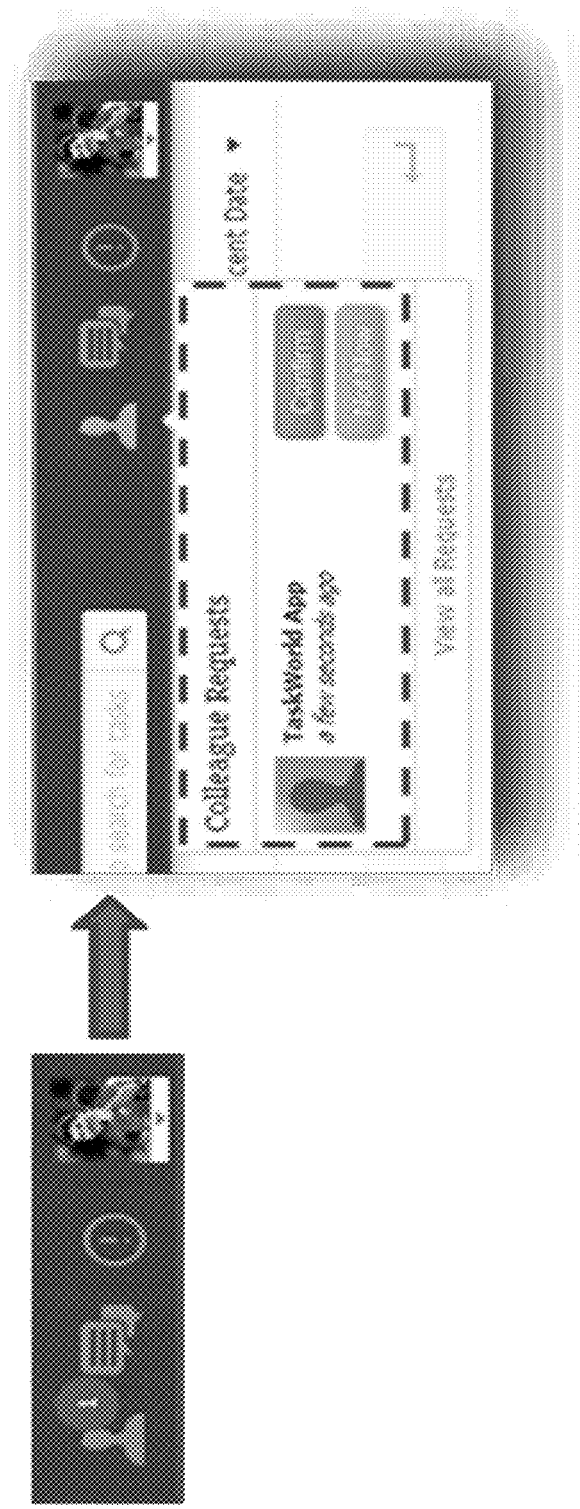
Figure 3C:
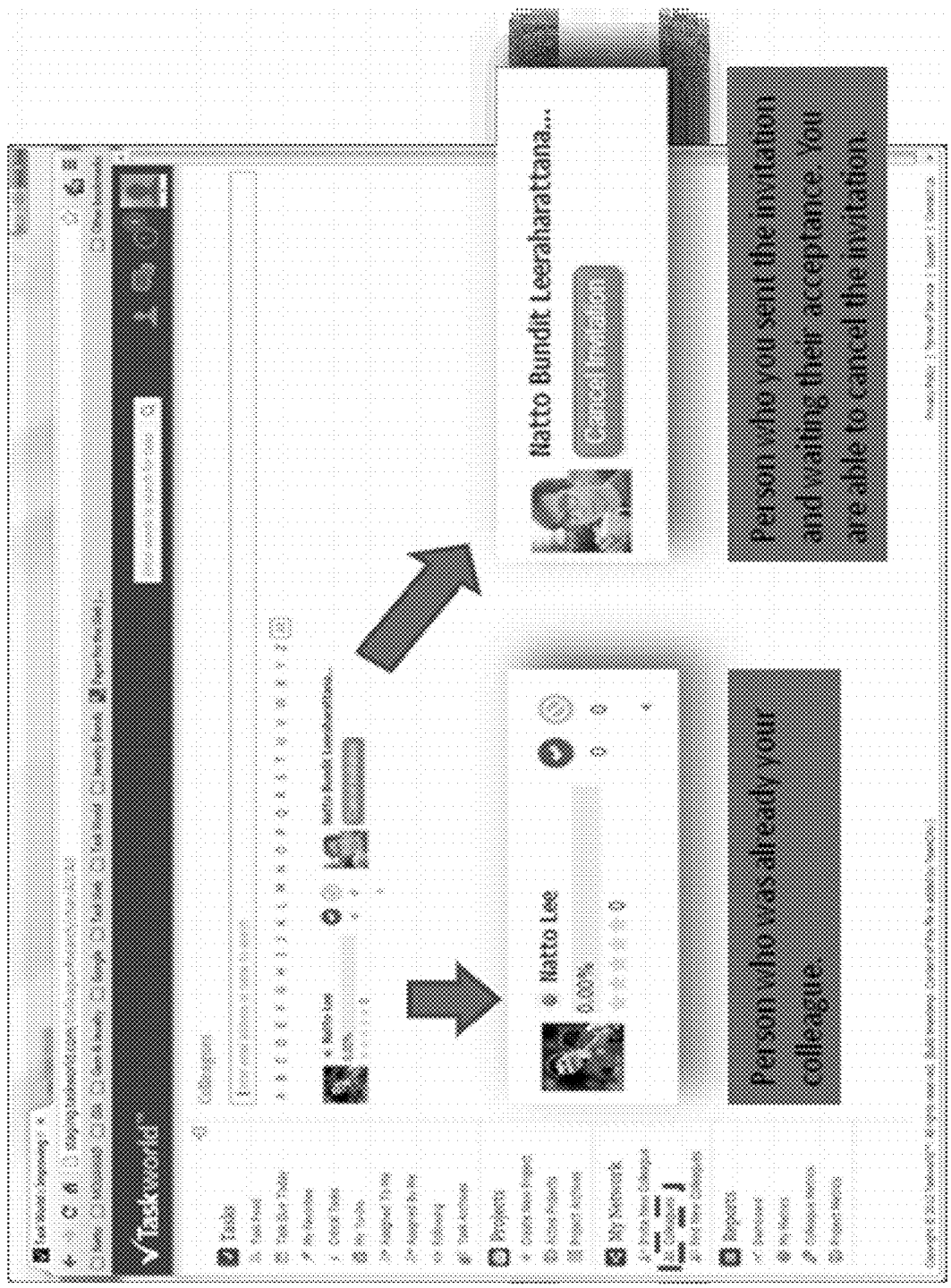

FIGS. 3A-C show examples of user interfaces for inviting and managing colleagues, in accordance with an embodiment of the invention. Individuals may be invited by email. FIG. 3A shows that a region may be provided through which a user may invite the user's colleague(s). The colleague's email address may be entered and an invitation may be sent. In some instances, multiple emails may be entered simultaneously, and multiple invitations may be sent. The user may enter the invitee's email address and send an invitation to the email address. If the invitee is already a registered user of the project management system, the user may search and/or select the invitee from a list of available users.

A user can search for all the people who are part of the project management system. The search may be performed using any search parameters. For example, keywords, names, e-mail addresses, positions, groups, teams, experience, geographic locations, demographics, or any other information may be used. The search may occur by entering information into a field (e.g., keywords). In other embodiments, filtering may occur using one or more drop down menu, checkbox, or any other user interactive feature.

A list of individuals who meet the search parameters may be returned. The list of individuals may include the individuals' names and/or pictures. In some instances, the list may include additional information such as e-mail addresses, positions, groups, teams, experience, geographic locations, demographics, or any other information. An option may be provided to add the colleague. The user may select the option (e.g., click on a button) to add the colleague. In some instances, one-click may add the colleague.

A team list may be displayed. A team list region may be adjacent to a search region. The team list may include a list of individuals who already belong to a team. The individuals on the team may be filtered or focused. Team members may be added or removed from the list. The team list may include an identifier for the members (e.g., member name, member picture). One or more performance indicators may be displayed along with the member identifier. For example, each team member may have one or more performance indicator adjacent to the member identifier indicating the number of tasks completed by the member, an achievement rating, and/or an average satisfaction score.

FIG. 3B shows that an invitation has been sent to the colleague. The colleague may join the network with one click. The colleague may receive a communication that the user has invited the colleague to the project management system. In some instances, the user may include a personal message that may be included in the invitation. An option may be provided to the recipient to click in order to join/register the network. In some embodiments, a visual indicator (such as a "!") may be provided to alert a recipient of any pending requests. In one example, a recipient may view the recipient's colleagues' requests (e.g., by clicking on an alert icon). One or more requests may be shown. The recipient may choose to accept the colleague request. In some instances, an option for 'not now' or 'decline' may be provided.

FIG. 3C shows a user interface when the recipient has accepted the inviter's request. The inviter's name and/or picture may be shown. In some instances, information relating to the tasks completed and/or evaluations may also be displayed. The inviter may be entered into the recipient's team network. In some instances, a user's colleague list may show individuals already in user's network, and/or individuals who have yet to accept the user's invitations. In the latter case, the user may have the option to cancel the pending invitation (e.g., by clicking on a "Cancel Invitation" button adjacent to the invitee's name).

Figure 4:
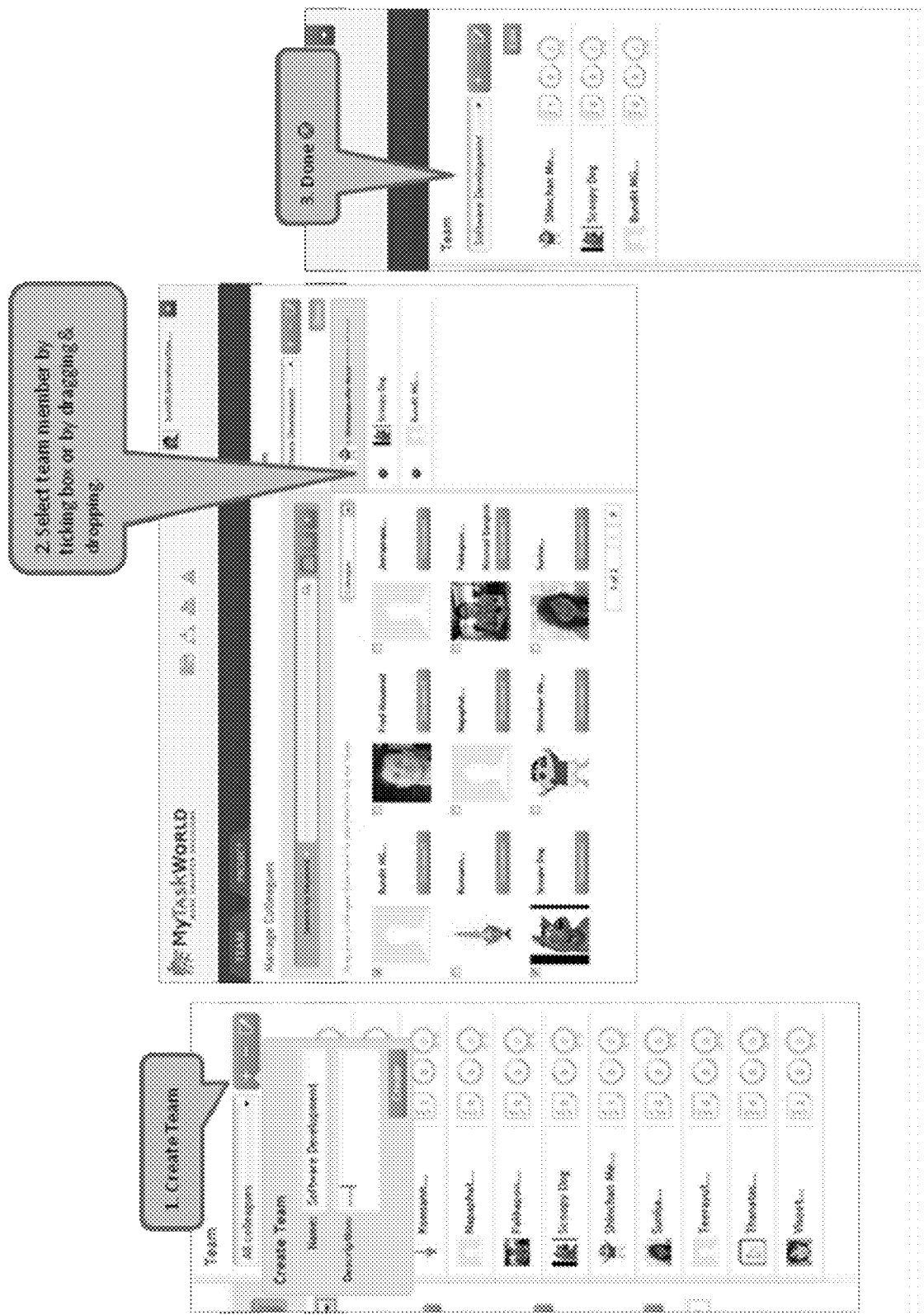
FIG. 4 shows an example user interface that may be used to organize a team, in accordance with an embodiment of the invention.

FIG. 4 shows an example user interface that may be used to organize a team, in accordance with an embodiment of the invention. An individual may be able to organize the individual's colleagues in the manner which he or she likes. An individual may create one or more team. The user may select or enter a name for the team. The user may optionally select or enter a description for the team.

After the team is created, the user may select one or more potential team member to be part of the team. In one example, a team member may be selected by ticking a box next to the member's name, or by dragging and dropping a visual representation of the member into the team. Any other techniques may be used to add a team member to a team. One member may be added at a time. Alternatively, multiple members may be added simultaneously. As members are added, the team's list may reflect the new members that have been added.

A list of the team members may be viewable. After the team members have been added (and optionally while the team members are being added), a team list may be visible. In some instances, a drop down menu may be provided from which a user may select a team to view. The list of members may be shown for the selected team. The list of members may include the members' names. In some instances, the members' pictures, information about completed tasks, and/or information about performance evaluation may be included. Performance indicators may be displayed visually mapped to the members' names. Performance indicators may be in the same row as the respective members' names.

A user may be able to add an individual to one, two or more teams. When selecting colleagues to add to a team, the user may use search parameters to narrow down the list of colleagues. The user may use the search parameters to find individuals that have particular qualifications to be part of a team.

In some instances, the user may be project manager. In some instances, only project managers or individuals of a certain job title may be able to create and/or manage teams. Alternatively, any user may be able to create teams. The team organization may be internal to the user. Alternatively, team designations may be applied system-wide. For example, if a team is created by a project manager or other individual, all members of the team may be updated to be part of the team.

A user interface may be provided which provide an ability to create a task by assigning it to a person or team. The user may also set one or more target dates. A user may expand a task request. For example, a user interface may have a drop down button, or other option to select to expand the task request.

Figure 5:
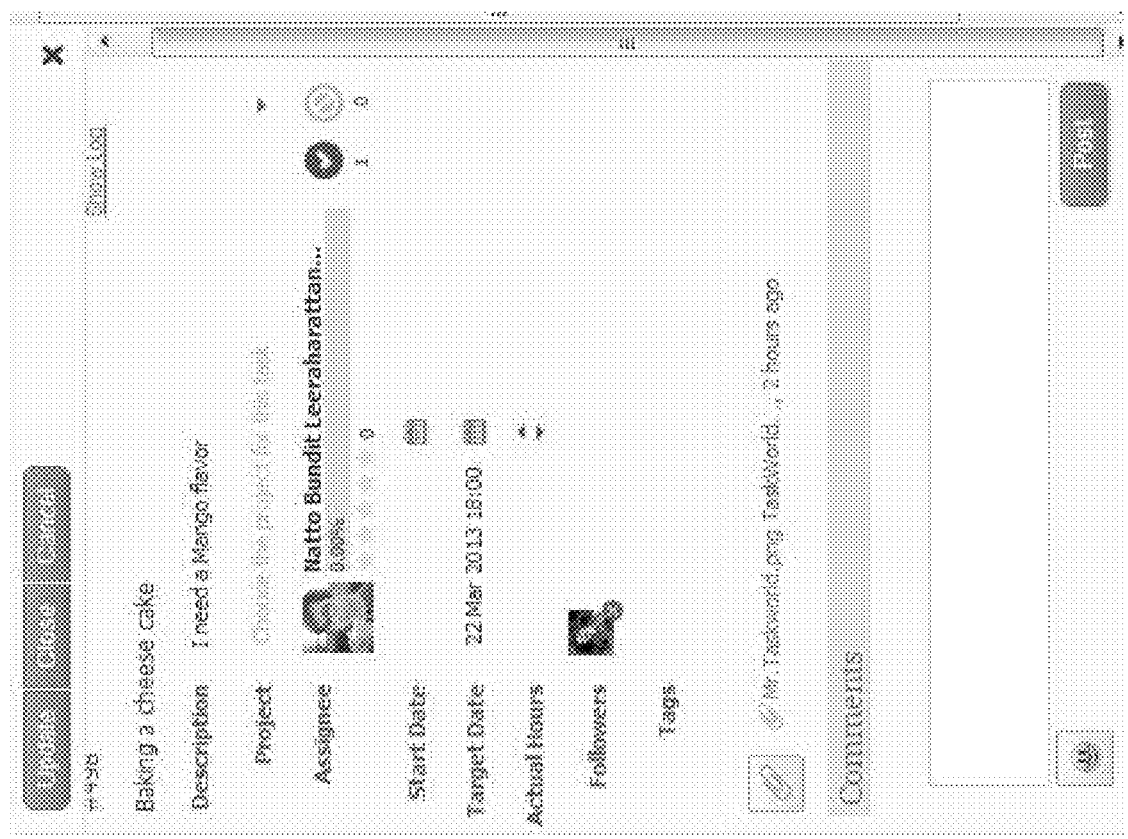
FIG. 5 shows an example user interface for entering task information, in accordance with an embodiment of the invention.

FIG. 5 shows an example user interface for entering task information, in accordance with an embodiment of the invention. Such an interface may be provided after a user elects to create a new task, for example, by typing a task title and hitting "Enter." The user interface may include data entry controls for task title, description, project, assignee (e.g., individuals/teams to whom the task is assigned), start date, target date, actual hours, followers, tags, comments, and/or file attachments (if needed).

Upon creating a new task, the user may become its assignee by default. If the user would like to assign the task to a colleague instead, the user may click on any area over "Assignee" and search and select the user's colleague(s). The user may also type the name or email address of the colleague to bring up the colleague, and then click the "Assign" button at the top menu to assign the task to the colleague.

The start date and/or target date fields may be entered via a popup calendar control, where the user may select the date and/or time for the task to be started and/or completed.

The comments for a task may be entered via one or more text fields or text boxes. In some embodiments, icons indicative of user's emotions such as smiley faces may be entered via emoticon controls or similar controls.

Users may add followers who can see and follow the status and progress of each task, attach files and comment on the task. The followers may also be included in any correspondences in the team relating to the task. The followers need not perform any actions of the task. The followers need not be part of the team performing the task or managing the task. The user may add followers by selecting a "+" sign adjacent to the "Followers" field, then search for and select colleagues to be the followers. The user may type in the name or email address of a colleague to bring up the desired colleague to add as a follower.

When creating a task, a field or option may be provided to add one or more followers. In one example, a drop-down menu may be provided. Alternatively, any other type of list may be provided from which a user can select one or more individual from a list of individuals. The followers may be part of the team. Alternatively, the followers may include any colleague within the user's network. In some instances, a single follower may be provided. Alternatively, there may be multiple followers. The task assignment may be submitted including the followers. In some instances, a task may have been pre-existing. The follower list may be created or altered after the task has been pre-existing. The requestor may then go in and modify the follower list to zero, one or more other individuals. Alternatively, the follower list may be made when the task is first created. Thus, whether there is a new task or existing task, a requestor may be able to add colleagues by selecting from their follower list, and clicking a '+' icon to add.

The followers may be shown in a follower pane. The requestor may remove followers by clicking an 'x' next to the follower's name. Additional followers may be added using the interface described above.

Followers may see the tasks under a 'following' user interface. The 'following' user interface may include similar features and layout to an 'assigned by me' or 'assigned to me' user interface. For example, the interface may include one or more indicator of the requestor, and the assignee. From the follower's view, one or more different requestors and/or assignees may be shown. Additional information such as task name, due date for the task, message related to the task, days left to complete the task, or other information may be provided. Such information may be provided for each task.

The message indicators may include the number of messages relating to the task. In some instances, the number of messages may be the total number of messages relating to the task, or the total number of new messages relating to the task. In some instances, for the days left to complete the task, an indicator may be provided if the task is overdue. For example, negative days left may be provided if the task is overdue. Different color indicators may be used. For example, blue may be provided if there are still days left to complete the task, and red may be provided if the task is overdue.

A total count section may be provided in accordance with an embodiment of the invention. For example, a total number of drafts, tasks in process, tasks completed, and tasks overdue may be provided relating to assignments followed by the follower.

Still referring to FIG. 5, the user interface may include a filter. The follower may be able to filter the assignments followed by the follower. For example, the follower may be able to filter by requestor, project, task, due date, messages, or any other parameters. In some instances, the follower may be provided with an option to order the list of assignments followed by the follower. The follower may be able to order the results by any of the factors, such as those described elsewhere herein.

The tags field may be used to enter one or more keyword, or other information. The user may attach files for sharing with colleagues and/or followers, for example, by clicking on the file attachment control (e.g., a paper clip icon). The file attachment control may be used to select one or more files from a user's local device or from a remote location. The users may also add comments on tasks they have created, are assigned to or are following.

The option to submit the task information may also be provided. Any of the information may optionally have a default value. For example, an 'assign to' field may have a default option of 'me' (the user creating the task). In some instances, a default timeframe may be provided (e.g., start date may be the date of the creation of the task). A user may modify the default information.

A user interface may be provided which may show the user's own tasks and tasks that need the user's actions (e.g., assigned by others to the user). This may be shown under an 'assigned to me' option. For example, if a new task is created that is self-assigned, then the 'assigned to me' region may include the task which is shown as being assigned by the user to the user. The task name may also be viewable. Information, such as the due date or messages pertaining to the task may be included.

In some instances, the 'assigned to me' interface may also include counts relating to the status of tasks which are related to the user. For example, the information may include a total number of drafts, in process, completed and/or overdue tasks.

Figure 6:
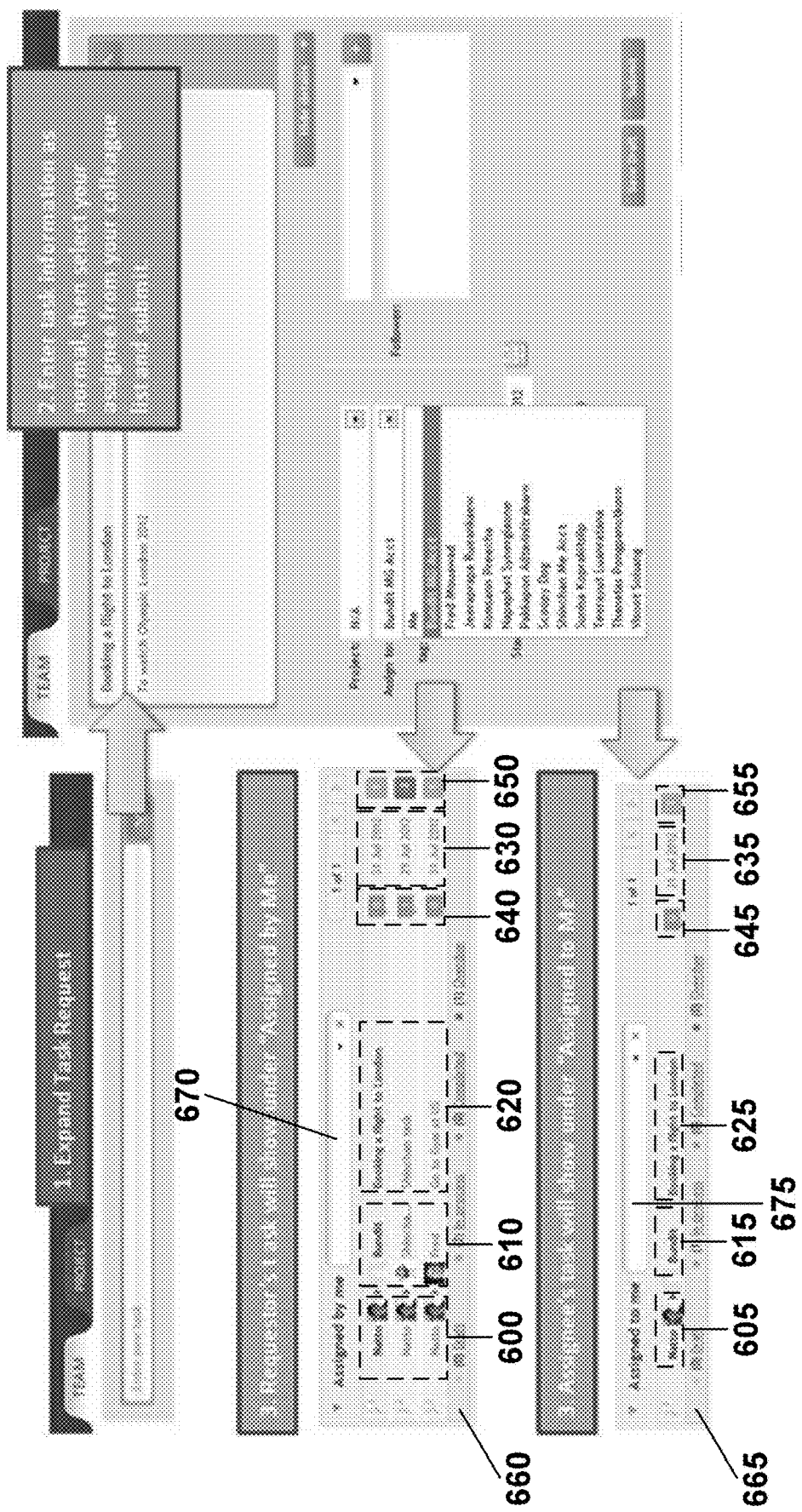
FIG. 6 shows an example user interface for assigning tasks to team members, in accordance with an embodiment of the invention.

FIG. 6 shows an example user interface for assigning tasks to team members, in accordance with an embodiment of the invention. As previously shown, an option may be provided to expand a task request. Task information may be entered, such as task title, task description, due date.

One or more individual may be selected to receive the assignment. An assign-to field may be provided. In some instances, a drop-down menu may be provided. Alternatively, any other type of list may be provided from which a user can select one or more individual from a list of individuals. The individuals may be part of the team. Alternatively, the individuals may include any colleague within the user's network. In some instances, a task may be assigned to a single individual. Alternatively, it may be assigned to multiple individuals. The assignment may be submitted. In some instances, a task may have been pre-existing. The assignment may be created or altered after the task has been pre-existing. For example, it may have been assigned to the requestor by default when the task was originally created. The requestor may then go in and modify the assignment to one or more other individuals. Alternatively, the assignment may be made when the task is first created.

After the task has been created and assigned, the requestor may view a user interface that shows tasks assigned by the requestor. An 'assigned by me' interface may be shown. The interface may include one or more indicator of the requestor 600, and the assignee 610. From the requestor's view, all of the requestors shown may be the requestor viewing the interface. One or more different assignees may be shown. Additional information such as task name 620, due date for the task 630, message related to the task 640, days left to complete the task 650, or other information may be provided. Such information may be provided for each task.

The message indicators may include the number of messages relating to the task. In some instances, the number of messages may be the total number of messages relating to the task, or the total number of new messages relating to the task. In some instances, for the days left to complete the task, an indicator may be provided if the task is overdue. For example, negative days left may be provided if the task is overdue. Different color indicators may be used. For example, blue may be provided if there are still days left to complete the task, and red may be provided if the task is overdue.

A total count section 660 may be provided in accordance with an embodiment of the invention. For example, a total number of drafts, tasks in process, tasks completed, and tasks overdue may be provided relating to assignments made by the requestor.

The user interface may include a filter 670. The requestor may be able to filter the assignments assigned by the requestor. For example, the requestor may be able to filter by assignee, project, task, due date, messages, or any other parameters. In some instances, the requestor may be provided with an option to order the list of assignments assigned by the requestor. The requestor may be able to order the results by any of the factors, such as those described elsewhere herein.

In some embodiments, after the task has been created and assigned, the assignee may view a user interface that shows tasks assigned to the assignee. An 'assigned to me' interface may be shown. The interface may include one or more indicator of the requestor 605, and the assignee 615. From the assignee's view, all of the assignees shown may be the assignee viewing the interface. One or more different requestors may be shown. Additional information such as task name 625, due date for the task 635, message related to the task 645, days left to complete the task 655, or other information may be provided. Such information may be provided for each task.

The message indicators may include the number of messages relating to the task. In some instances, the number of messages may be the total number of messages relating to the task, or the total number of new messages relating to the task. In some instances, for the days left to complete the task, an indicator may be provided if the task is overdue. For example, negative days left may be provided if the task is overdue. Different color indicators may be used. For example, blue may be provided if there are still days left to complete the task, and red may be provided if the task is overdue.

A total count section 665 may be provided in accordance with an embodiment of the invention. For example, a total number of drafts, tasks in process, tasks completed, and tasks overdue may be provided relating to assignments assigned to the assignee.

The user interface may include a filter 675. The assignee may be able to filter the assignments assigned to the assignee. For example, the assignee may be able to filter by requestor, project, task, due date, messages, or any other parameters. In some instances, the assignee may be provided with an option to order the list of assignments assigned to the assignee. The assignee may be able to order the results by any of the factors, such as those described elsewhere herein.

The task that has just been assigned may show up in both the 'assigned by me' and the 'assigned to me' interfaces of the respective individuals. Such updates may be made in real-time.

Figure 7A:
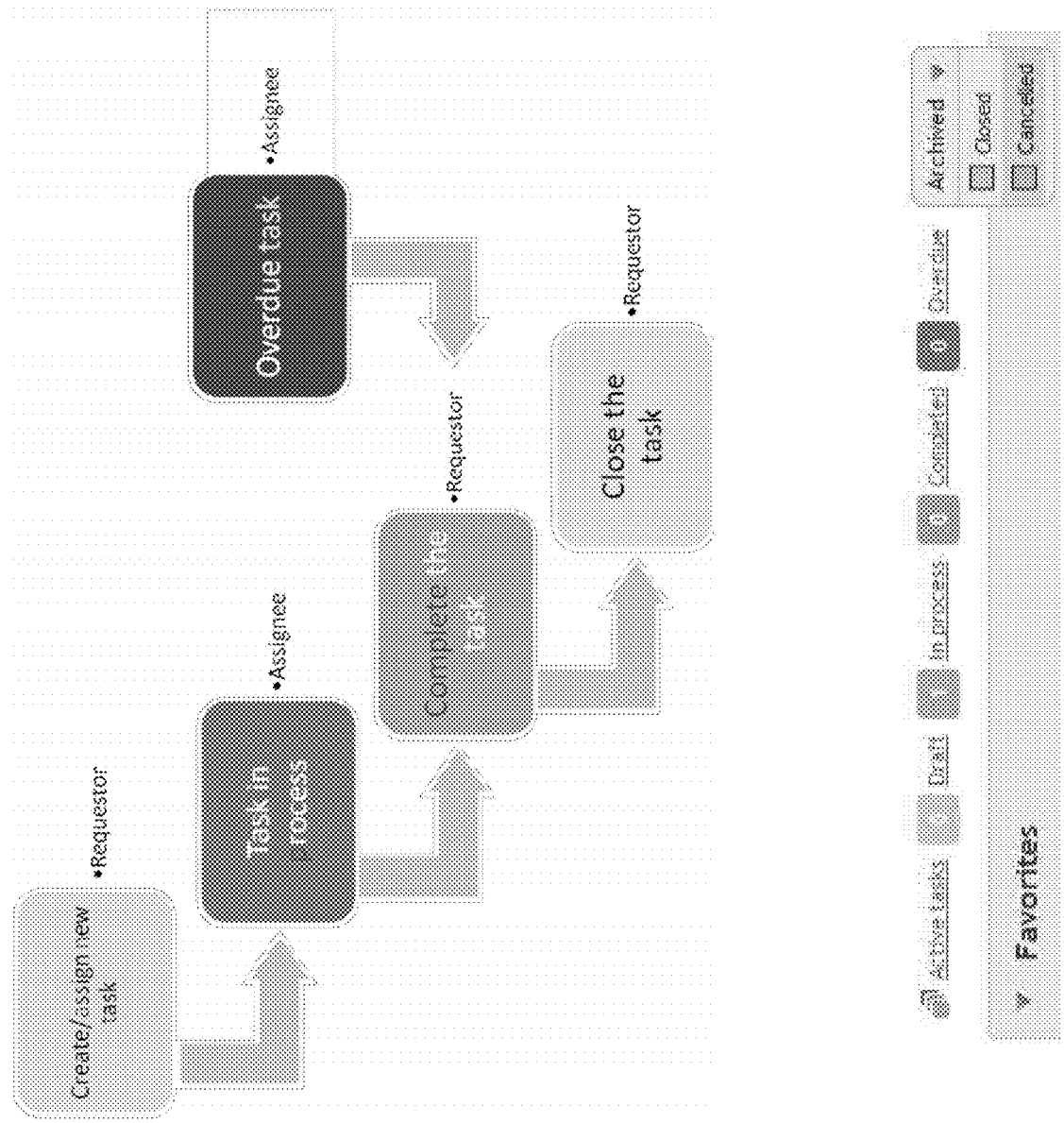
FIG. 7A provides a flow chart demonstrating managing task flow and project status changes, in accordance with an embodiment of the invention.

FIG. 7A provides a flow chart demonstrating managing task flow and project status changes, in accordance with an embodiment of the invention. In various embodiments, requestors or assignors and assignees associated with a task may change the status of the task via a user interface similar to that described in connection with FIG. 5. The user interface may provide different options depending on whether the viewing user is a requestor (assignor) or assignee. For example, for an assignee, the user interface may provide "Decline" and "Complete" buttons or similar controls for declining or completing a task. For an assignor, the user interface may include "Close," "Reopen" and "Cancel" buttons or similar controls for closing, reopening or cancelling the task.

A requestor may create and/or assign a new task. The requestor may perform such actions with the aid of a processor. The requestor may interact with a user interface, such as those described herein. A requestor may be able to cancel a task at any time. In some instances, a requestor may be able to alter a task at any time (e.g., altering a task title, description, assignee, follower, due date). Alternatively, a requestor may not be able to alter any part of the task, or portions of the task.

After the task has been created and/or assigned, the task may be in process (e.g., the task may have a status of "In Progress"). The task may be performed by an assignee. One or more assignees may be provided per task. An assignee may be an individual, team, or an individual on the team. In some embodiments, an assignee can reject a task. When an assignee receives a task, the assignee may review the requirements and decide to decline the request (e.g., due to incomplete information). To do this, the assignee may click "Decline" at the top of a task detail pane such as similar to that described in connection with FIG. 5. The assignee can also leave comments to let the requestor know the reason for declining the task. After a task is declined, it will be sent back to the requestor with the declined status recorded (e.g., the task may have a status of "Declined").

In some embodiments, an assignee cannot change task information such as target dates, followers etc. For example, only the requestor who created the task can change such information. Alternatively, specified individuals on the team may also be able to change task information. Alternatively, the assignee may be able to change certain task information.

The assignee may complete the task. In some instances, the assignee may complete the task on time. Alternatively, the task may become overdue. While the task is overdue, the assignee may work to complete the task. An alert may be provided prior to the task becoming overdue, or when the task becomes overdue. Once a task is finished, the completed task is delivered back to the requestor. The assignee may click a "Complete" button at the top of the task detail pane and the status of the task may change from "In Progress" or "Overdue" to "Complete". The assignee is able to upload files or add comments as well. Once the task has been completed, the requestor may receive notice that the task is complete. The requestor may be able to review the task. In some embodiments, the requestor has the right to review a job and close or reject the completion and resend/reassign to assignee for reworking.

In the case that the requestor would like the assignee to rework or adjust the work, the requestor has the option to reopen a task back to assignee to by clicking a "Reopen" button associated with the task. Reopen may also be an option for declined tasks. Once the task is reopened by the requestor, the status of the task may become "Reopened" or "In Progress."

Figure 7B:
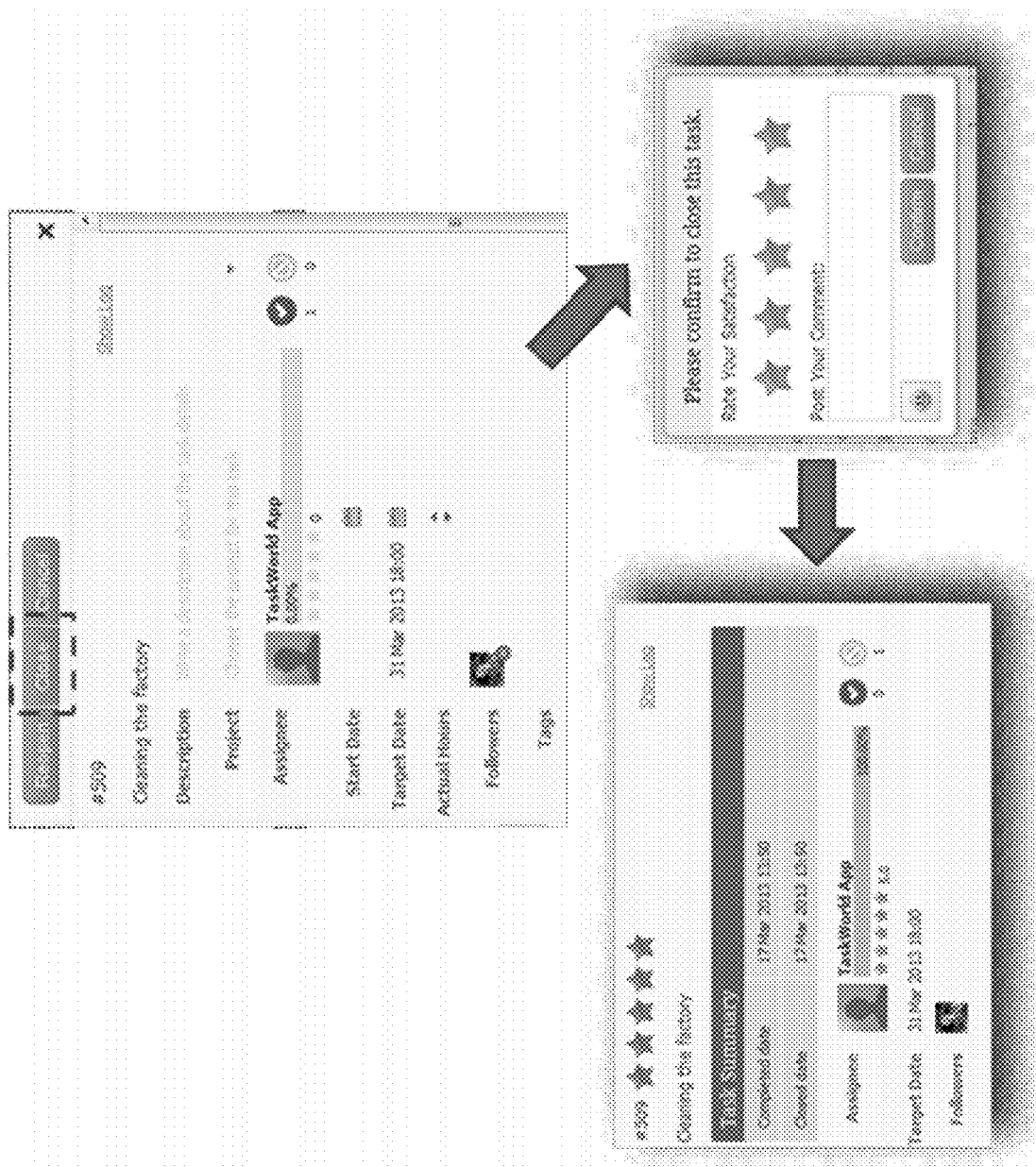
FIG. 7B shows an example user interface for closing a task, in accordance with an embodiment of the invention.

A requestor may also have the ability to close a task. FIG. 7B shows an example user interface for closing a task, in accordance with an embodiment of the invention. The requestor may close the task by clicking on a "Close" button associated with the task. This may occur because the requestor is satisfied with the work delivered by the assignee. In some instances, only the requestor may close the task. Alternatively, other designated individuals on a team may have the ability to review and/or close a task. The assignee may or may not be able to close a task. Once a task is closed, the status of the task becomes "Closed."

Subsequent to, concurrently with, or prior to closing the task, a performance evaluation may occur (e.g., via a grading/rating popup window). Performance evaluation may or may not be required for the closing of a task. For example, a requestor may be able to give a satisfaction score based on the assignee's performance on the task after closing the task. In another example, the requestor may review the task, and give a satisfaction score prior to or concurrently with closing the task. The satisfaction score may be provided as feedback. The requestor can leave comments as well. The assignee may or may not be able to view the satisfaction score. The requestor may be able to view the satisfaction score, which may be useful for future task assignments. After a task is closed (with or without performance evaluation), the task may be archived.

In some embodiments, some or all participants of a task (e.g., assignors, assignees, followers) may be able to provide ratings to some or all of the participants of the task after the closure of the task. For example, in some cases, assignors and/or assignees may be able to provide ratings to followers for their involvement with the task. In some embodiments, the ability of participants to assign ratings may vary across different tasks. For example, for some tasks, only a subset of the participants may provide ratings. In some cases, ratings may be provided only for a subset of participants.

Records may be kept that the task was completed, who the requestor was, who the assignee was, whether the task was completed on time, and/or the satisfaction score. Such performance evaluation information may be displayed in association with the assignee. One or more performance indicators may be generated based on such records. The performance indicators may take multiple records into account, and may provide a summary of performance evaluations for the individual.

Any of the steps herein may be provided with aid of a programmable processor. The individuals involved in the process may interact with a project management system via one or more device. The individuals may interact through a user interface and/or be presented information through a user interface. Non-transitory computer readable media may include code, logic, or instructions to provide one or more of the steps described herein.

In some instances, a task management pane may be provided. The task management pane may keep track of active tasks and/or task status. For example, the task management pane may keep track of the total number of drafts, tasks in process, tasks completed, and/or tasks that are overdue. In some instances, a visual indicator may be given for each total category. The visual indicator may have a color representative of the category/task status. The visual indicator may include a number that indicates the number of tasks in each category.

A user may select a task status category. For example, a user may click on a task status name. This may show the user the tasks that are within the status. For example, if one task is 'in process', clicking on the category may show the task that is in process.

A visual indicator may also be provided for archived tasks. For example, a user may be able to view closed or cancelled tasks. In some instances, the archive may include a drop menu where a user may be able to select whether the user is viewing closed or cancelled tasks.

The task management pane may be viewed by any user of the system. In some instances, a requestor may be able to view a task management pane. The task management pane may be specific to tasks assigned by the requestor, or may include all the tasks for a company, organization, entity, office, or group to which the requestor belongs. In some other instances, an assignee may be able to view a task management pane. The task management pane may be specific to tasks assigned to the assignee, or may include all the tasks for a company, organization, entity, office, or group to which the assignee belongs. In some instances, a follower may be able to view a task management pane. The task management pane may be specific to tasks followed by the follower, or may include all the tasks for a company, organization, entity, office, or group to which the follower belongs. An administrator may be able to view the task management pane and may include all the tasks for a company, organization, entity, office, or group to which the administrator belongs.

As discussed above, a task assigned to an assignee may be reassigned or subassigned. When a task is reassigned, the task is transferred from the assignee to someone else. The task may be reassigned by the assignee to someone else. Alternatively the task may be reassigned by a requestor or team leader. Tasks received can be reassigned to another colleague. When a task is subassigned to someone else, the current assignee remains the assignor of the task. An assignor of a task has the option to block or allow reassignment and/or subassignment of the task. In some embodiments, a task may have a maximum number of assignees (e.g., 5). The maximum number of assignees may be configurable, for example, by the system administrator or a user. In some embodiments, the chain of assignment associated with a task may be displayed with the task.

Figure 8:
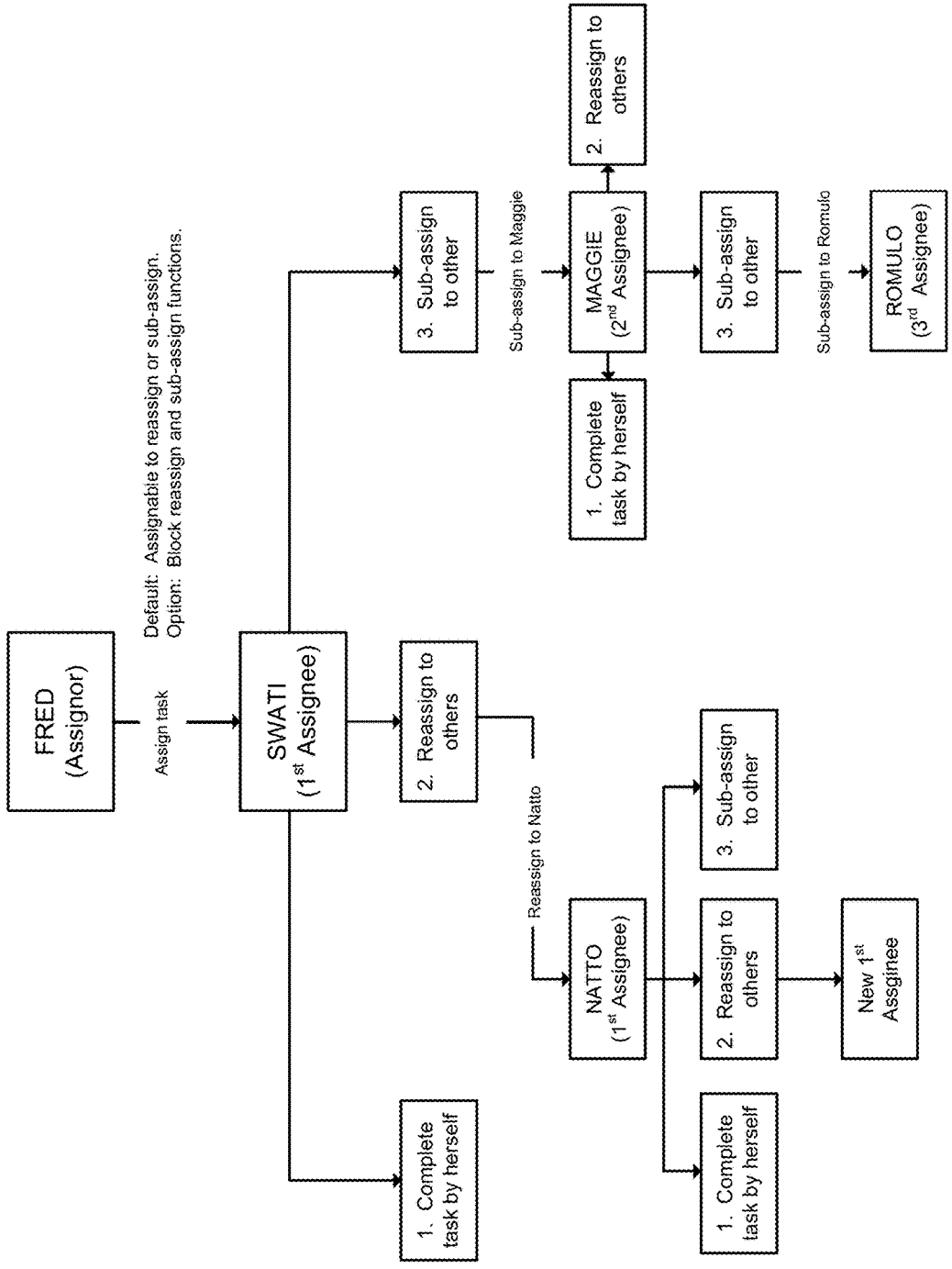
FIG. 8 shows an example scenario of task assignment, in accordance with an embodiment of the invention.

FIG. 8 shows an example scenario of task assignment, in accordance with an embodiment of the invention. As illustrated, the user Fred may assign a task to another user Swati. Fred would be assignor and Swati would be the 1st assignee for the task. Fred may have the option to allow the assignee to reassign or subassign the task. Alternatively, Fred may block or disable reassignment and/or subassignment by the assignee.

Swati may have the option to complete the task by herself, reassign the task to others or subassign the task to others. If Swati reassigns the task to Natto, Natto become the 1st assignee (as opposed to Swati). Natto would then have the option to complete the task himself, reassign the task to others, or subassign the task to a third party. If Natto reassigns the task to a third party, the third party would become the new 1st assignee.

If Swati subassigns the task to Maggie, Maggie would become the 2nd assignee (in addition to Swati) since subassignment does not release the original 1st assignee from being an assignee. Maggie would have the option to complete the task by herself, reassign the task to others or subassign the task to others. If Maggie subassigns the task to Romulo, for example, Romulo would become the 3rd assignee, in addition to Swati and Maggie.

Permissions associated with various project management related activities may be set for assignors and assignees depending on suitable business rules. The table below lists an example permission setting associated with the users shown in FIG. 8.

| Role | Assignor | 1st Assignee | 2nd Assignee | 3rd Assignee (final assignee) |
|---|---|---|---|---|
| Name | Fred | Swati | Maggie | Romulo |
| Complete task | Y | Y | Y | Y |
| Close task | Y | N | N | N |
| Comment, attach files and add followers | Y | Y | Y | Y |
| Satisfaction rating | N | Fred > Swati (after Fred closes the task) | Swati > Maggie after Fred closes the task) | Maggie > Romulo (after Fred closes the task) |
| On-time completion | N | Y | Y | Y |
| Reassign to others | All assignee | 2nd assignee and below | 3rd assignee and below | N |
| Reassign myself to others | N | Y | Y | Y |
| Subassign to others | Y (max 5 subassignees) | Y (max 5 subassignees) | Y (max 5 subassignees) | Y (max 5 subassignees) |
| Remove assignee | All assignee | 2nd assignee and below | 3rd assignee and below | N |

In the illustrated embodiment, both assignors and assignees may complete tasks. In some other embodiments, only re-assignees can complete tasks whereas sub-assignees cannot.

In the illustrated embodiment, only assignors may close tasks or change other attributes (e.g., target date) of the task. Assignees may not or may need permissions from assignors to close tasks or change other attributes of the task (e.g., changing the target date). In some embodiments, re-assignees may be treated differently from sub-assignees.

In the illustrated embodiment, both assignors and assignees may provide comment, attach files and add followers to the task. In some other embodiments, some all or all of the above functions may be assignor-only or assignor-permitted only.

In the illustrated embodiment, an assignor (e.g., Fred) may not provide satisfaction rating to himself or herself. The assignor may provide satisfaction rating to the 1st assignee (e.g., Swati) after the assignor has closed the task. The 1st assignee (e.g., Swati) may provide satisfaction rating to the 2nd assignee (e.g., Maggie) after the 1st assignee has closed the task. The 2nd assignee (e.g., Maggie) may provide satisfaction rating to the 3rd assignee (e.g., Romulo) after the 2nd assignee has closed the task. And so on. As such each assignor in a chain of assignment can provide a satisfaction score or rating to the next assignee.

In the illustrated embodiment, the completion date for each assignee or subassignee is tracked by the system. The ratings assignees or subassignees receive are considered as per the completion dates. In addition, activities related to tasks may be tracked (e.g., stored in a data store) and/or provided to users (e.g., via a user interface), for example, via a task log. The task log may provide an audit trail of some or all activities associated with one or more tasks. For each activity, the task log may include a date and time, a name and/or description of the task, a name and/or description of the activity, a name of a person associated with the activity, and the like. For example, assignors, assignees and/or followers may view the task log to see who has completed his or her task and by what date and time. In some embodiments, the visibility of the task log may be controlled by one or more access control rules, for example, based on identity of the users.

In the illustrated embodiment, an assignor (e.g., Fred) may reassign the task to all the existing assignees (e.g., 2nd assignee, 3rd assignee). The 1st assignee (e.g., Swati) may reassign the task to 2nd assignee and below. The 2nd assignee (e.g., Maggie) may reassign the task to 3rd assignee and below. The final assignee (e.g., Romulo) may not reassign the task to any other assignees.

In some embodiments, changing an assignee does not affect the sequence of assignees after or below the changed assignee. For example, consider the scenario where Fred assigns the task to John, who subassigns the task to Jane, who subassigns the task to David, who subassigns the task to Lisa. If John reassigns the task to Paul, the sequence of assignees below Paul, including David and Lisa does not change because of the reassignment. In some other embodiments, changing an assignee in a chain of assignment may affect the assignees below the changed assignee.

In some embodiments, an assignor may not change or reassign himself or herself to other members whereas other assignees may assign themselves to other members. In some other embodiments, an assignor may replace himself or herself with another person, effectively changing the assignor of the task to the other person.

In the illustrated embodiment, both assignors and assignees may further sub-assign the task to other assignees. There may be a predefined upper limit on the number of subassignees that may be associated with a task (e.g., 5).

In the illustrated embodiment, an assignor (e.g., Fred) may be able to remove all assignees of the task, the 1st assignee may be able to remove all the $2^{nd}$ assignees, the $2^{nd}$ assignee may be able to remove all 3rd assignees, and so on. In some embodiments, the final assignee may not be able to remove any other assignees.

In various embodiments, other permission settings different from those discussed herein may be provided.

Figure 9:
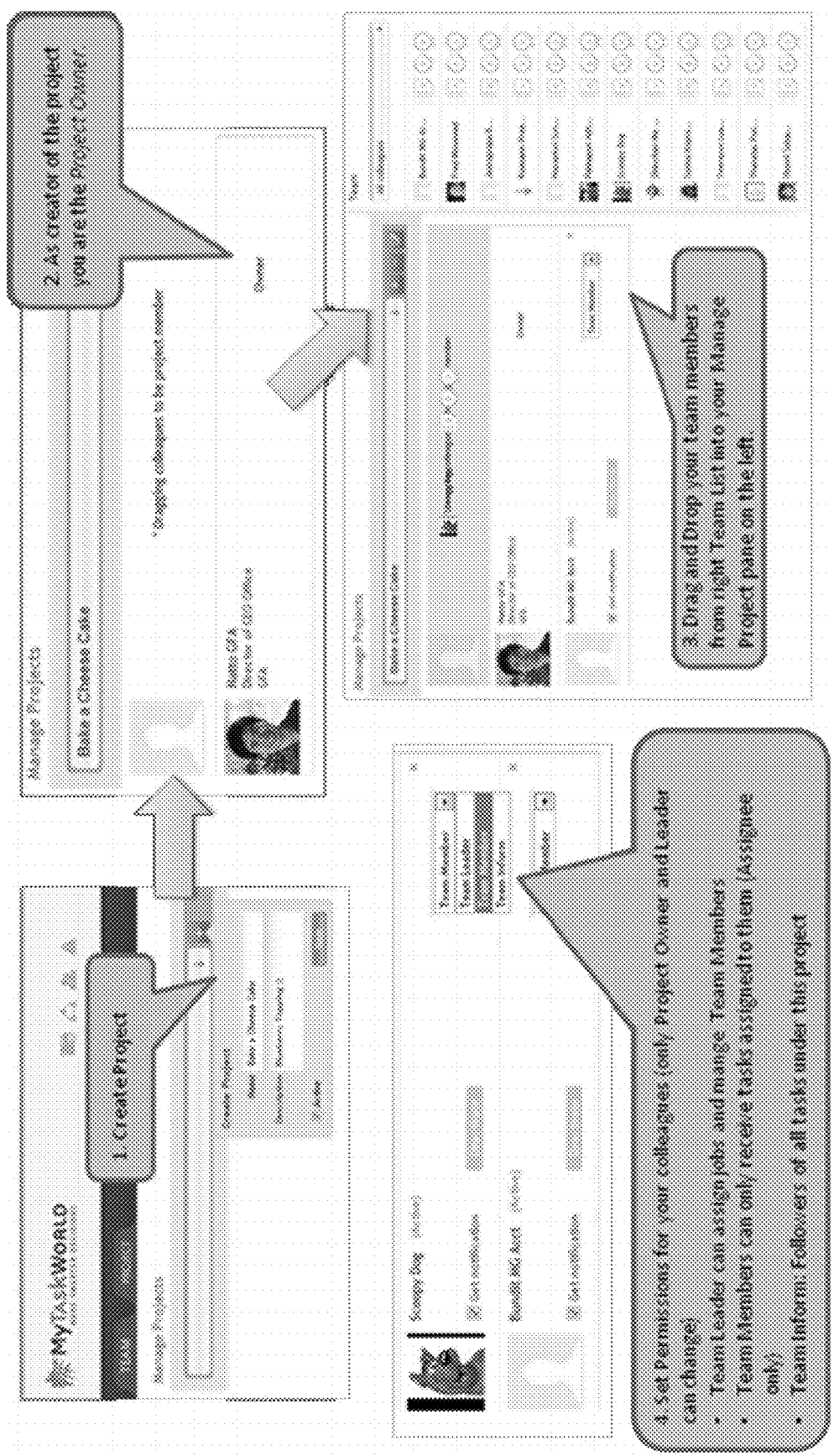
FIG. 9 shows an example of user interfaces that may be used to create projects and assign team members, in accordance with an embodiment of the invention.

FIG. 9 shows an example user interface that may be used to create projects and assign team members, in accordance with an embodiment of the invention. A user interface may be provided which provide an ability to create a project by assigning it to a person or team. A creator of the project may be a project owner. In some instances, a project may include zero, one, two or more tasks.

A project owner may create a project. For example, a user interface may have a '+', a "Create New Project" link, drop down button, or other control to expand the project creation interface. Project information may be entered. For example, a project title, project description, start date, target date, and/or project status (e.g., active) may be provided. The project information may be saved, creating the project.

Once a project has been created, the creator of the project may be shown to be a project owner. In some instances, any individual of an organization may be able to create a project. In some instances, only managers or individuals of particular job descriptions may be able to create a project. In some cases, the project owner field may be read-only. In other cases, the project owner field may be modifiable.

Users might want to add colleagues or team members to help with a project or have access to its' status, they can be invited to the project, for example, under a "Project Participants" section in an example user interface. In some instances individual team members may be added to the project. Options may be provided to add an entire team to the project simultaneously. A user interface may be shown with the project information and the team information. The project information may be adjacent to the team information. Team information may include a list of team members with information about the team members (e.g., member name, picture, and/or task information). A user may search for available members or participants by typing partial name, email address or other search criteria for members of participants in a search box.

A project owner may drag and drop team members from the team list into the manage project pane. A project owner may drag and drop a single team member at a time. Alternatively, multiple team members may be selected and dragged to the manage project pane. Once a team member has been dragged and dropped, the team member's information may show up on the manage project pane.

A project owner may also be able to set permissions for the colleagues that have been added to a project. The permission may be set at individual member level or at a group level for a subset of the members. In some instances, other members of the team can set permissions or only selected individuals can set permissions. In some instances, only a project owner or leader can set permissions. In some instances, the permissions may include selecting a member status from a plurality of options.

Examples of permission types may include leader, member, or follower. A leader can invite, remove, set permissions and/or leave comments for participants of a project. The leader may be able to assign jobs and/or tasks. A team leader may optionally be assigned tasks (e.g., requestor or assignee). A member may be able to assign tasks and be assigned tasks. A member may also be able to leave comments for other participants of the project. A follower may be able to view the project and leave comments. In other embodiments, more, less and/or different permission settings may be contemplated. For example, there may be more than 3 types of possible permission types for a project participant. As another example, the set of authorized activities for a "member" may be different than discussed above. In addition, the business rules associated with some or all of the permission settings may be configurable.

Figure 10:
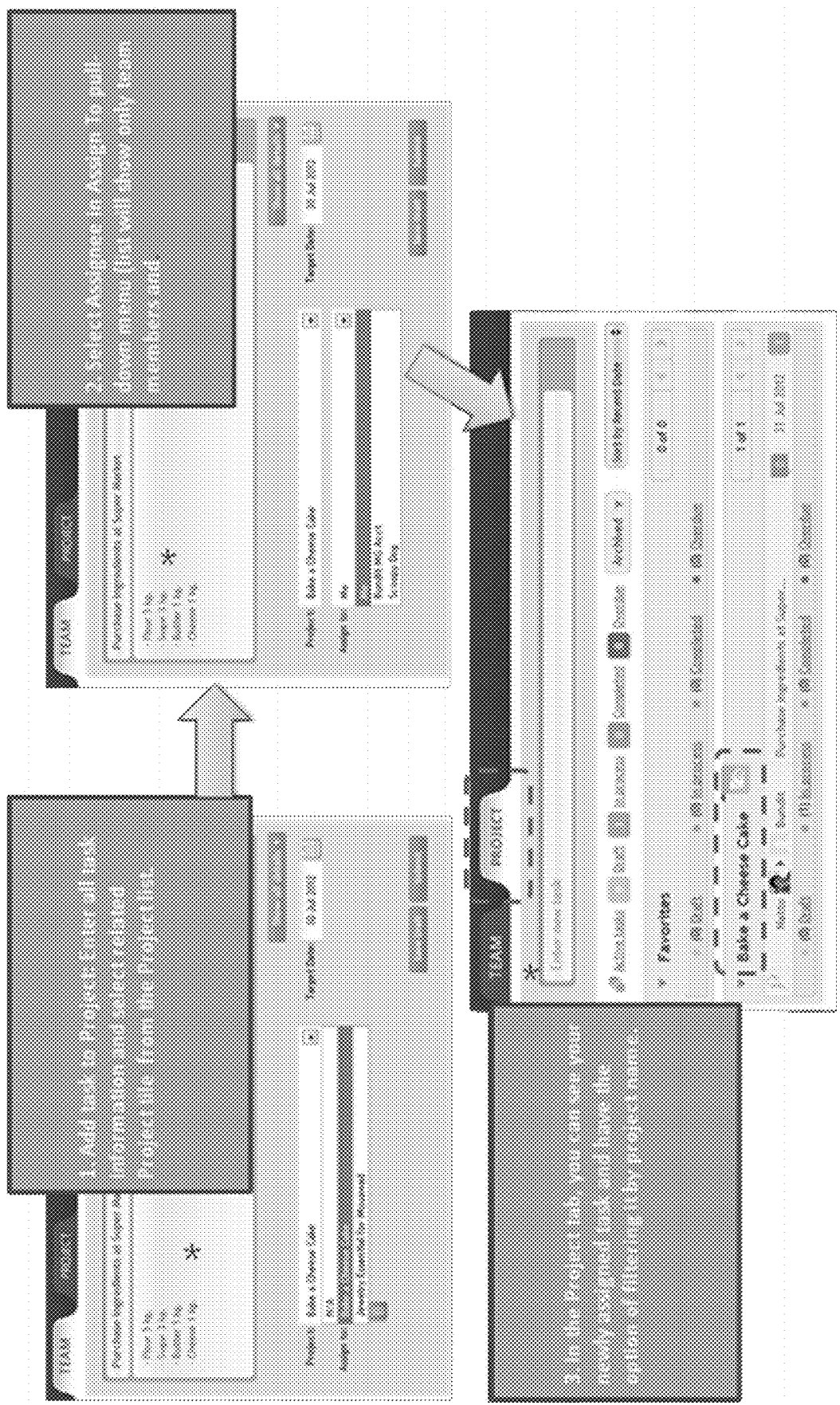
FIG. 10 shows an example user interface that may be used to create tasks within projects, in accordance with an embodiment of the invention.

Tasks may be added to a project. FIG. 10 shows an example user interface that may be used to create tasks within projects, in accordance with an embodiment of the invention. The user may select a project title from a project field. A user may select a project from a set of existing projects.

The user may add a task to the project. The user may enter all of the task information and select the related project title from the project list. The task may be created using any techniques or interfaces discussed elsewhere herein. In an embodiment, the process of adding a task to a project can be done in two ways. The user may add a task in a top-down fashion from a project interface (e.g., by clicking in an "Add task" control associated with a project), or associated a project with a task in a bottom-up fashion from a task interface (e.g., by selecting a project or entering a project name in a project field associated with).

In some instances, a user interface for creating a task may include a project field. The project field may permit a user to select a project from a set of existing projects to which the task will belong. In some instances, a drop down menu may be employed which may provide the current existing projects as options.

When creating the task, one or more assignee may be assigned to the task. An 'assign-to' field may be provided. In some instances, the 'assign-to' field may be a pull-down menu. The menu may provide a list of team members. In some instances, only team members who have been added to the project may be shown as options.

A project tab or view may be provided. The newly assigned tasks may be visible. A user may be able to view the newly assigned tasks. In some instances, the user may be a relevant party, such as a requestor, assignee, and/or follower. The various interfaces, such as those described elsewhere herein, may be used to view the newly assigned tasks. The user may have an option of filtering the newly assigned task by project name.

In an embodiment, a user may view active projects by clicking the "Active Projects" button and a list of the user's active projects will pop up. The user may then select the a particular project to view project details.

In an embodiment, a user may archive one or more projects via the user interface. Options to archive a project may typically be available when the project is complete and/or when the tasks within the project have been closed. To archive a project, a user may click on a "Project Edit" button, then click the "Archive" button to confirm. The project tasks, project history and/or other project-related data may be archived. Archived projects may be accessible, for example, via a "Project Archives" link.

Figure 11A:
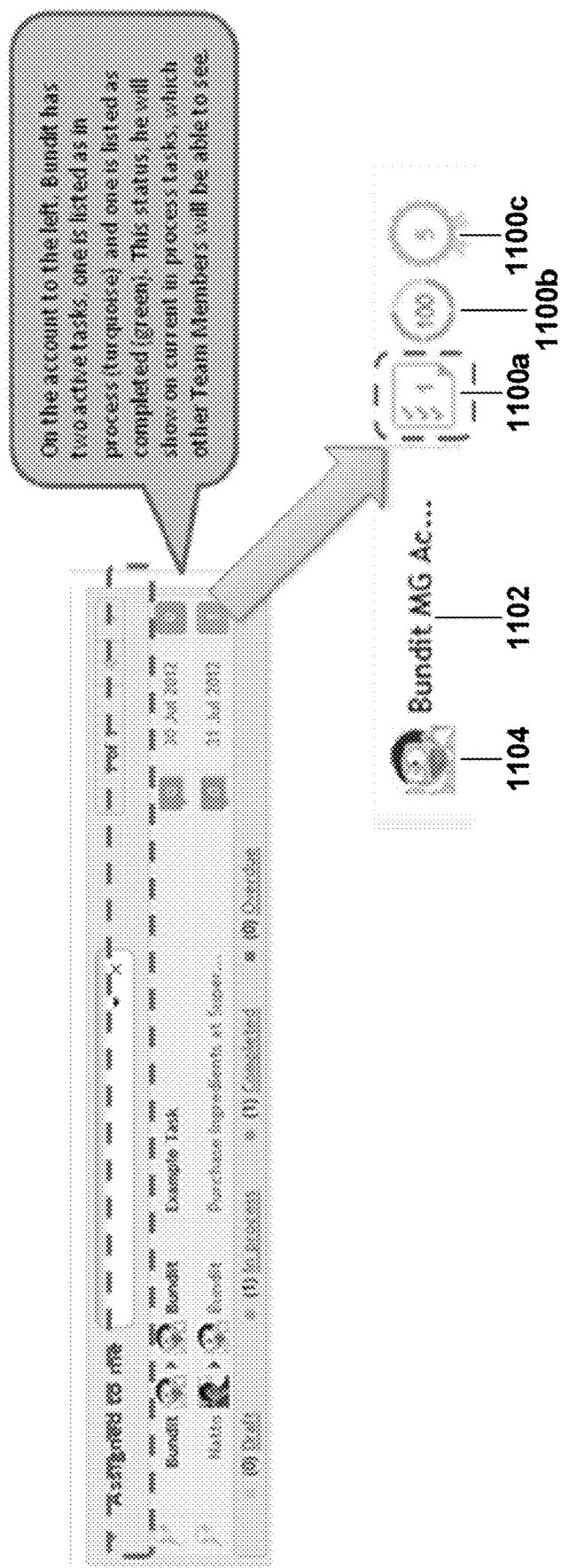
FIG. 11A is an example of a user interface that may display a colleague's performance and statistics, in accordance with an embodiment of the invention.

FIG. 11A is an example of a user interface that may display a colleague's performance and statistics, in accordance with an embodiment of the invention. A project management system may enable users to track key performance indicators, such as number of tasks that are being worked on, the percent of tasks completed within target dates, and the average quality grade provided for each task. Such information may be displayed on the user interface. In some instances, for team, project or task listings, the relevant assignees may have such performance indicators 1100*a*, 1100*b*, 1100*c* displayed along with their names 1102. A picture 1104 of the assignee may also be provided. In some instances, such performance indicators may be displayed with a listing of team members. Such performance indicators may be visible when a user is creating a project or task, or determining to whom a task should be assigned.

An individual's information may be provided showing tasks in process 1100*a* as a performance indicator. The tasks in process may show the number of tasks the individual is working on. Such information may be useful in determining the individual's workload. This may assist with assessing or managing workload. In some instances, the tasks in process performance indicator may include a visual icon or symbol. The visual icon or symbol may include a numerical value, which may include the number of tasks. Other visual indicators of numbers or values may be shown to indicate the number of tasks the individual is working on.

A user interface is displayed that includes information that may be used to determining the number of tasks in process for the performance indicator. For example, an 'assigned to me' user interface shows the tasks that are assigned to an individual. In the example provided, the assignee may be 'Bundit' who may have two active tasks. One may be listed as in process (e.g., have a visual indicator of being in process, such as a turquoise color) and one may be listed as completed (e.g., have a visual indicator of completion, such as a green color). A total count may keep track of the total number of tasks in draft, in process, completed, or overdue. The tasks in process performance indicator may count tasks that are assigned to the individual and that are in process (in this case, '1'). Both individual tasks and project related tasks may be counted.

In some embodiments, clicking on the tasks in process performance indicator or the user's name may show the user interface with task information for the individual. In some instances, other team members may be able to see the status, as performance indicators, or as a user interface with task information.

Figure 11B:
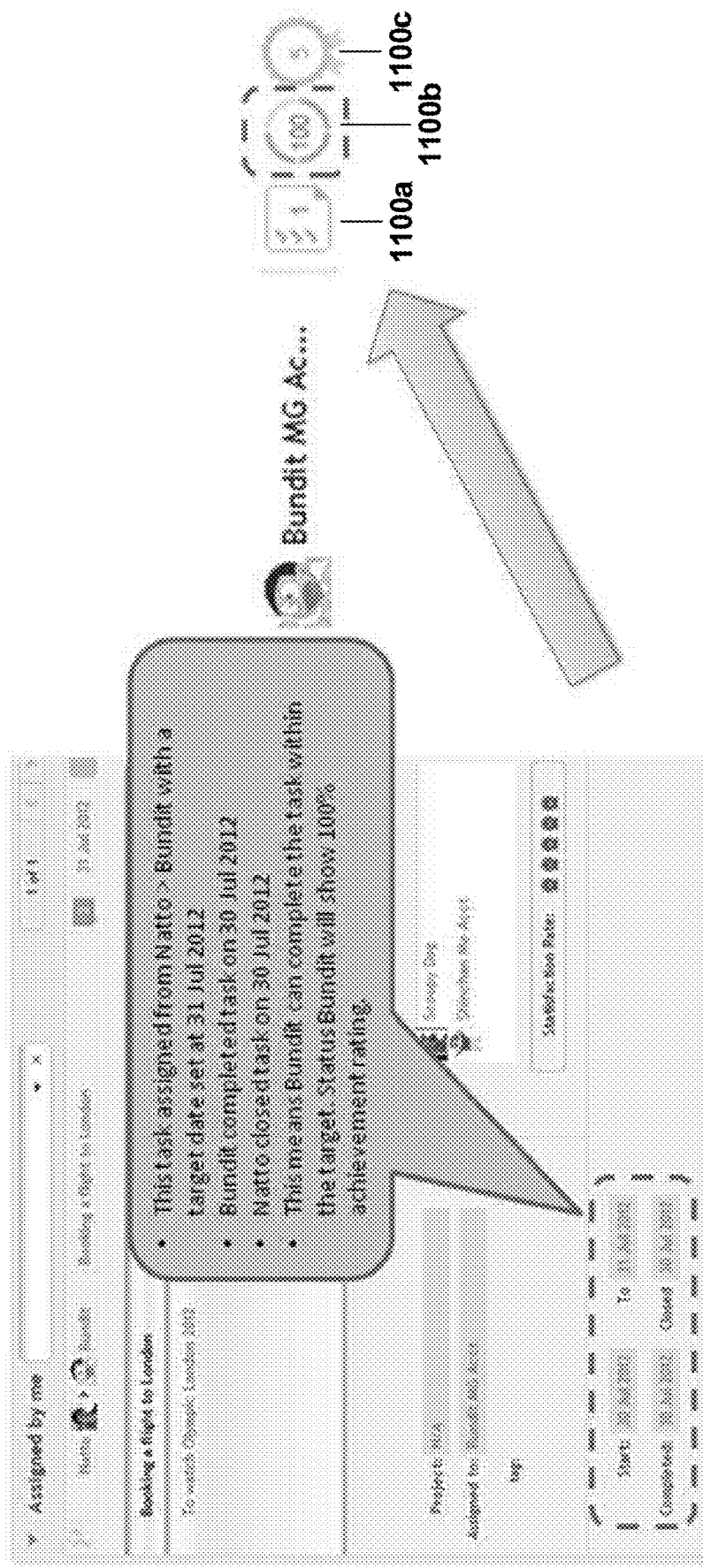
FIG. 11B shows another example of user interfaces that may display a colleague's performance and statistics, in accordance with an embodiment of the invention.

FIG. 11B is another example of user interfaces that may display a colleague's performance and statistics, in accordance with an embodiment of the invention. An individual's performance indicators 1100*a*, 1100*b*, 1100*c* may be displayed with other information about the individual, such as the individual's name.

The performance indicators may include an achievement rating 1100*b* performance indicator. The achievement rating may show the percentage of tasks completed within a target date, compared to total tasks. This may be provided for past tasks performed by the individual. In some instances, this may include all tasks that the individual has ever performed under the project management system. In another example, this may only include a certain subgroup of tasks, or may include tasks within a certain timeframe. In some embodiments, a requestor may see the score calculated based on a task he or she assigned to the individual only. This may calculate the tasks that are in closed status.

For example, a task may be assigned from Natto to Bundit with a target date set at Jul. 31 2012. Bundit may have completed the task on Jul. 30, 2012. Natto may have closed the task on Jul. 30 2012. This means that Bundit completed the task within the target. The status may show a 100% achievement rating.

Figure 11C:
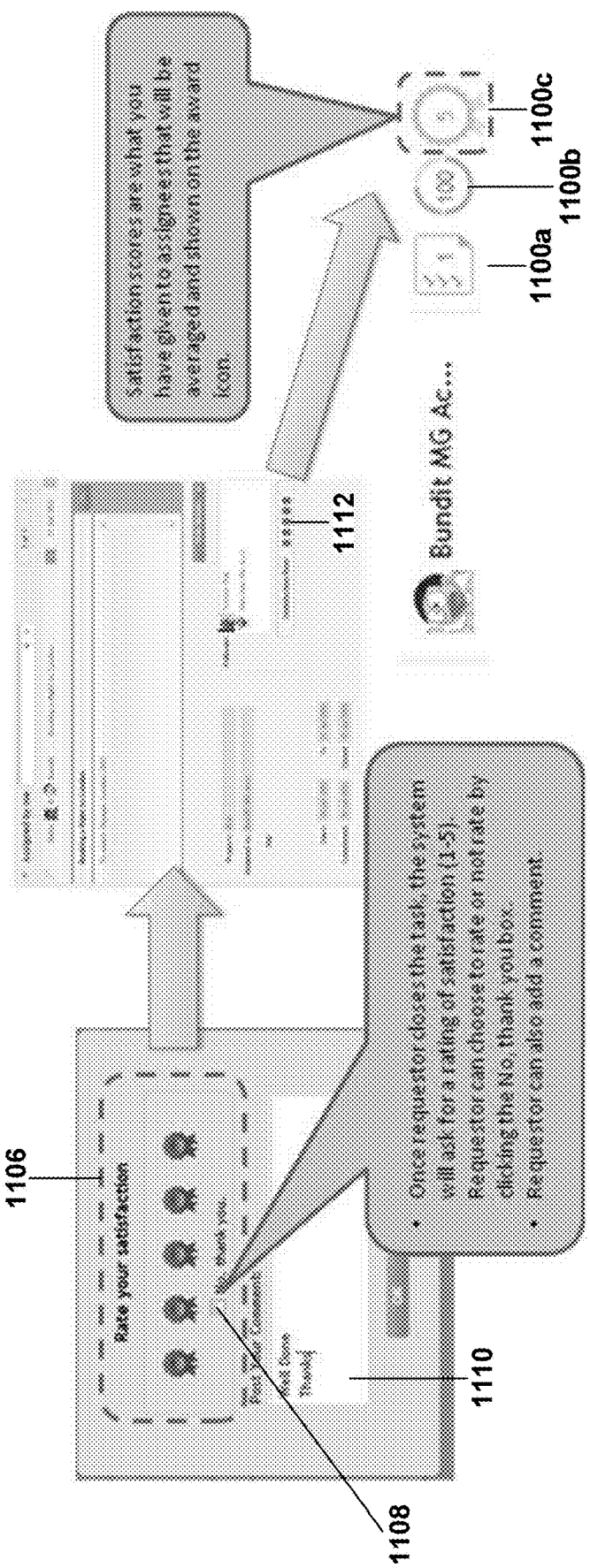
FIG. 11C provides an additional example of user interfaces that may display a colleague's performance and statistics, in accordance with an embodiment of the invention.

FIG. 11C provides an additional example of user interfaces that may display a colleague's performance and statistics, in accordance with an embodiment of the invention. An individual's performance indicators 1100*a*, 1100*b*, 1100*c* may be displayed with other information about the individual, such as the individual's name.

The performance indicators may include a satisfaction score 1100*c* performance indicator. The satisfaction score may show the average satisfaction score that the requestor gave each assignee. This may be provided for past tasks performed by the individual. In some instances, this may include all tasks that the individual has ever performed under the project management system. In another example, this may only include a certain subgroup of tasks, or may include tasks within a certain timeframe. In some embodiments, a requestor may see the score calculated based on a task he or she assigned to the individual only. This may calculate the tasks that are in closed status. In some instances, this may only calculate the tasks that the requestor gave a satisfaction score (i.e. excluding unrated tasks).

For example, once a requestor closes a task, the system may ask for a rating of satisfaction 1106 (e.g., 1-5, 1-10, 1-100, or any other satisfaction values). A requestor may choose to rate or not to rate by clicking on an option not to rate 1108 (e.g., no thank you box). A requestor may also provide a comment 1110.

When a requestor is closing out the task, the satisfaction rating 1112 may appear on the user interface. The satisfaction score that was given to the assignee may be averaged and shown in as a performance indicator, such as an award icon. The satisfaction score may be provided as any visual symbol or icon. The satisfactory score may include a numerical value indicative of the average satisfaction ratings.

User interfaces may be provided which may include information about assignees or potential assignees. For example, a list of team members may include information about various individuals. Such a list may include one or more performance indicator displayed in a manner that s visually mapped to the individual's name or other identifier of the individual. In another example, user interfaces, such as 'assigned by me' interfaces, 'assigned to me' interfaces, or 'followed by me' type interfaces may include information about various tasks and assignees to whom the tasks have been assigned to. When a requestor views options for assigning a task to an individual, the performance indicators may be displayed with the individual's name or other identifier. One or more performance indicator may be displayed in a manner that is visually mapped to the assignee's name or other identifier of the assignee. Thus, a requestor may, at a glance, have a summary of the potential assignee's past performance evaluations. The same user interface that is used to assign a task may also provide past feedback information about individuals.

One or more performance indicator may be visually mapped to an identifier of an individual. The identifier may be the individual's name, picture, identification number, or any other identifier of the individual. One, two, three or more performance indicators may be displayed with the identifier. The performance indicators may be visually mapped to the identifier. For example, the performance indicators may be displayed in the same row or same column as the identifier. The performance indicators may be displayed linearly with the identifier.

The performance indicators may be displayed as icons or symbols, or any other visual representation. The performance indicators may have numerical values relative to the performance evaluation. For example, the performance indicators may include one or more, two or more, or three or more of: tasks in process, achievement rating, and/or satisfaction score. The visual representations may include an image of a document, an image of a circle, and/or an image of an award, respectively. Other representative shapes or visual representations may be used. The numerical values may include the number of tasks in process, the percentage of tasks completed on time, and/or the average satisfaction rating, respectively. The performance indicators may have a small size. The height of the performance indicators may be no more than 1×, 1.1×, 1.3×, 1.5×, 1.7×, 2.0×, 2.5×, or 3.0× the height of the identifier (e.g., user's name or image).

Figure 12A:
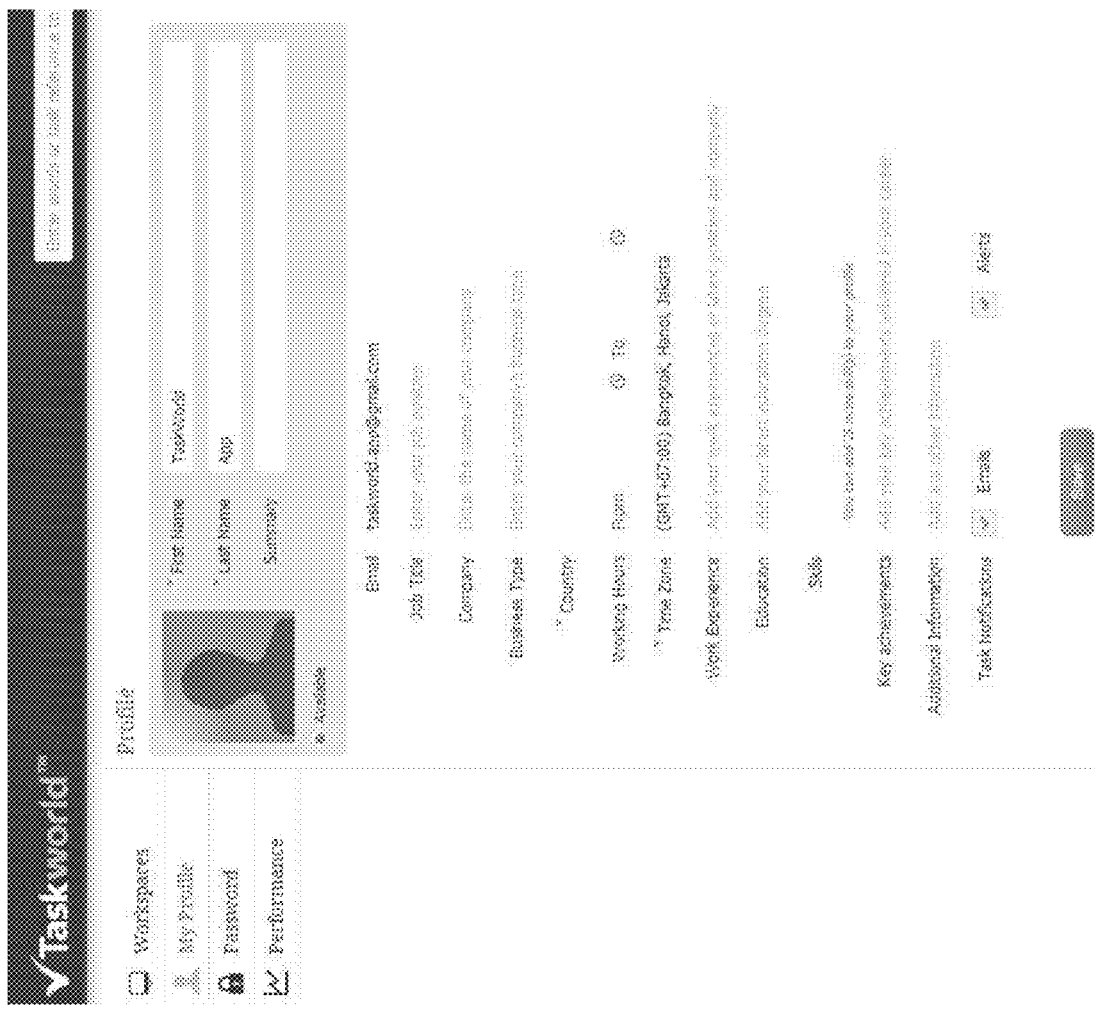
FIG. 12A provides an example user interface for a user to view and/or edit the user's profile information, in accordance with an embodiment of the invention.

FIG. 12A provides an example of a user interface for a user's profile and account settings, in accordance with an embodiment of the invention. Users can input information into their profiles using content from the system, and may make their profile available publicly if they wish. In some instances, users may be employees of a company or other organization. In other embodiments, users may be freelancers, contracts, or consultants of the company/organization. The user need not be an employee of the company/organization.

Examples of information that may be provided in a profile may include any of the following: the individual's name (e.g., first name, last name), password, job title, working hours, time zone, contact information (e.g., email, phone, address), country, business type, company, position, summary (e.g., of position, work experience or a personal introduction), skills (e.g., selected from a group of pre-existing keywords or entered new), key achievements, education, work experience, and any other information. Some or all of the above-discussed fields may be required fields. For example, in an embodiment, the first name, last name, country, and time zone are required fields.

The user may upload a picture to set as the profile picture by browsing and selecting a picture file from a local or remote device or via a drag-and-drop interface.

The user may set task notification preferences for receiving task notifications. For example, the user may elect to receive task notifications via e-mail, via the alert icon, or both. The user may also elect to turn off both methods of notifications.

The profile may include options to link the profile to one or more social networking site. For example, a user may enter the user's Facebook site, LinkedIn site, Twitter site, or Google+ site. The user may have the option of saving or submitted the information.

The user may change the user's password at anytime by going to the "Account Settings" page and clicking on a "Password" section from the menu. On the "Change Password" page, the user may be required to enter the current password, new password, the confirmed the new password and then submit the changes (e.g., via a "Submit" button).

In some instances, other members of the user's team may view the user's profile information. For example, a user may view a colleague's profile by clicking on the colleague's name in the "Colleagues" page. A project creator or requestor may be able to view the user's profile information in determining task assignment or assessment. The user may be able to control who can see the user's own profile.

Figure 12B:
FIG. 12B provides an example user interface for a user to view and/or edit the user's profile information and performance information, in accordance with an embodiment of the invention.

FIG. 12B provides an example user interface for a user to view and/or edit the user's profile information and performance information, in accordance with an embodiment of the invention. In this example, the user interface includes a profile pane or board 1202 for displaying and/or editing user profile information as well as a performance pane or board 1204 for displaying performance-related information. In various embodiments, the profile pane 1202 and performance pane 1204 may be displayed in the same or separate user interfaces. In an embodiment, the profile pane 1202 may be similar to the user profile discussed in connection with FIG. 12A. For example, the profile pane 1202 may be used to display and/or allow entry or edit of the user's picture, username, password, availability status (e.g., available, unavailable), name (e.g., first name, last name), contact information (e.g., email, phone, address), password, country, business type, company, position, summary (e.g., of position, work experience), work hours (e.g., start time, end time, time zone), skills (e.g., selected from a group of pre-existing keywords or entered new), education (e.g., institution, degree, major), experience, and any other information. Additionally, the profile pane 1202 may include options to link the user's profile to the user's account(s) in one or more social networking site such as Facebook, Linkedin, Twitter, Google Plus and the like. Various controls such as text box, dropdown list and the like may be provided to facilitate the entry of information. In an embodiment, a user may have the option(s) of edit and/or save the profile information discussed above.

In an embodiment, a performance pane 1204 may be displayed with the profile pane 1202. The performance pane 1204 may include a search pane 1206 where a user may enter search criteria for the user's own tasks and/or tasks that need the user's actions (e.g., assigned by others to the user) to customize the display of performance information. The search criteria may be based on fields such as account, project, requestor and the like. Some or all of the search criteria may be selected from a set of predetermined values (e.g., from a dropdown list or a check box), or entered directly (e.g., in a text field or box). In some embodiments, default search criteria may be provided for some or all of the search fields. In an embodiment, the available search fields may be configurable.

In an embodiment, the performance pane 1204 includes performance indicator panes that provide visual, textual, audio or any other representation of various performance indicators. In some embodiments, some or all of such performance indicators may pertain to the tasks returned by execution of search criteria specified in the search pane 1202 and may be based on the aggregation of tasks returned. In other words, the performance report may be customized according to criteria specified in the search pane 1206. For example, the performance indicator panes may include a report status pane or board 1208 that displays a report submission rate (e.g., an average) for the tasks returned by the search, a task status pane or board 1210 that displays, for example, in a pie chart, a breakdown of tasks according to their progress such as in progress, overdue, completed and the like, a achievement rating pane or board 1212 that displays, for example, in a line chart, the percentage of tasks achieved over a period of time, and a satisfaction score pane or board 1214 that display, for example, in a bar chart, average satisfaction scores given to the pertinent tasks over a period of time. In various embodiments, various visual or graphical representations such as tables, bar charts, pie charts, histograms, line charts and the like, textual representations (e.g., numbers, text), multimedia representations (e.g., audio and/or video clips) may be used to present the performance information discussed herein. In various embodiments, more or less performance or non-performance information than discussed herein may be provided. In some embodiments, the user interface may provide controls (e.g., links, buttons) for a user to export the performance information discussed herein in a predetermined or user-specified format (e.g., text file, HTML file, XML file, Microsoft Excel Sheet), to print the performance information or to perform other operations such as sharing the information via email or one or more social media sites such as Facebook.

In some embodiments, a user interface may be provided for viewing and/or editing a colleague's profile information and performance information. In an embodiment, such a user interface may be made available when a user clicks on a link or identifier associated with a colleague (e.g., name). In an embodiment, the user interface may be similar to the user interface discussed in connection with FIG. 12B. For example, user interface may include a profile pane or board for displaying and/or editing a colleague's profile information as well as a performance pane or board for displaying the colleague's performance information. The profile pane and performance pane may be similar to or different from the profile pane and performance pane, respectively discussed in connection with FIG. 12B. In various embodiments, the profile pane and performance pane may be displayed in the same or separate user interfaces.

In some instances, access control policies may be applied to restrict a user's access to some or all of a colleague's information. For example, a user may not be allowed to view and/or modify a colleague's password or other sensitive personal information. For another example, a manager or a person with administrative privileges may be able to view and/or modify more personal and/or performance information than a regular employee. Such access control policies may be provided by default and/or configurable by a user, a system administrator or the like.

In an embodiment, the profile pane includes a summary pane in addition to some or all personal information described in connection with the profile pane 1202 of FIG. 12B. The summary pane may include a brief summary of the colleague's personal and/or performance information. For example, the summary pane may include key personal information such as the colleague's name, position, email address, availability status and other information. As another example, the summary pane may include abbreviated icons or visual representations of various performance indicators such as report submission rate, task status, achievement rating, satisfaction score and the like.

In an embodiment, the performance pane includes a search pane where a user may enter search criteria to search for tasks associated with the colleague. For example, the search criteria may be based on the fields such as account, project, requestor and the like. As another example, the search criteria may include an indication of whether to search for individual tasks. Some or all of the search criteria may be selected from a set of predetermined values (e.g., from a dropdown list or a check box), or entered directly (e.g., in a text field or box). In some embodiments, default search criteria may be provided for some or all of the search fields. In an embodiment, the available search fields may be configurable.

In an embodiment, the performance pane displays performance indicators that pertain to the tasks returned by the search entered in the search pane. In other words, the performance report may be customized according to criteria specified in the search pane. For example, performance pane may include a report status board, task status board, achievement rating pane, and a satisfaction score board similar to the corresponding performance indicator boards discussed in connection with FIG. 12B. In various embodiments, more or less performance or non-performance information than discussed herein may be provided. In some embodiments, the displayed content may vary depending on the access rights and privileges associated with the viewer (e.g., manager, employee) of the information.

Figure 13:
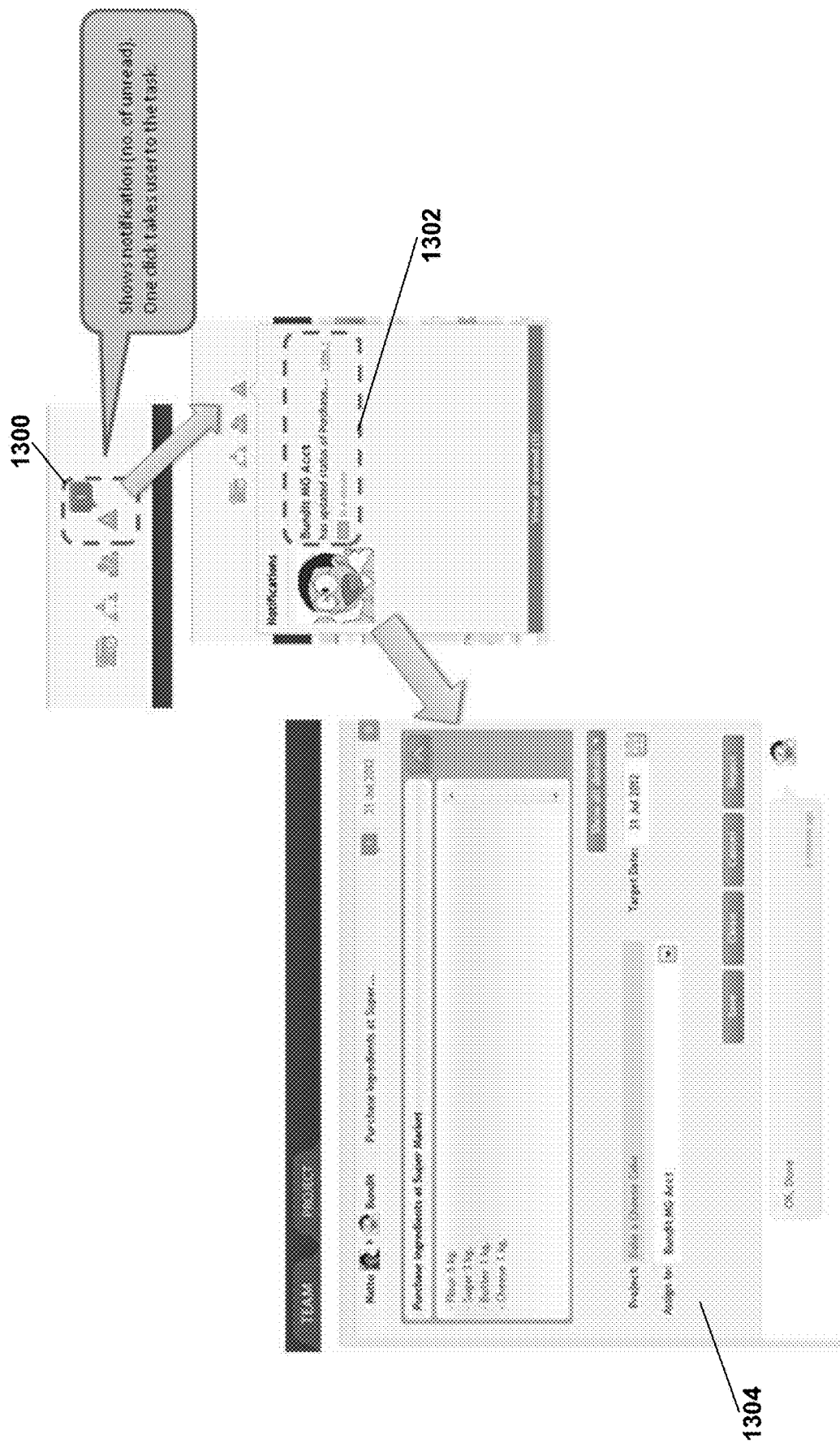
FIG. 13 shows an example user interface for providing alerts and notifications, in accordance with an embodiment of the invention.

FIG. 13 shows an example user interface for providing alerts and notifications, in accordance with an embodiment of the invention. For example, the system may have an alert message board for any new actions taken on a task.

A user interface may be shown, which may include one or more visual indicators of a notification 1300. The notification may include a number which shows the number of unread notifications. The notification may be displayed as a symbol or icon, or any other visual representation.

A user may click on the notification icon. This may show a summary 1302 of the unread notifications. For example, a pane or bubble may open up showing additional information about the notifications. A user may click on the summary in order to open a task page or other pertinent page.

A user may open a task page. In some instances, only one click may be required to open a task page. For example, as the summary indicates that Bundit has updated the status of the Purchase ingredients task, clicking on the summary may take the user to the updated status. Clicking on the notification may take the user to which ever page is pertinent to the alert.

The alerts may include recent updates or actions by other individuals. The alerts may also include reminders for tasks. The alerts or reminders may be provided as frequently as desired by the user. The alerts may be pushed alerts.

Figure 14:
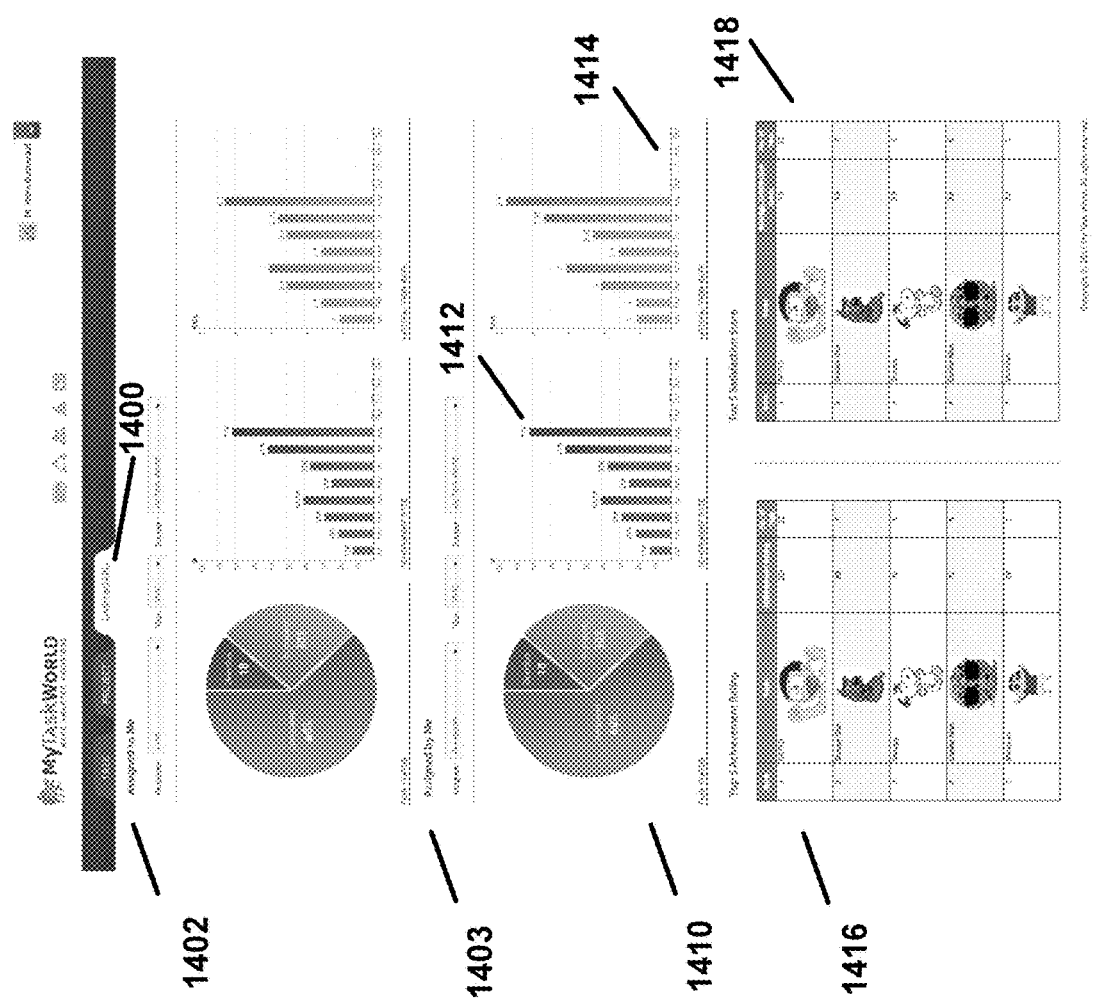
FIG. 14 shows an example of a dashboard in accordance with an embodiment of the invention of the invention.

FIG. 14 shows an example of a dashboard in accordance with an embodiment of the invention. The dashboard may be accessed via a 'dashboard' tab 1400. The dashboard may assist a user with making smart decisions and easily viewing key parameters. The dashboard may assist a requestor with assigning one or more tasks. The dashboard may provide an overall assessment of an individual's performance.

A dashboard may include one or more of the following sections: assigned to me 1402, assigned by me 1404, or followed by me. An assigned to me section may show stats relating to tasks assigned to the user. The user may be able to filter the stats according to one or more search parameter. For example, the user may be able to specify a requestor, year, and/or project name. An assigned by me section may show stats relating to tasks assigned by the user. The user may be able to filter the stats according to one or more search parameter. For example, the user may be able to specify an assignee, year, and/or project name. The assigned to me and the assigned by me sections may be displayed simultaneously on the same page. Alternatively, they may be displayed sequentially and/or on different pages.

Each section may include one, two, three or more charts to support user decisions. For example, a section may include a task status board 1410, achievement board 1412, satisfaction rate board 1414, top 5 achievement ratings 1416, and/or top 5 satisfaction scores 1418. In some instances, one or more charts (e.g., top 5 achievement ratings and/or top 5 satisfaction scores) may be provided in each of the sections, only one of the sections, or separately from the sections.

Figure 15:
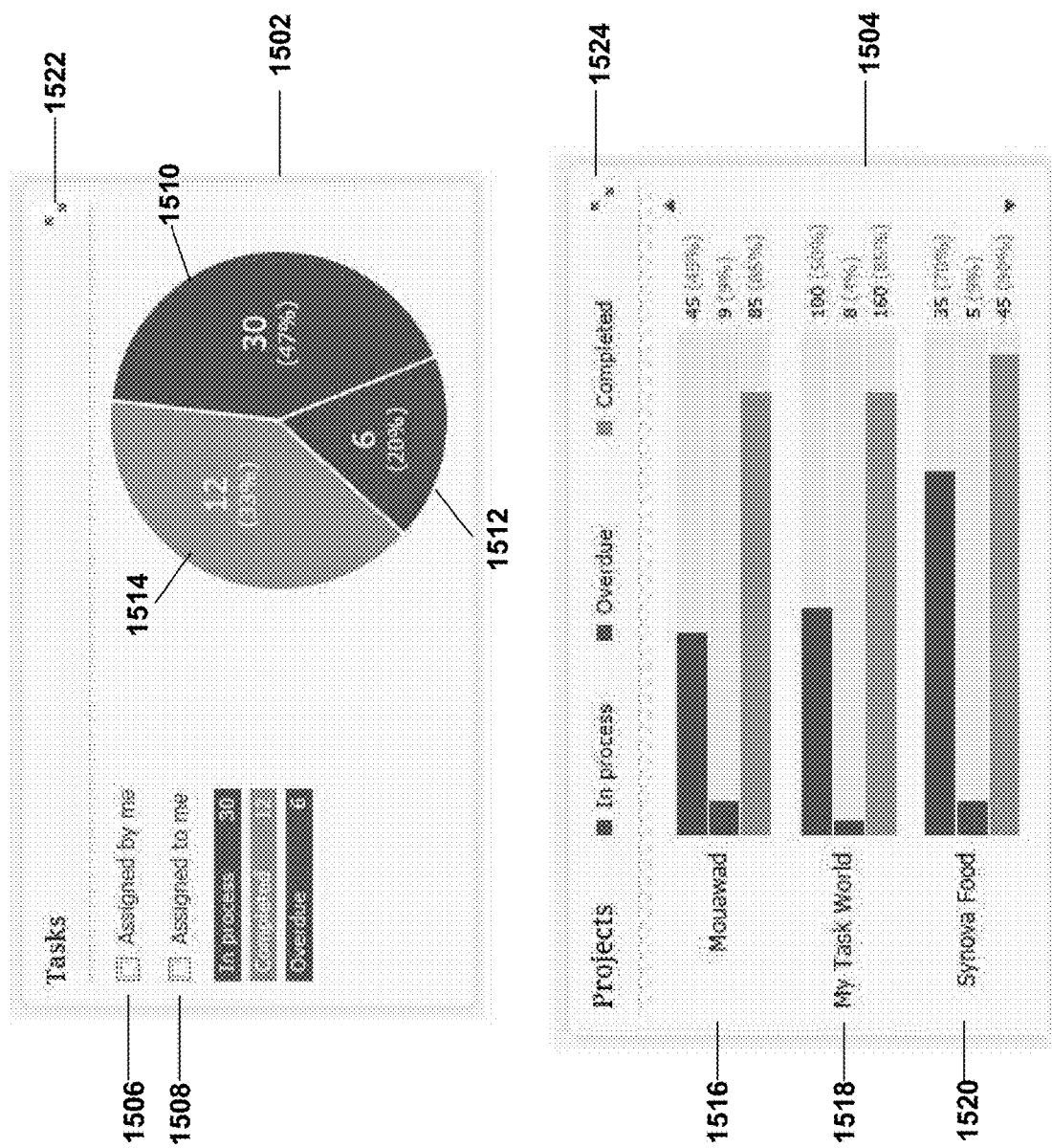
FIG. 15 shows an example task status board, in accordance with an embodiment of the invention.

FIG. 15 shows an example task status board, in accordance with an embodiment of the invention. The task status board may be used to provide information about the progress of tasks. In some instances, one, two, three, four, five, or more statuses for an active task may be provided. For example, three statuses may be provided, including (1) in process: work in progress within active target date, (2) overdue: work in progress beyond the target date, and/or (3) completed: assignee completed task back to requestor (waiting to be closed). The chart may or may not differentiate whether the completed task was performed within the active target date or beyond the active target date. The chart may show percentage totals for each tasks status, and/or the number of tasks in each task status.

In some embodiments, the task status board may be shown as a pie chart. Bar graphs, histograms, line charts, or any other visual representation may be used to show task status. In other embodiments, numerical values may be shown as the task status.

In an embodiment, the task status board includes tasks board 1502 that provides a visual representation of a breakdown of a plurality of tasks into categories according to their statuses. For example, in an embodiment, each task may be associated with one of three statuses including: (1) in process, used to indicate work in progress within active target date; (2) overdue, used to indicate work in progress beyond the target date; and (3) completed, used to indicate work that assignee completed and/or returned to requestor (waiting to be closed, e.g., by the requestor). In an embodiment, the visual representation may include a pie chart, bar graph, histogram, line chart and the like. The visual representation may show each category of the tasks with a number and/or a percentage of the tasks in the category. Other information may also be shown. In some embodiments, each distinct category may be distinctly represented, for example, using different colors, patterns, shapes, text and the like. In some embodiments, the tasks board 1502 and projects board 1504 may be maximized and/or minimized, for example, using controls 1522 and 1524.

In an embodiment, the task status board may provide a user with the ability to customize the tasks or projects for which the statuses are displayed. For example, in an embodiment, controls such as check boxes 1506 and 1508 may be provided for a user to specify whether to display statuses for only tasks assigned by a particular user, only tasks assigned to a particular user, or both. In other embodiments, the tasks may be filtered by other criteria such as project, account, time, requestor and the like.

In an embodiment, the task status board includes a projects board 1504 that provides a visual representation of a breakdown of a plurality of tasks into categories according to their associated projects as well as their statuses. For example, the projects board 1504 may provide a visual representation of a breakdown of tasks according to the projects (e.g., 1516, 1518 and 1520) that the tasks belong to. Within each project, the tasks may be further segmented according to their statuses (e.g., in progress, overdue, completed). For example, a bar chart may be provided for each project, wherein the bar chart may include a bar for each tasks in each status category, the bar may be associated with a number and/or a percentage of the tasks in the status category. In some embodiments, each distinct category may be distinctly represented, for example, using different colors, patterns, shapes, text and the like.

In other embodiments, tasks may be categorized and displayed according to other categories such as account, requestor, organization, team, and the like in addition to or instead of task statuses such as described above. In various embodiments, the information displayed including the content (e.g., tasks), format (e.g., type of chart used, font, color) and the like may be predetermined or configurable by a system administrator, user or the like.

Figure 16:
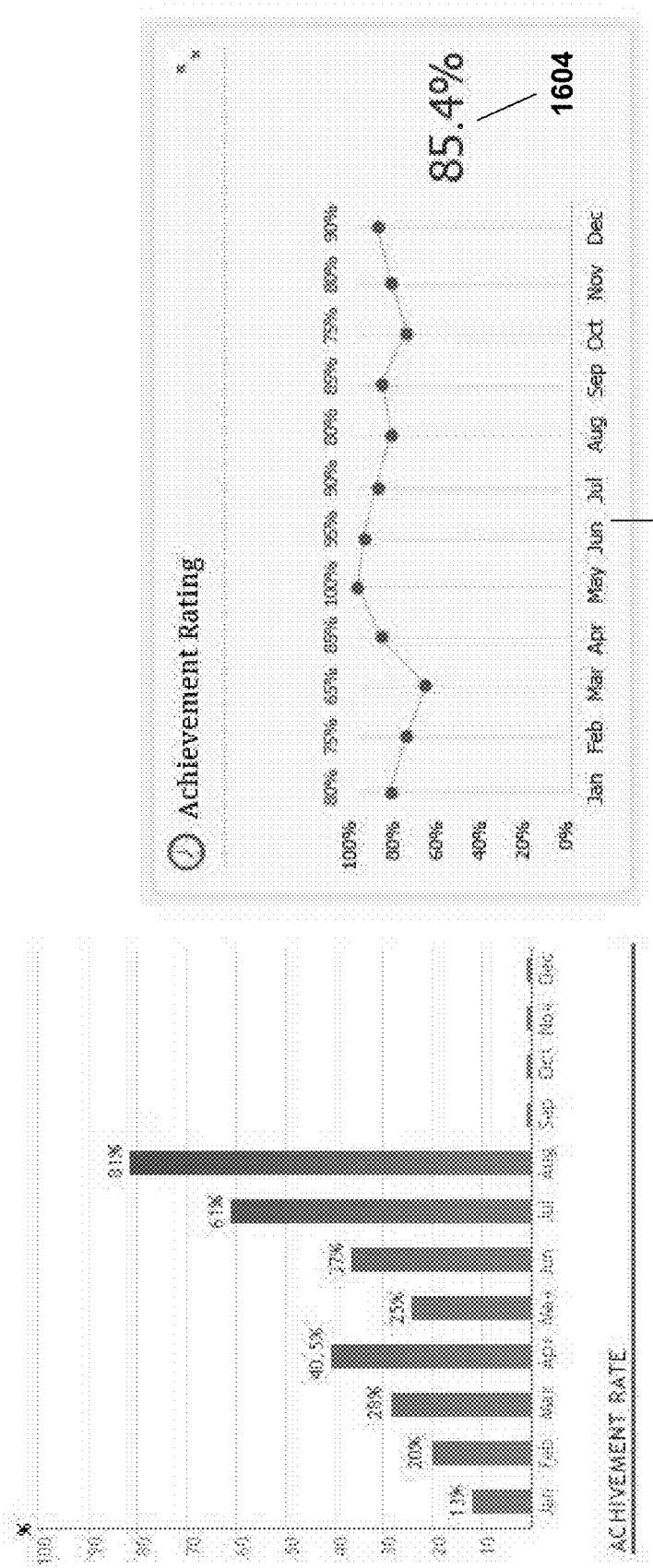
FIG. 16 shows examples of an achievement board, in accordance with some embodiments of the invention.

FIG. 16 shows examples of an achievement board, in accordance with some embodiments of the invention. The achievement board may show an achievement rating of a specific task over time. In some instances, the achievement ratings may be divided into periods of time. For example, the periods of time may be hourly, daily, weekly, biweekly, monthly, quarterly, or annually showing the achievement ratings. With the achievement board, the user can track deliverable performance to make comparisons between submit dates vs. target dates. In some instances, the achievement rating values may be shown as percentages (e.g., percentages of tasks within the time period completed by the target date), and/or numbers values (e.g., number of tasks within the time period completed by the target date).

In some embodiments, the achievement ratings may be shown using a bar chart (as shown on the left), line chart (as shown on the right), pie chart, histogram, or any other visual representation. In other embodiments, numerical values may be shown as the achievement ratings.

In an embodiment, the achievement board may provide a visual representation (e.g., a line graph 1602) of achievement ratings over a period of time at predetermined and/or configurable time intervals such as hourly, daily, weekly, biweekly, monthly, quarterly, or annually. In an embodiment, each achievement rating corresponds to a percentage of tasks that are achieved and/or submitted within the target dates versus the total tasks due for a particular period of time. For example, as illustrated in the line chart, the achievement rating for January is 80% meaning that 80% of the tasks that are due in January are submitted and/or completed by their target dates. Thus, the achievement rating board may be used to illustrate the trends of achievement ratings for a plurality of tasks over a period of time. In another embodiment, a task may be divided into subtasks or deliverables and each achievement rating may correspond to the percentage of subtasks that are achieved within target dates. Thus, the achievement rating board may be used to illustrate the trends of achievement ratings for a single task over a period of time. In an embodiment, an achievement rating 1604 may be provided that is derived (e.g., an average or a mean) from the achievement ratings over the illustrated period of time. In various embodiments, the information displayed including the content, format (e.g., type of chart used, font, color) and the like may be predetermined or configurable by a system administrator, user and the like.

The satisfaction rate or score board may show a satisfaction rate or score of a requestor's rating of an assignee over time. In some instances, the satisfaction scores may be divided into periods of time. For example, the periods of time may be hourly, daily, weekly, biweekly, monthly, quarterly, or annually showing the satisfaction scores. With the satisfaction rate board, the requestor can view improvements needed or satisfaction score of their assignees. In some instances, the satisfaction scores may be shown as numbers values (e.g., average satisfaction score for that time period), and/or percentages (e.g., average percentage satisfaction score out of a total highest value).

In some embodiments, the satisfaction rate board may be shown as a bar chart. Pie charts, histograms, line charts, or any other visual representation may be used to show satisfaction scores. In other embodiments, numerical values may be shown as the satisfaction scores.

Figure 17:
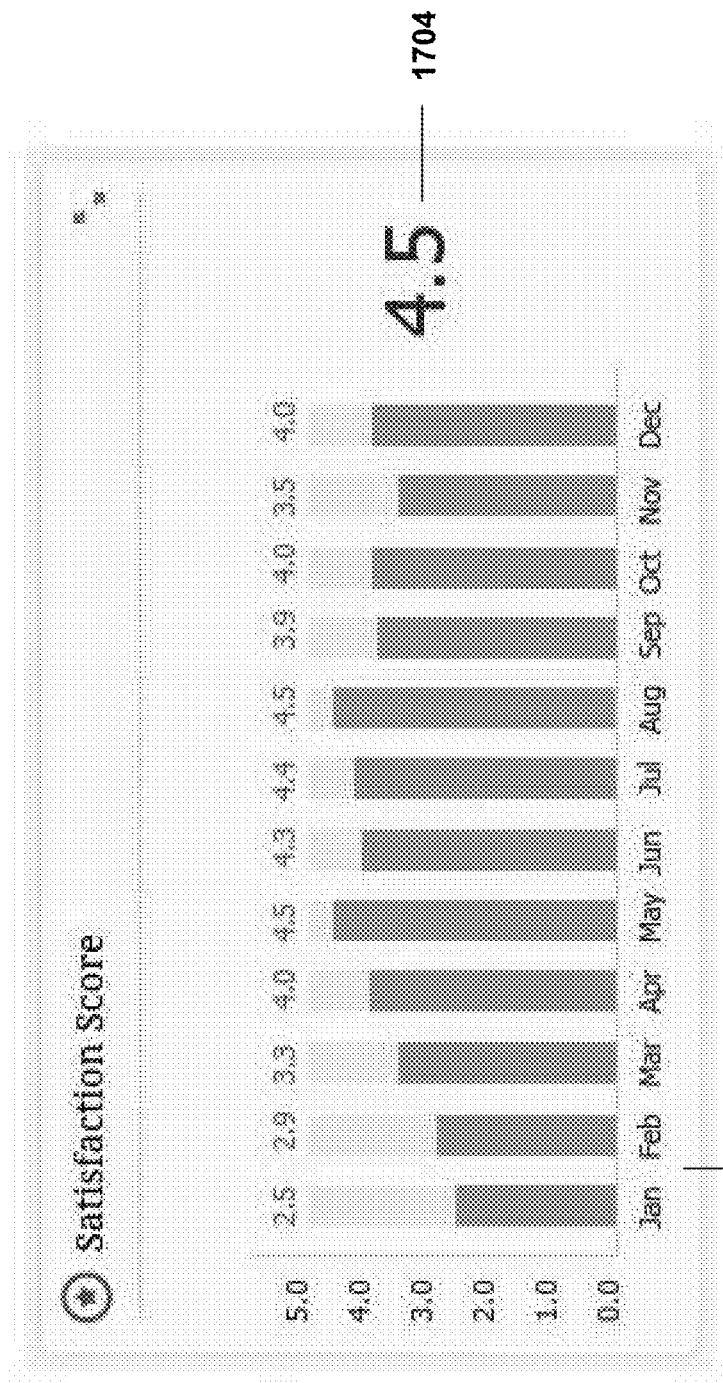
FIG. 17 shows an example of a satisfaction rate or score board, in accordance with an embodiment of the invention.

FIG. 17 shows an example of a satisfaction rate or score board, in accordance with an embodiment of the invention. In an embodiment, a satisfaction score may reflect a requestor's rating of an assignee's performance, for example, for a particular task, project, a plurality of tasks or projects or a sub portion of a task or a project and so on. In an embodiment, the satisfaction board may be used to display the satisfaction scores associated with a particular user or a group of users over a period of time, for example, in a bar chart 1702. Each satisfaction score may be associated with a particular period of time (e.g., January). In an embodiment, each satisfaction score is calculated based on one or more tasks that are completed or rated in the associated period of time. For example, if a user completed three tasks in the month of January with satisfaction scores 2, 2.5 and 3, respectively, then the average satisfaction score for the user for the January may be 2.5, the average of 2, 2.5 and 3. In another embodiment, the satisfaction score may be calculated on a cumulative basis. For example, the satisfaction score may be a running average of the satisfaction scores up to the current period or an average score per total. In some embodiments, a satisfaction score may be calculated as an average per total, or by project, by time period, account, by requestor and the like. Such selection may be customizable or configurable (e.g., using a search pane similar to the search pane 1206 discussed in connection with FIG. 12B) by a system administrator, a user or the like. Such a calculated satisfaction score may be displayed as a number 1704 in the satisfaction score board discussed herein.

A top achievement rating table may be provided. The table may show the top performers who have the highest percentage of success within the target dates. The table may show any number of top performers. For example, the table may show the top 1, 2, 3, 4, 5, 6, 7, 8, 9, 10 or more performers. The table may allow the requestor to see who is his or her best performer in terms of achievement ratings.

In some embodiments, the top achievement rating table may include the top performer name, rank, achievement rating and/or number of tasks. The performers may be displayed in order from highest rank down, or in reverse.

FIG. 18 shows an example of a top achievement rating table, in accordance with an embodiment of the invention. In an embodiment, the table shows the top performers (e.g., colleagues, teams) who have the highest percentage of success within the target dates. Each row of the table may correspond to a particular performer and each column of the table may correspond to an attribute associated with the performer such as rank, identity (e.g., name, picture), achievement rating, number of tasks and other information. The ranking may be based on the achievement rating of the performer and may be represented by a number, percentile or icon or any suitable representation. The achievement rating may be calculated (e.g., by taking the average, mean, maximum or minimum) based on one or more tasks associated with the performer (e.g., tasks assigned to the performer). The tasks used to calculate the achievement rating may be selected according to time period, project, account, requestor and the like. In various embodiments, the achievement rating table may be used to show any (customizable) number of performers in any (customizable) order (e.g., descending or ascending) based on their achievement rating and/or other criteria. Variations of the illustration embodiment are also contemplated. For example, instead of ranking the top performers, bottom performers or certain tier of performers may be displayed. As another example, achievement ratings may be ranked in conjunction with other performance indicators such as number of tasks, satisfaction scores and the like. In various embodiments, a user may be allowed to export, print, share or otherwise processed some or all information contained in the table discussed above.

A top satisfaction score table may be provided. The table may show the top assignees who have the highest satisfaction scores. The table may show any number of top assignees. For example, the table may show the top 1, 2, 3, 4, 5, 6, 7, 8, 9, 10 or more assignees. The table may allow the requestor to see who is his or her best assignee in terms of satisfaction scores.

In some embodiments, the top satisfaction score table may include the top assignee name, rank, satisfaction score and/or number of tasks. The performers may be displayed in order from highest rank down, or in reverse.

FIG. 19 shows another example of a top satisfaction score table, in accordance with an embodiment of the invention. In an embodiment, the table may be used to show the top assignees (e.g., colleagues, teams) who have received the highest satisfaction score. Each row of the table may correspond to a particular assignee or group of assignees and each column of the table may correspond to an attribute associated with the assignee or group of assignees such as rank, identity (e.g., name, picture), satisfaction score, number of tasks and other information. The ranking may be based on the satisfaction score associated with the assignee or group of assignees and may be represented by a number, percentile or icon or any suitable representation. The satisfaction score may be calculated (e.g., by taking the average, mean, maximum or minimum) based on one or more tasks associated with the assignee or assignees. In an embodiment, the number of tasks indicates the number of active task that an individual has. The tasks used to calculate the satisfaction score may be selected according to time period, project, account, requestor and the like. The table may be used to show any (customizable) number of assignees or groups of assignees in any (customizable) order (e.g., descending or ascending) based on their satisfaction scores and/or other criteria. Variations of the illustration embodiment are also contemplated. For example, instead of ranking the top assignees based on their satisfaction scores, bottom assignees or any tier of performers may be displayed. As another example, satisfaction scores may be ranked in conjunction with other performance indicators such as number of tasks, achievement ratings and the like. In various embodiments, a user may be allowed to export, print, share, or otherwise processed some or all information contained in the table discussed above.

Figure 20:
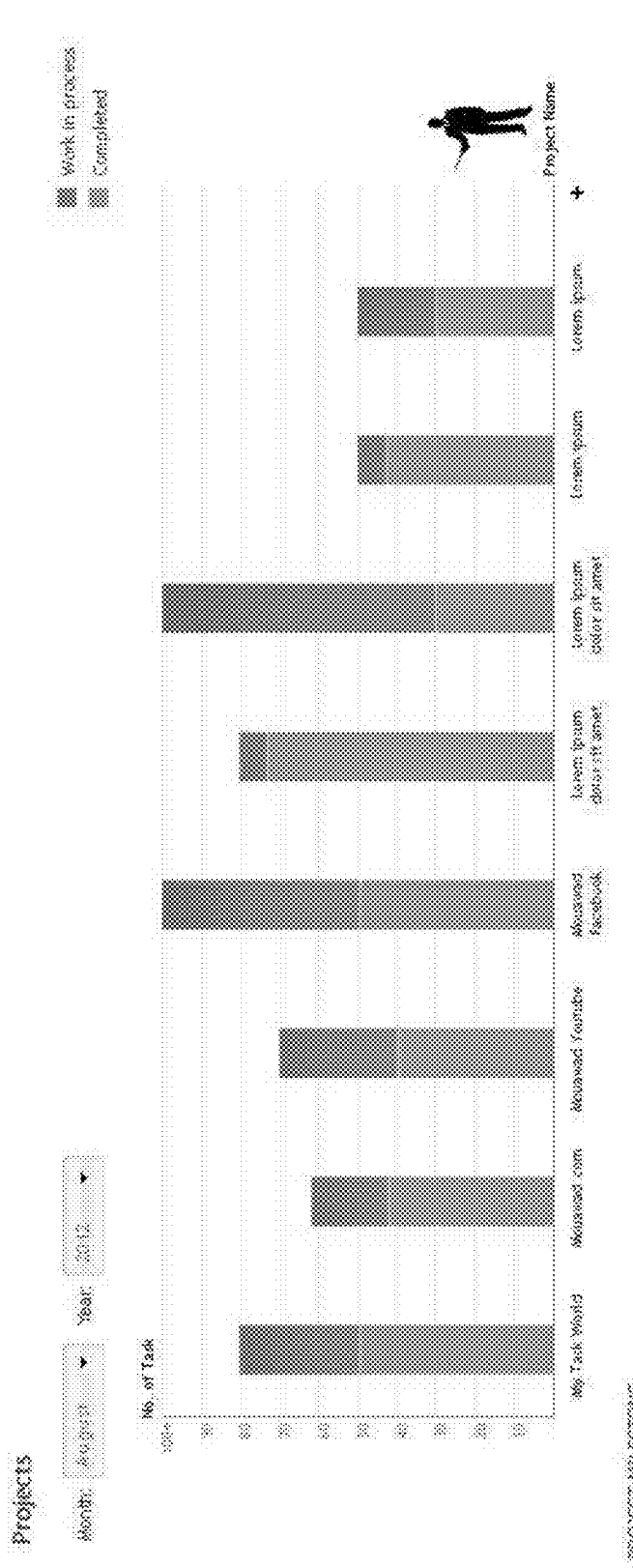
FIG. 20 shows an example of a project milestone chart, in accordance with an embodiment of the invention.

FIG. 20 shows an example of a project milestone chart, in accordance with an embodiment of the invention. The project milestone chart may be displayed on the dashboard or any other page displayed via the user interface.

If a user is a project owner or project leader, the project milestone chart can provide the user with a quick summary of tasks statuses for each project. For example, work in process (e.g., in process+overdue) may be shown in a first color 2002, while completed work (e.g., completed+closed) may be shown in a second color 2004. Once the bar is in the second color, it may mean that all tasks under that project were completed. In some instances, work in any number of categories/status may be shown in distinct colors.

One or more filter may be provided. In some examples, the filter may be a time period (e.g., specifying month, and/or year). The project milestones may be plotted on the chart. For example, various stages or sections of the project or multiple projects may be plotted out, e.g., on the horizontal axis. The number of tasks corresponding to each of the stages and/or sections may be shown, e.g., on the vertical axis.

Figure 21:
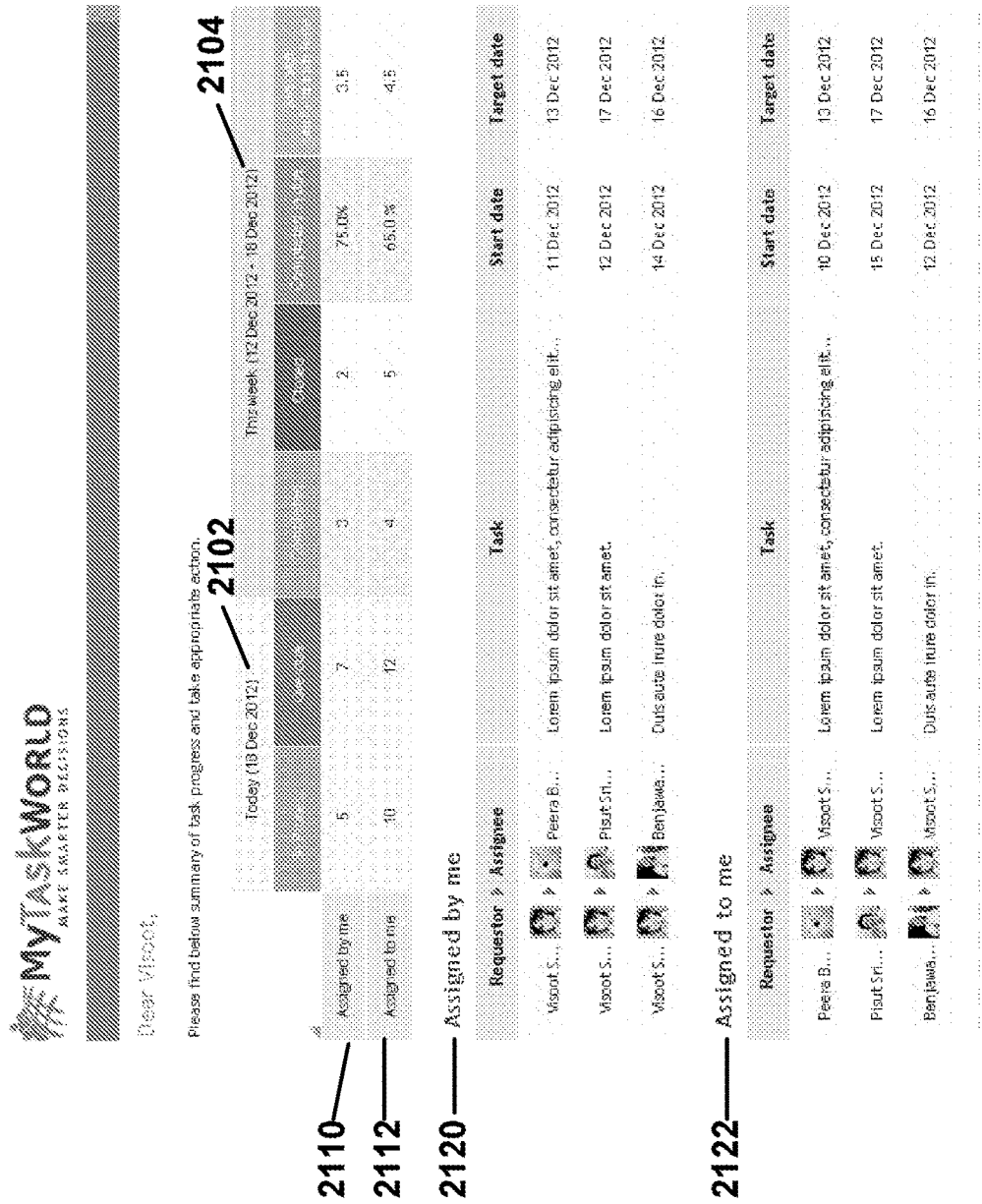
FIG. 21 provides an example of a task summary, in accordance with an embodiment of the invention.

FIG. 21 provides an example of a task summary in accordance with an embodiment of the invention. The task summary may be delivered to the user. The task summary may be delivered to the user via email, text message, or may be displayed on a section of a website that a user may access. The task summary may be pushed down to the user, or may be pulled by the user. The task summary may remind the user and report task statuses. A user may specify the frequency with which the task summary may be delivered to the user. For example, the report may be sent hourly, daily, biweekly, monthly, quarterly, or yearly.

In the task summary, a summary table may be displayed. The summary table may display the number of pending tasks 2102. The pending tasks may be separated by statuses, such as in-process or overdue statuses. The number of overdue tasks may be divided into categories such as my to-dos, assigned by me, assigned to me, following tasks, and the like. The task summary may also display the tasks that are due today, tomorrow and this week. The content of the task summary may be adjusted dynamically based on the statuses of the tasks, date, and the like. For example, if there are no tasks due today or tomorrow, the task summary may display what is due this week. The user may view the pending task information from table information displayed below each task. The task summary may be detailed by 'assigned by me' 2110 and/or 'assigned to me' 2112. They may be displayed along rows or columns. The task summary may also list the top N assignors and/or assignees for the user (where N is a positive number). To visit the task, a user may click on a hyperlink.

The user may also see performance stats from an earlier time period 2104. For example, the user may see performance stats from the previous day, week, bi-week, month, quarter, or year. The performance stats may include one or more of: completed task, closed task, achievement ratings, and/or average satisfaction rate. The earlier time period performance stats may be adjacent to the pending tasks. The earlier time period performance tasks may also be shown in 'assigned by me' and/or 'assigned to me' sections that may be displayed along rows or columns. In some embodiments, the user may see the top N most frequent of delays between assignor and assignee, the top N least or most frequent satisfaction scores between assignor and assignee, the N best or worst performers for a given period of time (e.g., for a week).

Additionally, sections may be provided detailing tasks in an 'assigned by me' section 2120 and/or an 'assigned to me' section 2122. These sections may have one or more features described elsewhere herein.

Figure 22:
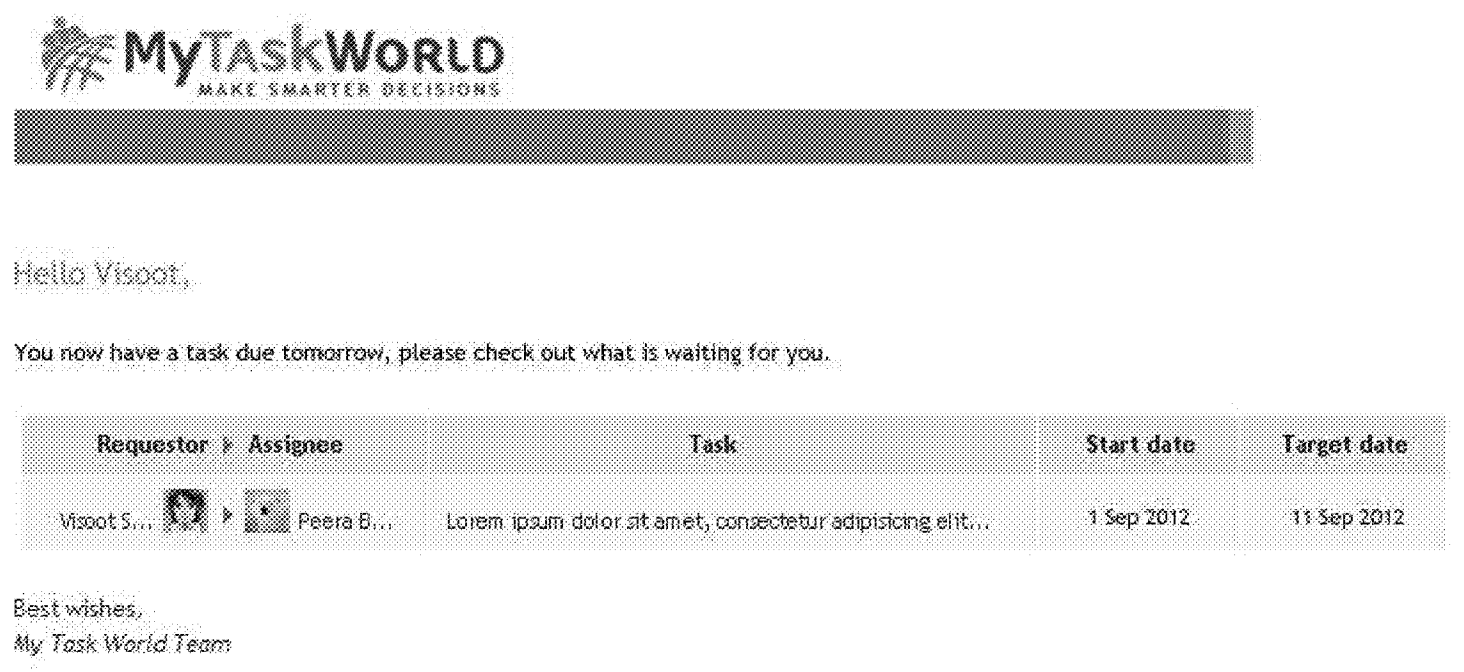

FIG. 22 provides an example of a task reminder, in accordance with an embodiment of the invention. The task reminder may be delivered to a user. The task reminder may be delivered to the user via email or may be displayed on a section of a website that a user may access. The task reminder may be pushed down to the user or may be pulled by the user. The task reminder may remind the user of important tasks. A user may specify the frequency with which the task reminder may be delivered to the user. For example, the reminder may be sent hourly, daily, biweekly, monthly, quarterly, or yearly. The reminder may be provided on an as-needed basis. For example, the reminder may be provided a specified time period in advance of an event (e.g., target date, due date). The system may automatically send the reminder email. The user may click on a hyperlink to set up a reminder per task.

Figure 23:
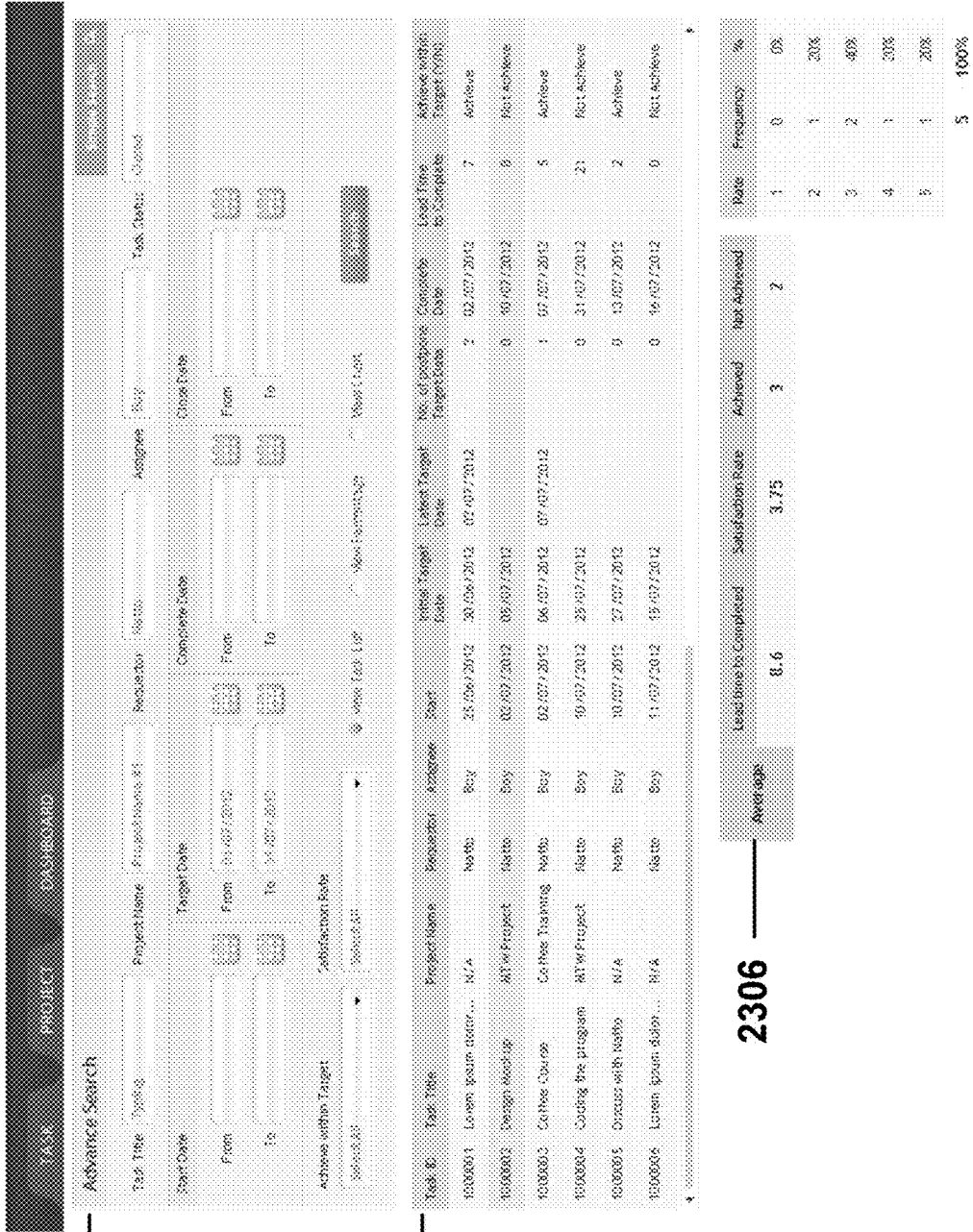
FIG. 23 shows an example of a task inquiry, in accordance with an embodiment of the invention.

FIG. 23 shows an example of a task inquiry, in accordance with an embodiment of the invention. The task inquiry may be used to see stats in other formats (e.g., spreadsheet such as Excel). A search section 2302 may be provided. The user may input specific criteria to retrieve specific data (e.g., task title, project name, requestor, assignee, task status, etc.). Time periods may be entered as an example of specific input criteria (e.g., start date, target date, complete date, close date). Additional examples of criteria may be whether the task was achieved within target, satisfaction rate.

Different views may be provided. For example, the results may be viewed as a task list. In other embodiments, view percentage and/or view chart options may be provided.

The results of the search may be displayed in a results section 2304. The search results may include information such as Task ID, task title, project name, requestor, assignee, start time, initial target date, latest target date, number of postponements of the target date, complete date, lead time to complete, and/or whether the assignee achieved within target. The results may be sorted by any of the information fields.

A summary section 2306 may also be provided, which may summarize the results that are returned in the results section. For example, the summarized information may include the average lead time to completed, average satisfaction rate, average achieved, average not achieved, rate, frequency, and/or percentage.

Figure 24:
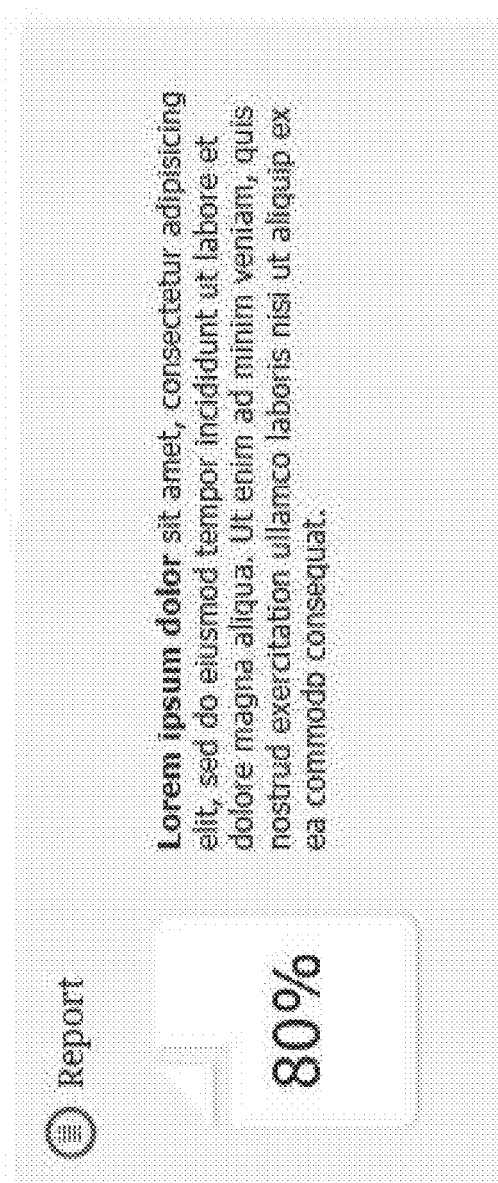
FIG. 24 shows an example report view, in accordance with an embodiment of the invention.

FIG. 24 shows an example report view, in accordance with an embodiment of the invention. In some embodiments, an assignee of a task may be required to submit reports according to notification (e.g., by a requestor, a colleague, a system administrator or an automated alert process), a periodic schedule (e.g., daily, weekly, monthly, yearly), predetermined time (e.g., target submission date), the occurrence of predefined and/or configurable events (e.g., task milestones such as completion of a deliverable) and the like. In some embodiments, a report is associated with a target date that, in some instances, may or may not be based on a target date of a deliverable such as a task or a subtask. For example, a report target date may be set to be within a grace period (e.g., 2 days) of a task target date.

In some embodiments, a user may submit a report via a user interface such as a web interface or other application programming interface (API). In some embodiments, a validation process may be implemented to validate a submitted report and/or reject an "unqualified" report. A report may be considered unqualified if it fails to conform to certain predetermined and/or configurable requirements regarding various aspects of the report such as content, format, source, time and the like. For example, in an embodiment, a report is rejected if it is submitted after a certain predetermined date.

In an embodiment, a report view, such as illustrated in FIG. 24 may be provided to facilitate the tracking of report delivery performance for an individual or a group of individuals. For example, the report delivery performance may be measured by a report submission rate calculated as a percentage of the number of report submitted within their target dates and the number of total reports that should have been submitted. In some cases, the total reports that should have been submitted may be measured by the number of report-soliciting requests sent. In some embodiments, the report submission rate may be associated with an individual or a group of individuals (e.g., a team). In other embodiments, the report submission rate may be further qualified by time, project, account, task status, and other parameters.

In an embodiment, the report view may provide a visual representation of a report submission rate (e.g., using an icon and a percentage symbol) as well as other information such as descriptive text. In some embodiments, the content and the format of the report view and any other views or any other user interface components discussed herein may be predetermined and/or configurable (e.g., by a system administrator or a user). For example, the content and format of the report view or any other user interface components described herein may be customized according to the locale, language, time zone and the like of the viewer of the report view or the user interface components.

Figure 25:
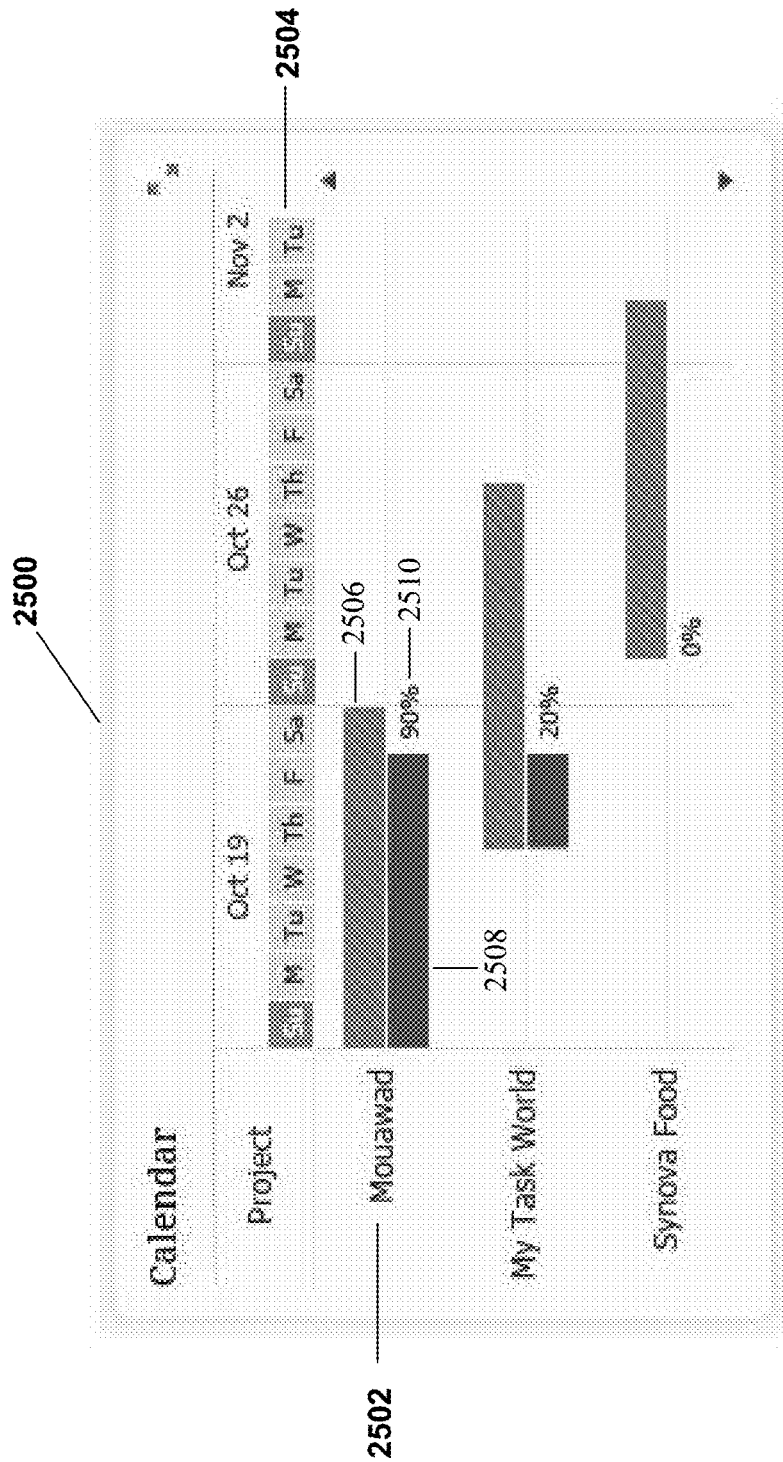
FIG. 25 shows an example calendar view, in accordance with an embodiment of the invention.

FIG. 25 shows an example calendar view, in accordance with an embodiment of the invention. In an embodiment, the calendar view may be used to show a timeline of the projects and/or tasks with a comparison between the planned dates and the current date. In particular, for each project or task associated with (e.g., assigned to or assigned by) a user or a group of users, a percentage of the current time used or lapsed for the particular project or task may be calculated over the total time planned or allocated for the project or task.

For example, assuming that a project "Big Project" is associated with a planned start date of Nov. 1, 2012 and a planned end date of Nov. 30, 2012, the total planned time for the project is 30 days. Further, assuming the current date is Nov. 5, 2012, the current time used is 5 days (since the planned start date of Nov. 1, 2012). Thus, according to an embodiment, the percentage of current time used is calculated as (current time used/total time used)*100=(5/30) *100=17%. This means that 17% of the total planned time for the project has been used and 100%-17%=83% of the total planned time is still available to finish the project on time.

In the illustrated embodiment, a Gantt chart 2500 is used to visually illustrate start time, end time, used time and other information for various projects 2502 associated with a user or a group of users in the context of a calendar 2504. The calendar 2504 may show time in units such minutes, hours, days, weeks, months years and the like. For each project 2502, a total time bar 2506 may be used to illustrate to the time between planned start time and finish time in the calendar 2504. Further, a used time bar 2508 may be used to illustrate the time that has elapsed from the planned start time to the current time. In addition, a percentage 2510 may be used to illustrate the percentage of used time over the total time. In other embodiment, the used time bar 2508 may be illustrated as part of the total time bar 2506. In some embodiments, the total time bar 2506 and the used time bar 2508 may be illustrated distinctly, for example, using distinct colors, patterns or the like.

In various embodiments, more or less information than illustrated may be provided in the calendar view. For example, a vertical line may be used to illustrate the current date. In some embodiments, the Gantt chart may be used to illustrate tasks and/or subtasks instead of or in addition to projects. In various embodiments, the tasks or projects illustrated may be further qualified by time period, account, requestor, assignee, team, and other parameters. In some embodiment, the projects and/or tasks may be represented by visual representations other than a Gantt chart.

Figure 26A:
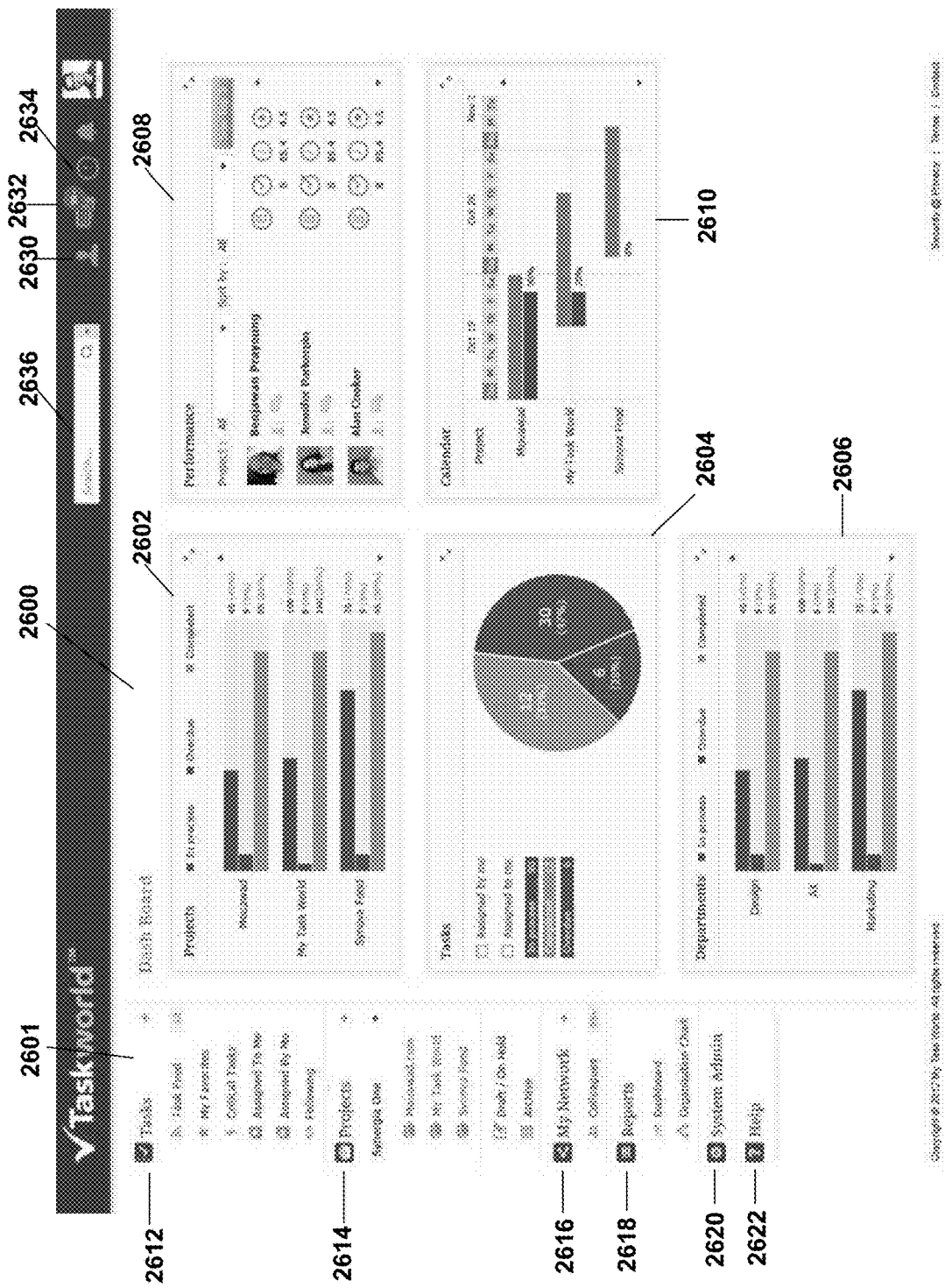
FIG. 26A shows an example user interface displaying a dashboard view, in accordance with an embodiment of the invention.

FIG. 26A shows an example user interface displaying a dashboard view 2600, in accordance with an embodiment of the invention. The dashboard view may provide an overall view of key performance indicators for tasks and/or projects pertinent to a user so as to help the user make intelligent decisions. In an embodiment, the dashboard view may be accessible to a user by clicking a "Dashboard" tab or similar link and/or control.

In an embodiment, the dashboard view 2600 includes one or more sections such as a projects section 2602, tasks section 2604, departments 2606, performance section 2608 and calendar section 2610 and the like. Each section may be used to illustrate one or more performance indicators or one or more aspects of a performance indicator. For example, the projects section 2602 may provide a visual representation of a breakdown of a plurality of tasks associated with a user or a group of users into categories according to their associated projects and/or their statuses (e.g., in progress, completed, overdue). In an embodiment, the projects section 2602 is similar to the projects board 1504 described in connection with FIG. 15. For example, the projects section 2602 may display, in a bar chart, various projects and the breakdown of tasks within the project according to their statuses. In an embodiment, the project section 2602 includes links to view further details of the project. For example, clicking on a project name may take a user to a project dashboard view such as discussed in connection with FIG. 27.

The tasks section 2604 may provide a visual representation of a breakdown of a plurality of tasks associated with a user or a group of users into categories according to their statuses. In an embodiment, the tasks section 2604 is similar to the tasks board 1502 described in connection with FIG. 15. For example, the tasks section 2604 may display a breakdown of the tasks according to their statuses in a pie chart. Additional controls (e.g., check boxes) may be provided to enable a user to select and/or filter the tasks used for the tasks section 2604. For example, a user may view only tasks assigned to the user, assigned by the user or both.

The departments section 2606 may provide a visual representation of a breakdown of a plurality of tasks or projects associated with one or more departments into categories according to their statuses (e.g., in progress, completed, overdue). In an embodiment, departments section 2606 is similar to the projects section 2602 described above, except the tasks and/or projects are broken down according to their departments, not projects. For example, the departments section 2606 may display, in a bar chart, various departments (e.g., "Design," "Marketing") and the breakdown of tasks or projects within each department according to their statuses.

The performance section 2608 may provide a visual representation of key performance indicators for a group of users such as members in a team. More details are provided in connection with FIG. 30.

The calendar section 2610 may provide a visual representation of a timeline of the projects and/or tasks with a comparison between the planned dates and the current date. In an embodiment, calendar section 2610 is similar to the calendar view discussed in connection with FIG. 25. In various embodiments, more or less performance information than illustrated may be provided. In some embodiments, various aspects of the dashboard view 2600 such as content, format, layout and the like may be customizable, for example, by a user or an administrator.

In an embodiment, the user interface that displays the dashboard view 2600 may also provide a navigation pane 2601 that contains automatic filters to specific views or provides links to commonly used sites or views. The links in the navigation pane 2601 may be grouped into sections according to their common characteristics. For example, the navigation pane 2601 may include a tasks section 2612 that includes one or more task related links such as a "Task Feed" link, for example, to a Rich Site Summary (RSS) feed, that provides real-time feed on all tasks related to the specific user. The tasks section 2612 may also include a "Task Due Today" link (not shown) to tasks with a target date of today. The tasks section 2612 may also include a "My Favorites" link to tasks that the user has indicated as favorite. The tasks section 2612 may also include a "Critical Tasks" link to tasks that have been indicated (e.g., by a requestor, assignee or administrator) as critical. The tasks section 2612 may also include a "My To-Do" link (not shown) to tasks that the user has created and assigned to the user himself or herself. The tasks section 2612 may also include an "Assigned to Me" link to tasks that have been assigned to the user currently viewing the dashboard and an "Assigned by Me" link to tasks that have assigned by the user currently viewing the dashboard. The tasks section 2612 may also include a "Following" link to tasks currently followed by the user. The tasks section 2612 may also include a "Task Archive" link (not shown) to tasks that have been closed and/or cancelled.

In an embodiment, selecting a link in one of the panes may cause a view associated with the link to expand to fill the rest of the screen.

Figure 27:
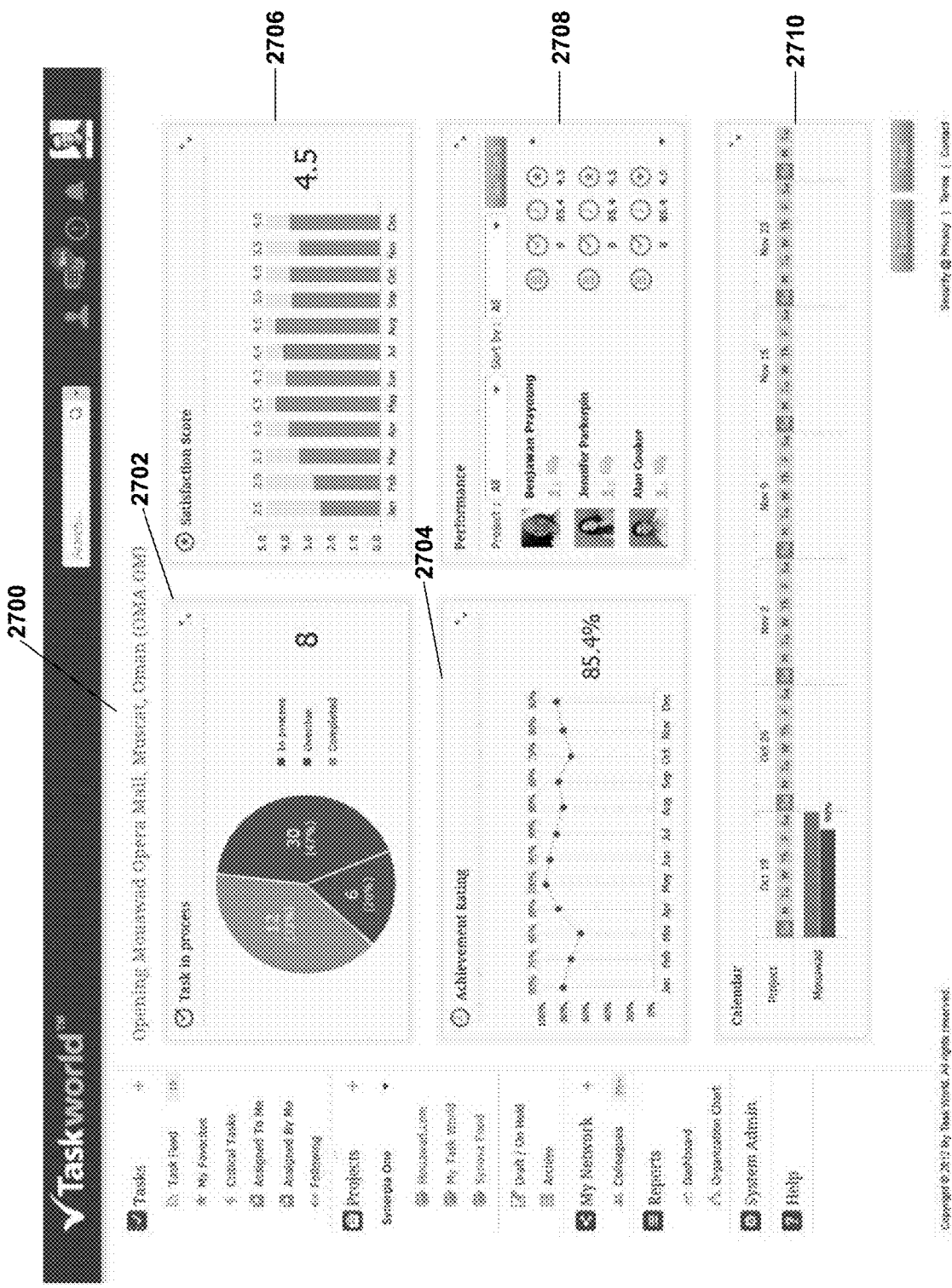
FIG. 27 shows an example user interface displaying a project dashboard view, in accordance with at least one embodiment of the invention.

The navigation pane 2601 may also include a projects section 2614 for one or more project related links. Projects section 2614 may include a link to view detailed information related to each available projects. For example, clicking on a project link may take a user to a project dashboard view such as illustrated in FIG. 27. In an embodiment, the project links may be organized and/or aggregated into a hierarchical structure with collapsible/expandable nodes. The projects section 2614 may also include a "Draft/On Hold" link to drafts (e.g., related to the projects) that are not submitted and an "Archive" link to archived information such as correspondence, saved documents and the like.

The navigation pane 2601 may also include a my network section 2616 for to store one or more links to people in a user's network such as colleagues, acquaintances, superior, subordinates and the like. Clicking on such a link may take a user to a college profile view such as discussed in connection with FIG. 12C. In an embodiment, The navigation pane 2601 may also include a reports section 2618 that include one or more links to various dashboards and/or report views such as a "Dashboard" link and a "Organization Chart" link. Clicking on the "Dashboard" link may take a user to the dashboard view currently described in connection with FIG. 26. Clicking the "Organization Chart" link may take a user to a view that displays a diagram showing the structure of an organization (e.g., the user's organization) and relationships of elements (e.g., positions, people, jobs) within the structure.

In an embodiment, the report section 2618 may also include a "My Metrics" link to a view that shows performance metrics associated with the current user. The metrics displayed may be calculated from the "Assigned to me" tasks. The report section 2618 may also include a "Colleague Metrics" link to a view that shows performance metrics associated with colleagues of the user (e.g., performance metrics associated with tasks assigned by the current user or "Assigned by me"). The report section 2618 may also include a "Project Metrics" link to a view that shows performance metrics associated with a project.

The navigation pane 2601 may also include a system admin section 2620 that include one or more links accessible to a system administrator. For example, the section may include links to add, remove or edit personal or performance information of users, to set up organizational structures, and the like. In various embodiments, visibility and/or accessibility of the system admin section 2620 and/or links therein may be controlled by access control policies. For example, a user with no administrative privilege may not see this section at all in his navigation pane 2620.

The navigation pane 2601 may also include a help section 2622 that include one or more links provide help to user. For example, clicking on a "Help" link may take a user to an FAQ of frequently asked questions, a form where the user may enter and submit questions or issues, a live chat session with an online representative or the like.

In various embodiments, more or less sections and/or links than discussed above may be provided by the navigation pane 2601. In an embodiment, the navigation pane 2601 stays in substantially the same relative position in the user interface as a user navigates to various views (e.g., by clicking on the links in the navigation pane or elsewhere). In an embodiment, the content of the navigation pane 2601 may be remain constant or change dynamically to provide context-sensitive navigation links. In addition, various aspects of the navigation pane 2601 such as content and layout may be customizable or configurable (e.g., by a user or administrator).

In an embodiment, the user interface that displays the dashboard view 2600 may also include one or more alert icons 2630, 2632 and 2634 provides notifications of various events related to the user. For example, the colleague request alert icon 2630 may be used to indicate the number of pending colleague requests sent to the user. The user may view and respond to the colleague requests by clicking on the colleague request alert icon 2630. The message alert icon 2632 may be used to indicate the number of unread messages (including chat messages) sent to the user. The user may view and respond to the messages by clicking on the message alert icon 2630. The activity alert icon 2634 may be used to indicate activities related to the tasks, projects or other objects related to the user or followed by the user. For example, the activity alert icon may be used to indicate that a certain task or project is completed, closed or cancelled by another user. The user may view details of the activities by clicking on the activity alert icon 2630.

In an embodiment, the user interface that displays the dashboard view 2600 may also include a search field 2636 that allows the user to search for tasks, projects, other users, or any other objects discussed herein. In an embodiment, the search results may be displayed in nearly real time as the search query is typed into the search field.

According to an aspect of the invention, user interfaces may be provided for users may be able to chat with or leave messages for other users. For example, a user may go to message alert (e.g., by clicking on the message alert icon 2632 discussed above) and select "Send New Message." Alternatively, the user find a colleague (e.g., from the "View Colleagues" page) and select a "Send Message" link associated with the colleague. In either case, a new message interface may be provided for the user to compose and/or send the message. The recipient of the message may be provided automatically by the system or entered by the user.

In an embodiments, messages between a user and colleagues are stored (e.g., in a data store). The user may view any stored messages, for example, by clicking the message alert icon and selecting the "View all Messages" option. A "Messages" page may be provided where the user may view the message history as well as adding more messages.

Figure 26B:
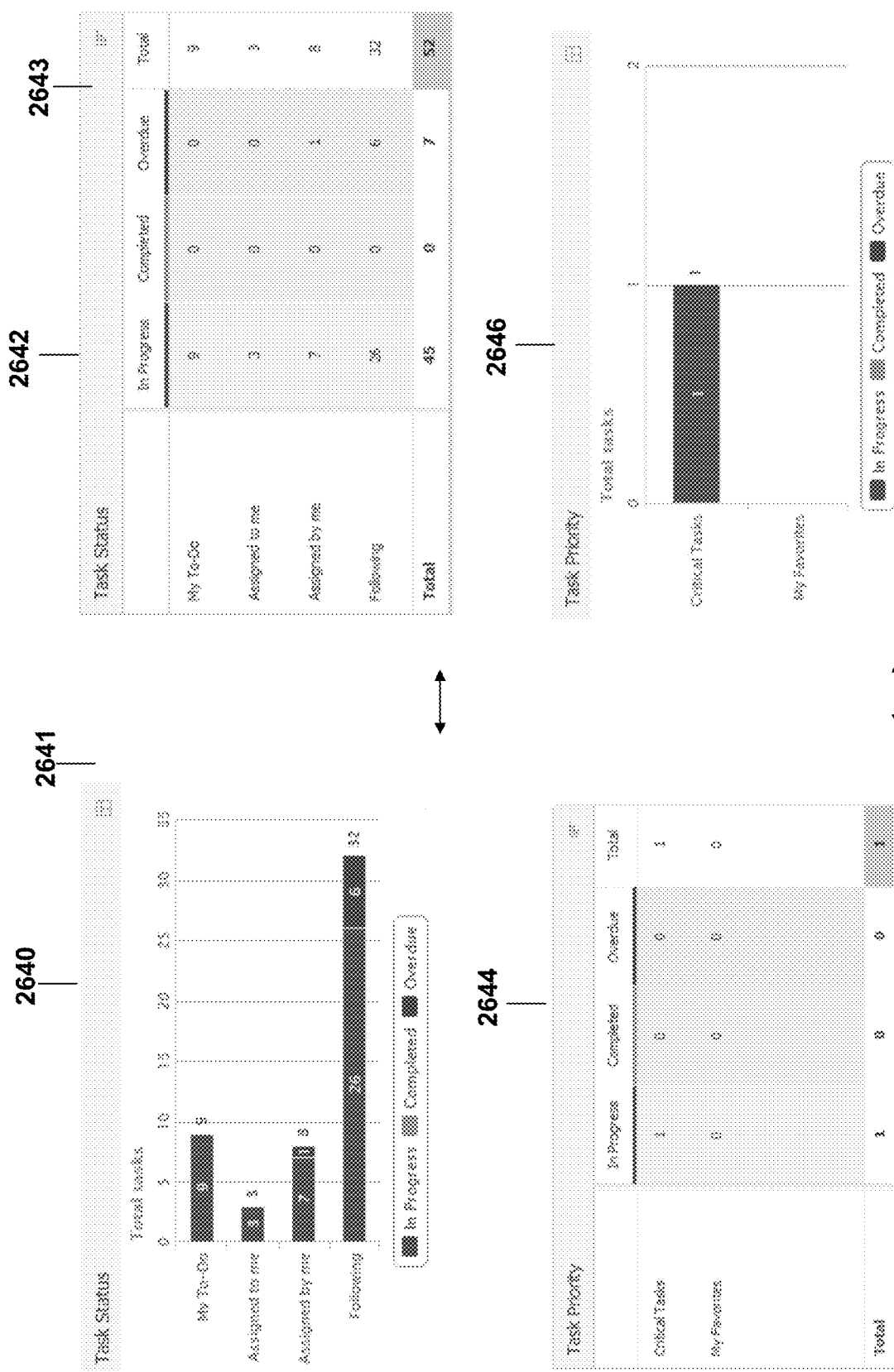
FIGS. 26B-D show example user interfaces for a Dashboard view, in accordance with an embodiment of the invention.
Figure 26C:
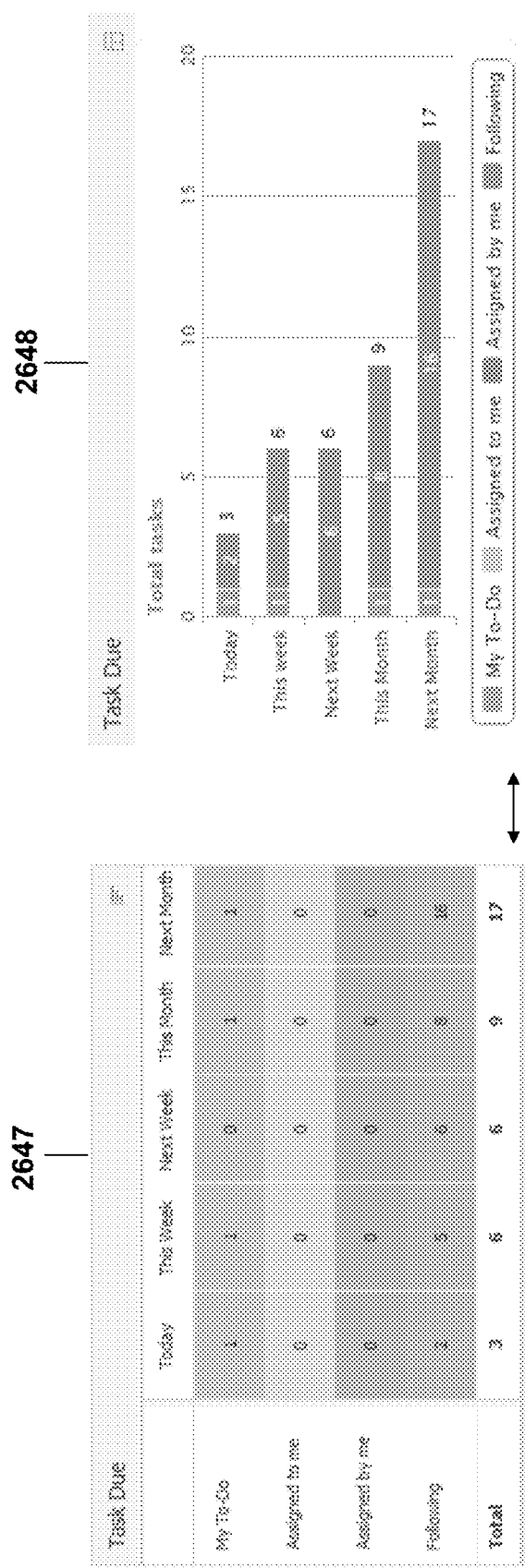
Figure 26D:
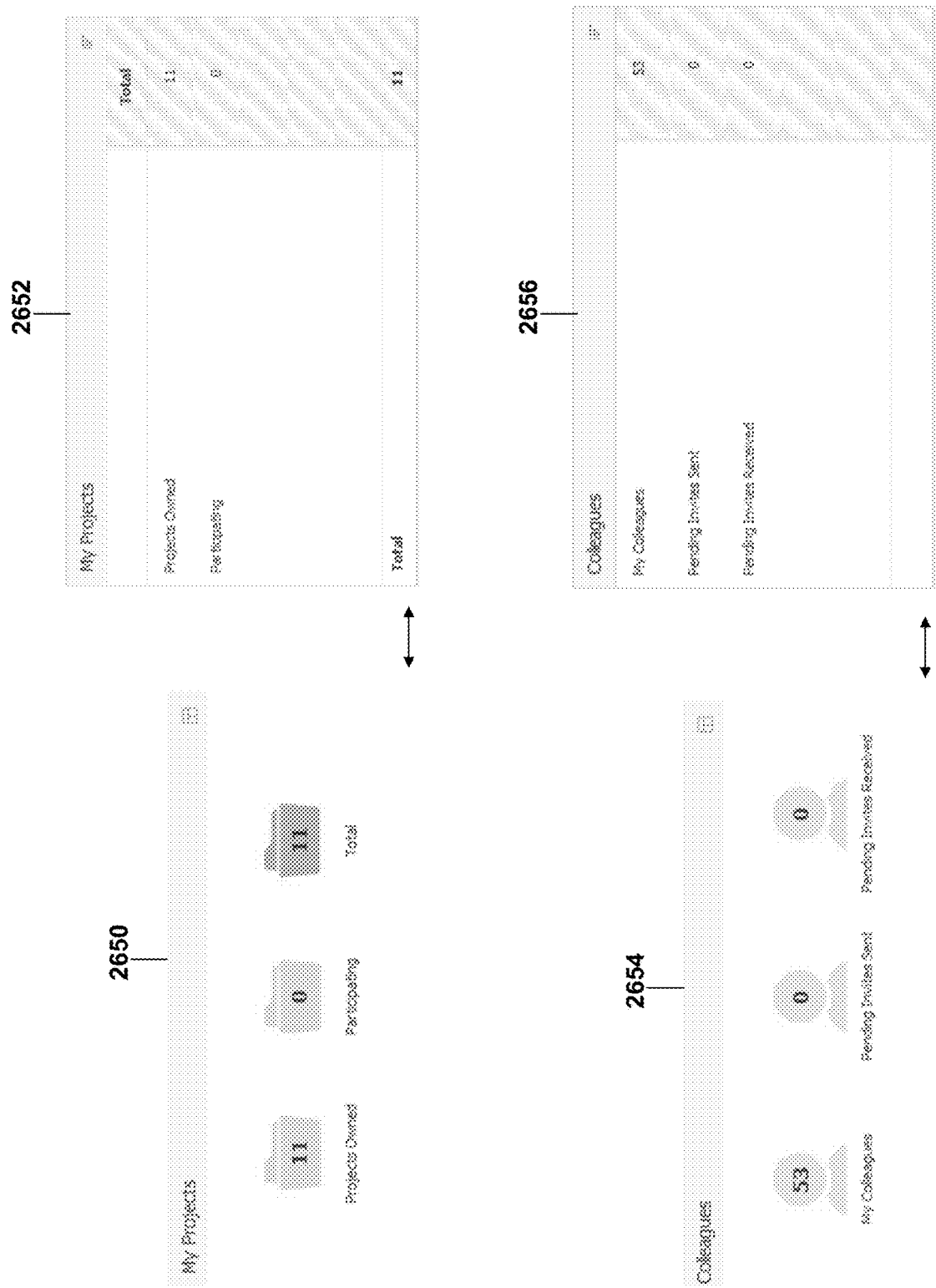

FIGS. 26B-D show example user interfaces for a Dashboard view, in accordance with an embodiment of the invention. The Dashboard view may provide a summary of key information such as related to task status, task priority, task due, my projects and colleagues. In an embodiment, the Dashboard view is provided, for example, when the user clicks on the "Dashboard" link under the report section 2618 of the navigation pane discussed in connection with FIG. 26A.

As illustrated in FIG. 26B, the Dashboard view may include a Task Status section 2640 that may include a summary bar chart of total tasks falling in each of the following categories: My To-Do, Assigned to me, Assigned by me and Following. Each bar of the bar chart may features easy-to-read, color-coded task status as "In Progress", "Completed" and "Overdue." Alternatively, the same information shown by the bar chart 2640 may be displayed in a tabular format 2642. The user may switch the display style or display format from the chart display to the tabular display by clicking on the toggle control 2641 associated with the chart display; or vice versa by clicking on the toggle control 2643 associated with the tabular display. In other embodiments, the user may be allowed to select between two different display styles than illustrated here (e.g., between pie chart and bar chart) or among more than two display styles.

As illustrated in FIG. 26B, the Dashboard view may also include a Task Priority section 2644 or 2646 that shows critical and favorite tasks. Similar to the Task Status section discussed above, the Task Priority section may be displayed in two or more different display styles that may be selectable by the user.

As illustrated in FIG. 26C, the Dashboard view may also include a Task Due section 2647 or 2648 that shows the number of tasks by the target dates. Similar to the Task Status section and Task Priority section discussed above, the Task Due section may be displayed in two or more different display styles or formats that may be selectable by the user.

As illustrated in FIG. 26D, the Dashboard view may also include a My Projects section 2650 or 2652 that shows the total number of projects which the user has owned and/or participated. Similar to the other sections discussed above, the My Projects section may be displayed in two or more different display styles that may be selectable by the user.

As illustrated in FIG. 26D, the Dashboard view may also include a Colleagues section 2654 or 2656 that shows the number of tasks by the target dates. Similar to the other sections discussed above, the Colleagues section may be displayed in two or more different display styles that may be selectable by the user.

Figure 26E:
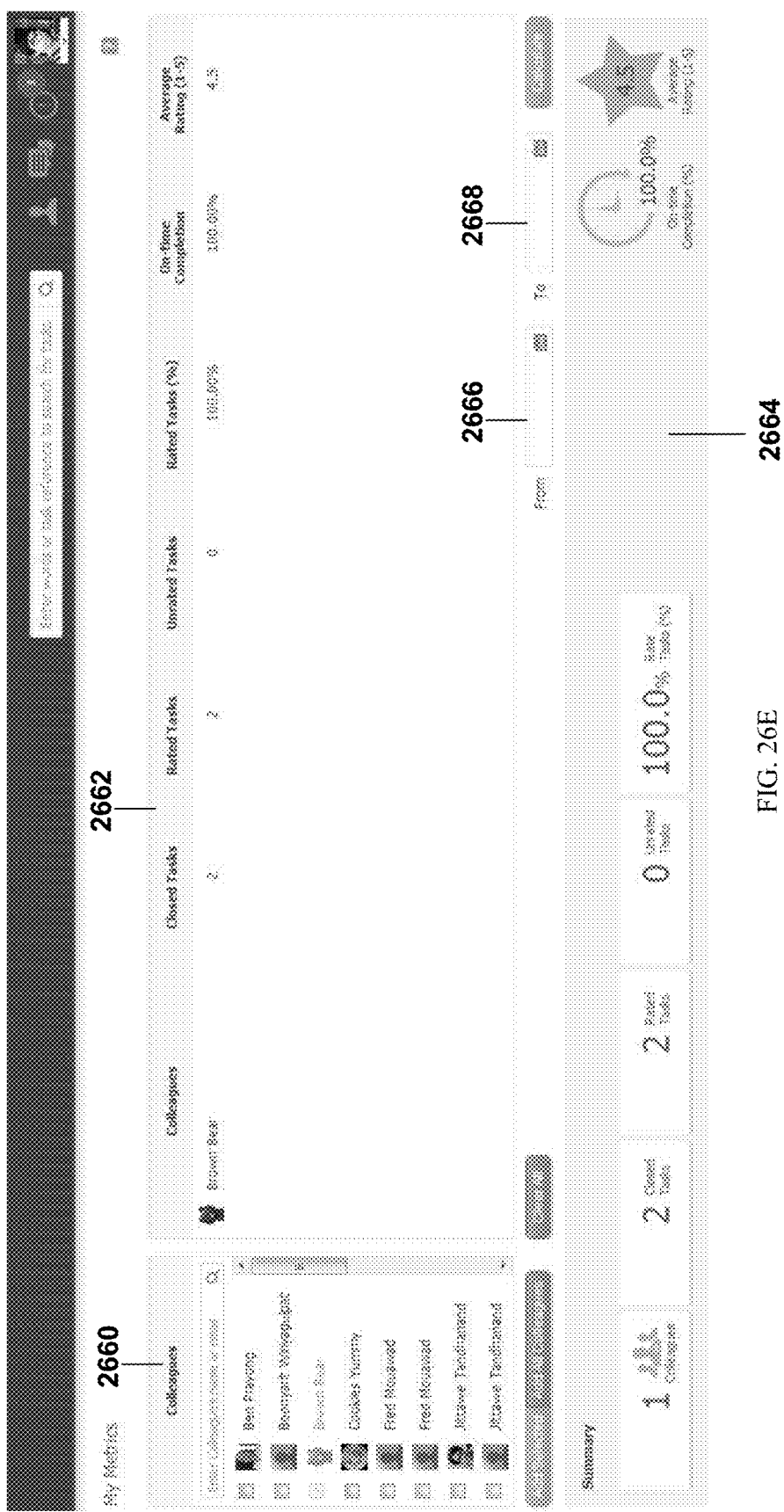
FIG. 26E shows an example user interface for a My Metrics view, in accordance with an embodiment of the invention.

FIG. 26E shows an example user interface for a My Metrics view, in accordance with an embodiment of the invention. The My Metrics view may provide a summary of metrics assigned to the current user by the user's colleagues. In an embodiment, the My Metrics view is provided, for example, when the user clicks on the "My Metrics" link under the report section 2618 of the navigation pane discussed in connection with FIG. 26A.

As illustrated in FIG. 26E, the My Metrics view may include a colleagues section 2660 that lists all the colleagues that have assigned tasks to the current user. The My Metrics view may include a metrics section 2662, which may show colleague name, number of closed tasks, related tasks, unrelated tasks, rated tasks (in percentage), on-time completion rate, average rating, and other metrics. The user may compare metrics by selecting one or more colleagues from the colleagues section 2660 (e.g., by checking a checkbox adjacent to the colleague's name). The user may have the option to add some or all the colleagues at once. The metrics associated with the selected colleagues may appear in the metrics section 2662. The user may also define the period of comparison by selecting a date for the "From" field 2666 and for the "End" field 2668. Default comparison period may be provided (e.g., all available time period). A report may be generated, for example, when the user clicks on the "Calculate" button.

In the report, the user may see the user's own performance metrics on closed tasks from each assignor who assigned tasks to the user. The user may compare the user's performance for each assignor. In the metrics section, the user may see performance metrics such as discussed above. A summary section 2664 may also display how the user has performed for the selected assignor(s).

Figure 26F:
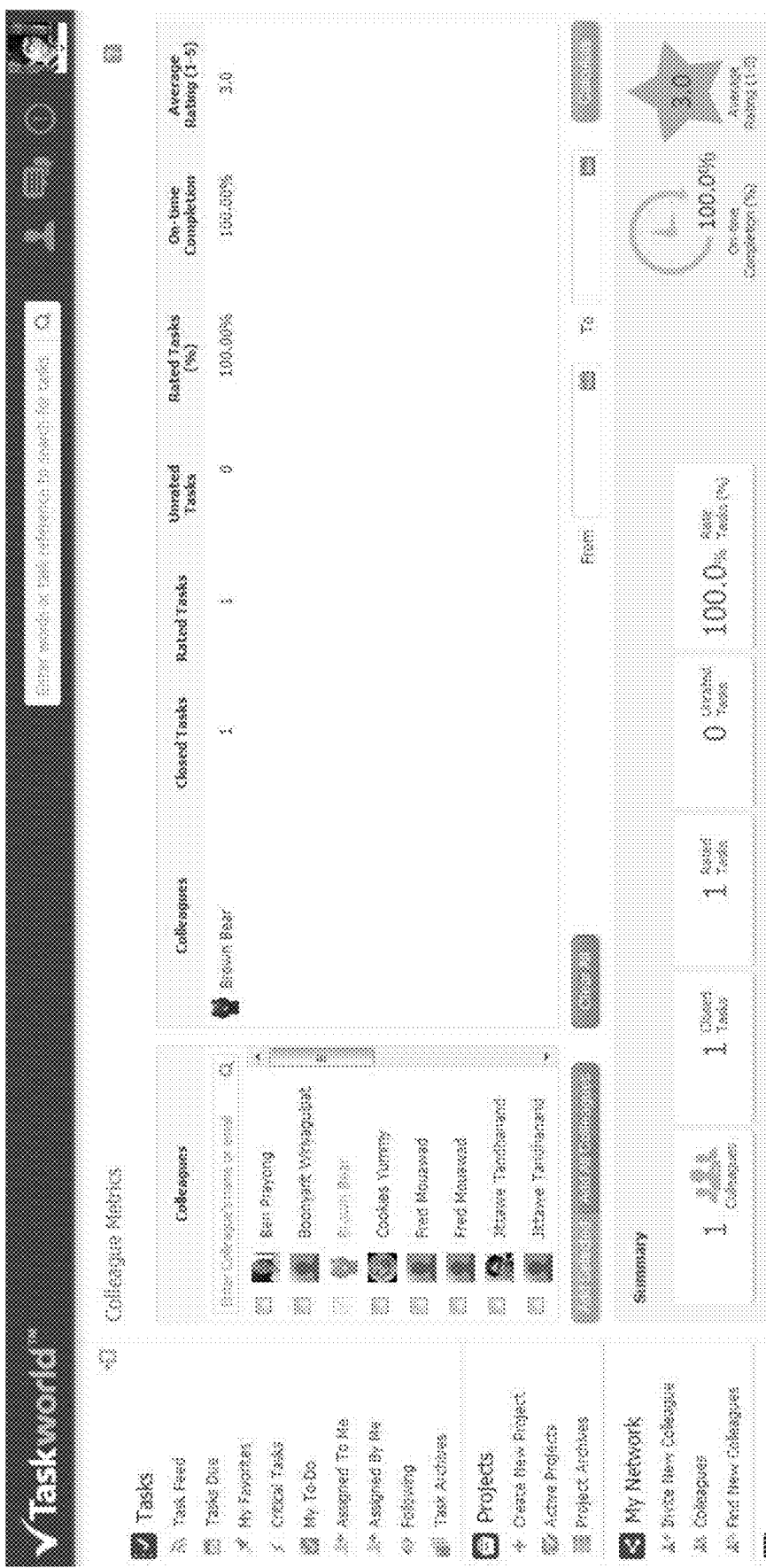
FIG. 26F shows an example user interface for a Colleague Metrics view, in accordance with an embodiment of the invention.

FIG. 26F shows an example user interface for a Colleague Metrics view, in accordance with an embodiment of the invention. The Colleague Metrics view may provide a summary of metrics on tasks that the current user has assigned to others or "Assigned by Me" tasks. In an embodiment, the Colleague Metrics view is provided, for example, when the user clicks on the "Colleague Metrics" link under the report section 2618 of the navigation pane discussed in connection with FIG. 26A.

In an embodiment, the Colleague Metrics view may be similar to the My Metrics view discussed in connection with FIG. 26E. For example, the user may select assignees to see their performances and specify the performance period for the comparison.

Figure 26G:
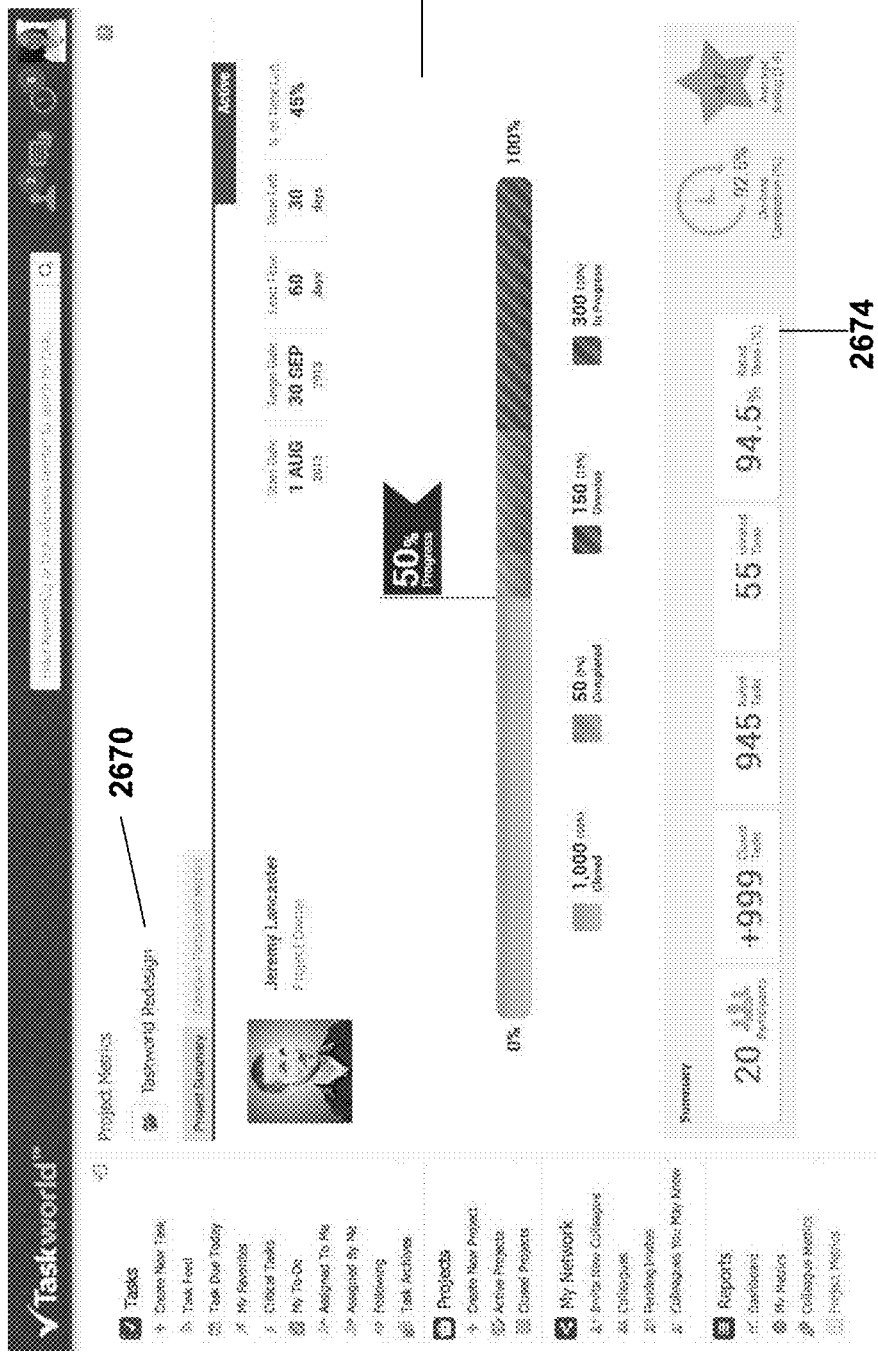
FIGS. 26G-I shows an example user interface for a Project Metrics view, in accordance with an embodiment of the invention.
Figure 26H:
Figure 26I:
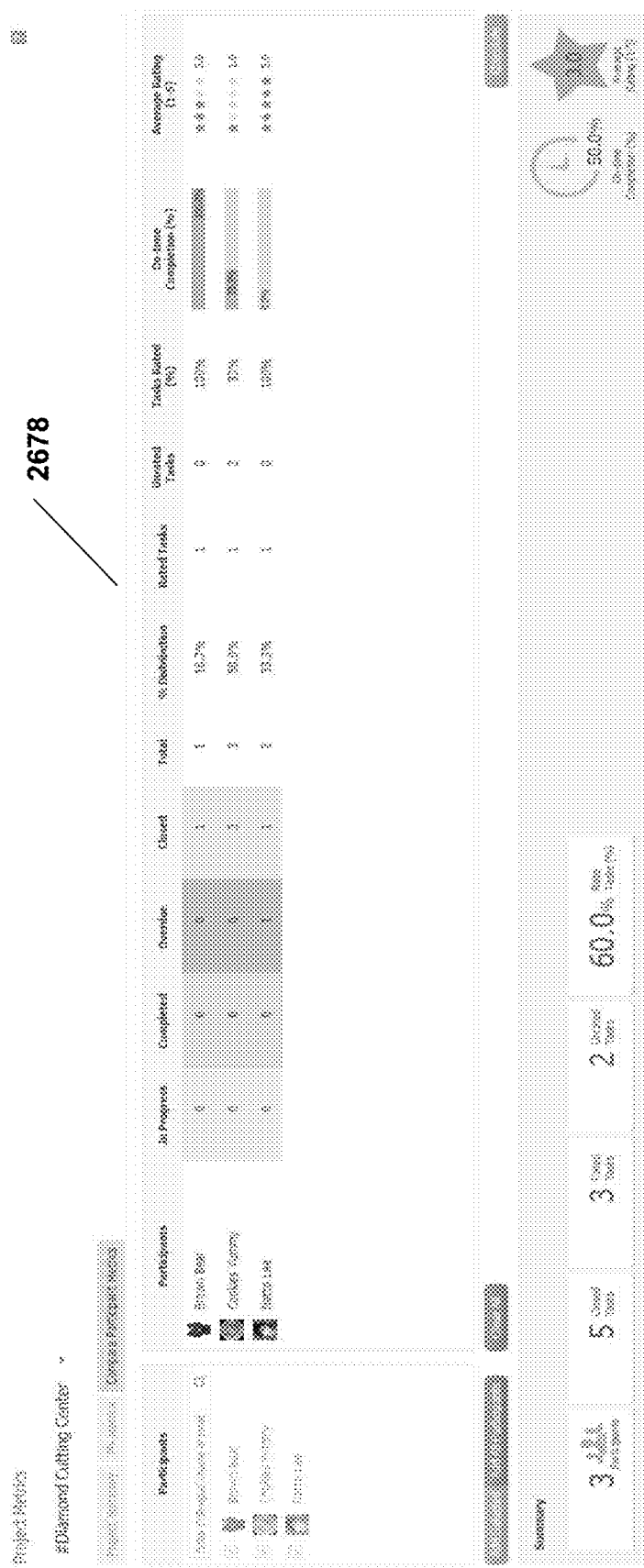

FIGS. 26G-I shows an example user interface for a Project Metrics view, in accordance with an embodiment of the invention. The Project Metrics view may provide a summary of metrics associated with projects that are owned by the current user or that the current user has participated in. In an embodiment, the Colleague Metrics view is provided, for example, when the user clicks on the "Project Metrics" link under the report section 2618 of the navigation pane discussed in connection with FIG. 26A.

As illustrated in FIG. 26G, the user may select the name of the project 2670 for which metrics are to be displayed. A list of all available projects (e.g., owned or participated by the user) may be displayed and the user may select one of the displayed project. Information associated with the selected project may be displayed in three sections: Project Metrics section 2672, where all key metrics and the current status of the project may be displayed; My Metrics section 2676, where the current user's metrics within the project may be displayed; and Compare Project Metrics section 2678, where metrics of participants' performance with the project may be compared. The user may select one of the above three sections to be displayed at any given time, for example, by selecting the associated tab. In another embodiment, more than one of the sections may be displayed at once. The Project Metrics view may also include a project summary section 2674, which may display key metrics associated with the project. In some embodiments, the project summary section may remain in substantially the same relative position in the user interface as a user navigates to sections within the view.

As illustrated in FIG. 26G, the Project Summary section 2672 may provide, among other metrics, the percentage of closed tasks compared with total tasks opened (e.g., 25%). This metric may inform the user of how far this project has progressed. Users may also learn the status of active tasks from a tri-color bar where each color portion may correspond the portion of tasks of a specific status (e.g., "In Progress," "Completed," or "Overdue"). The Project Summary section 2672 may also provide information about the owner of the project (e.g., name, picture, availability status, etc.).

As illustrated in FIG. 26H, the My Metrics section 2676 may provide the current user's performance metrics for the selected project. For example, the user may also view the status of tasks in which the user is involved in the task status chart. In addition, the user may view and manage the work by using the task due chart.

As illustrated in FIG. 26I, the Compare Participant Metrics section 2678 may be used to compare performance of selected project participants. Similar to the "Colleague Metrics" view discussed in connection with FIG. 26F, the Compare Participant Metrics section 2678 section allows a user a select some or all of the participants in a project and compare their performance metrics. The user may also specify the performance period for the comparison. A report may be generated that compares performance metrics of the selected participants. The performance metrics may include the number and percentage distribution of tasks in each categories of In Progress, Completed, Overdue and Closed, as compared to the number of total tasks.

In various embodiments, visibility rules may control what performance metrics are visible to which users. For example, in some embodiments, a user may only see performance metrics associated with tasks assigned by the user or performance metrics for other users that report to the user. In some embodiments, a user may see performance metrics of all other users assigned to the same project as the user. In some embodiments, the visibility rules may be configurable (e.g., by system administrators or users) or hard-coded.

FIG. 27 shows an example user interface displaying a project dashboard view 2700, in accordance with an embodiment of the invention. The project dashboard view may provide an overall view of key performance indicators for tasks and/or projects pertinent to a particular project. In an embodiment, the project dashboard view may be displayed when a user clicks on a project name or similar link and/or control from the main dashboard view discussed in connection with FIGS. 26A-I.

In an embodiment, the project dashboard view 2700 includes one or more sections such as a task in progress section 2702, achievement rating section 2704, satisfaction score section 2706, performance section 2708 and calendar section 2710 and the like. Each section may be used to illustrate one or more performance indicators or one or more aspects of a performance indicator that are pertinent to the particular project. For example, in an embodiment, task in progress section 2702 provides a visual representation of a breakdown of a plurality of tasks associated with the project according to their statuses (e.g., in progress, completed, overdue). In an embodiment, task in progress section 2702 is similar to the tasks boards discussed in connection with FIG. 15.

In an embodiment, the achievement rating section 2704 provides a visual representation (e.g., a line chart) of achievement ratings over a period of time at predetermined and/or configurable time intervals such as hourly, daily, weekly, biweekly, monthly, quarterly, or annually. Each achievement rating may correspond to a percentage of tasks are that are achieved and/or submitted within the target dates versus the total tasks due for a particular period of time, where the tasks are related to a particular project. In an embodiment, the achievement rating section 2704 is similar to the achievement board discussed in connection with FIG. 16.

In an embodiment, the satisfaction score section 2706 provides a visual representation (e.g., a bar chart) of satisfaction scores of tasks associated with a particular project over a period of time at predetermined and/or configurable time intervals such as hourly, daily, weekly, biweekly, monthly, quarterly, or annually. Each satisfaction score may correspond to score or rating given by a requestor for an assignee's performance of a particular task. In an embodiment, the satisfaction score section 2706 is similar to the achievement score board discussed in connection with FIG. 17.

In an embodiment, the performance section 2708 provides a visual representation (e.g., a table) of performance indicators associated with a group of individuals, such as people assigned to work on a particular project. For example, the performance section 2708 may display colleagues' report submission rates, number of active tasks, achievement ratings and satisfaction scores. More detailed discussion of the performance board is provided in connection with FIG. 30.

In an embodiment, the calendar section 2710 provides a visual representation (e.g., a Gantt chart) of a timeline of a project with a comparison between the planned dates and the current date. In particular, the calendar section 2710 may illustrate the percentage of the current time used or lapsed for the particular project over the total time planned or allocated for the project. In an embodiment, the calendar section 2710 is similar to the calendar view discussed in connection with FIG. 25.

In various embodiments, more or less performance information than illustrated may be provided. In some embodiments, various aspects of the project dashboard view 2700 such as content, format, layout and the like may be customizable, for example, by a user or an administrator. In some embodiments, the user interface may provide controls (e.g., links, buttons) for a user to export the performance information discussed herein in a predetermined or user-specified format (e.g., text file, HTML file, XML file, Microsoft Excel Sheet), to print the performance information or to perform other operations such as sharing the information via email or social media sites such as Facebook.

Figure 29:
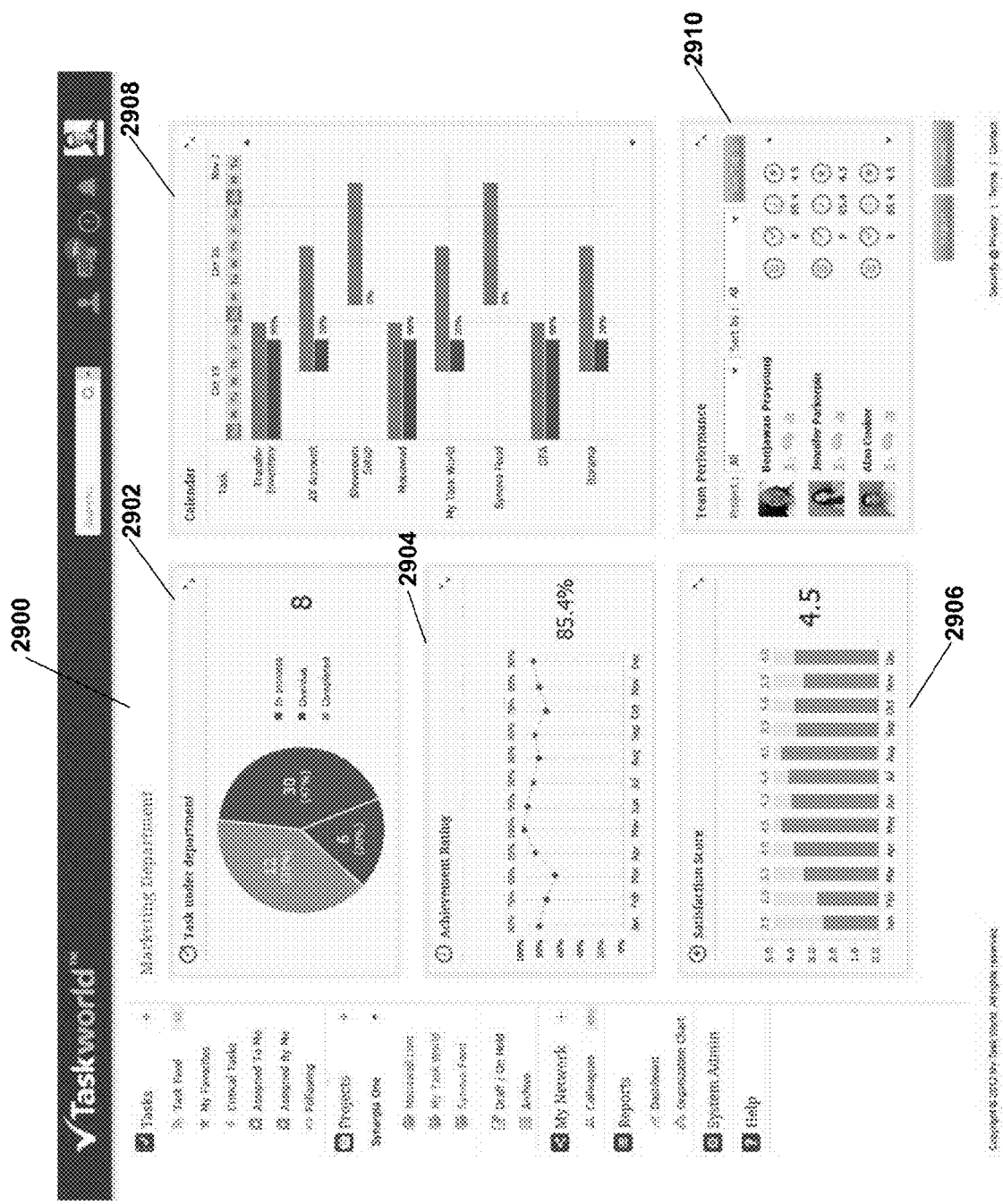
FIG. 29 shows an example department dashboard view, in accordance with an embodiment of the invention.

In various embodiments, views similar to the project dashboard view and department dashboard view such as described respectively in connection with FIGS. 27 and 29 may be provided for other entities of interest such as account, requestor and the like.

A tasks view may provide as part of the main dashboard view discussed in connection with FIG. 26 or in a separate view. In an embodiment, the tasks view 2800 may be similar to the task status board discussed in connection with FIG. 15. For example, tasks view may display a breakdown of the tasks according to their statuses in a pie chart. Additional controls (e.g., check boxes) may be provided to enable a user to select, search and/or filter the tasks. For example, a user may view only tasks assigned to the user, assigned by the user or both.

Figure 28:
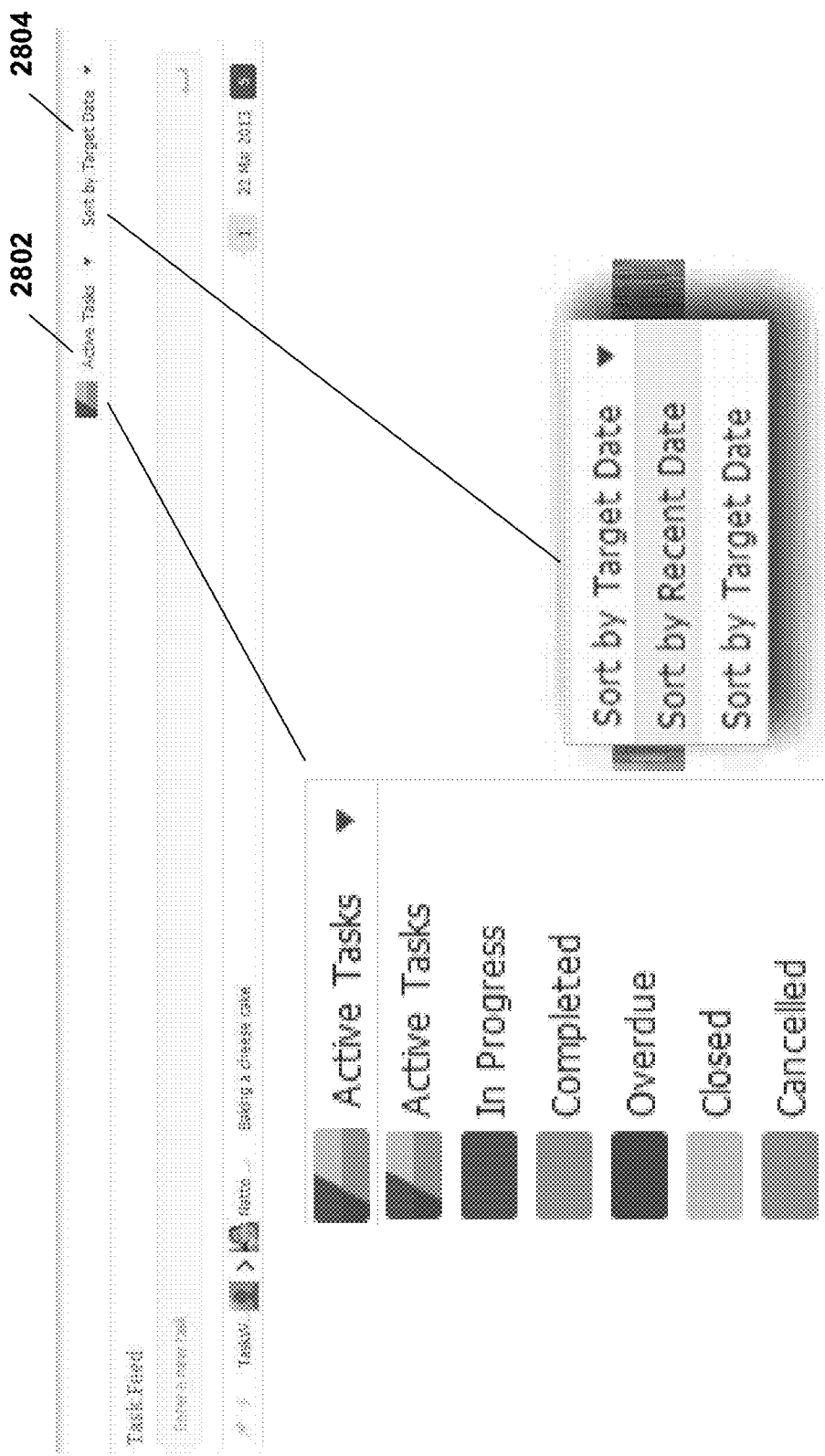
FIG. 28 shows an example tasks view, in accordance with an embodiment of the invention.

FIG. 28 shows an example tasks view, in accordance with an embodiment of the invention. The task view may be accessible via the "Task Feed" link in the navigation pane 2601 discussed in connection with FIG. 26. In an embodiment, the task view may include a status filter 2802 that may be used to filter tasks displayed based on task status. For example, the status filter 2802 may be implemented using a droplist or other similar control that contains textual and/or graphical representation of various task status or substatuses such as "Active Tasks" which may further include sub tasks statuses such as "In Progress," "Completed," and "Overdue." A task may be "In Progress" if the task is being worked on by a user and the task does not have a target date or if the target date has not yet passed. A task may be "Completed" if the assignments associated with the task have been completed. A task may be "Overdue" if the task has not yet been completed but the target date associated with the task has passed. The filters may also include "Closed," indicating tasks that have been closed by the requestors of the tasks, and "Cancelled," indicating tasks that have been cancelled by the requestors.

In an embodiment, the task view may include a sort filter 2804 that may be used to sort tasks displayed accordingly. For example, the sort filter 2802 may be implemented using a droplist or other similar control. The sort filter may include one, two, or more sort filters such as sort by target date, recent date, assignor, assignee, task name, project name, and the like. Selecting the sort by target date option may cause the tasks to be sorted according to target date. For example, the tasks with the earliest target date may be displayed. Selecting the sort by recent date option may cause the tasks to be sorted according to the dates of the most recent activities associated with the tasks.

FIG. 29 shows an example department dashboard view 2900, in accordance with an embodiment of the invention. The department dashboard view may provide an overall view of key performance indicators for tasks and/or projects pertinent to a particular department. In an embodiment, the department dashboard view may be displayed when a user clicks on a department name or similar link and/or control from the main dashboard view discussed in connection with FIG. 26.

In an embodiment, the department dashboard view 2900 includes one or more sections such as a task under department section 2902, achievement rating section 2904, satisfaction score section 2906, calendar section 2908, team performance section 2910 and the like. Each section may be used to illustrate one or more performance indicators or one or more aspects of a performance indicator that are pertinent to the particular department. For example, in an embodiment, task under department section 2902 provides a visual representation of a breakdown of a plurality of tasks associated with the department according to their statuses (e.g., in progress, completed, overdue). In an embodiment, task under department section 2902 is similar to the tasks boards discussed in connection with FIG. 15.

In an embodiment, the achievement rating section 2904 provides a visual representation (e.g., a line chart) of achievement ratings over a period of time at predetermined and/or configurable time intervals such as hourly, daily, weekly, biweekly, monthly, quarterly, or annually. Each achievement rating may correspond to a percentage of tasks are that are achieved and/or submitted within the target dates versus the total tasks due for a particular period of time, where the tasks are performed by people in the particular department. In an embodiment, the achievement rating section 2904 is similar to the achievement board discussed in connection with FIG. 16.

In an embodiment, the satisfaction score section 2906 provides a visual representation (e.g., a bar chart) of satisfaction scores of tasks associated with a particular department over a period of time at predetermined and/or configurable time intervals such as hourly, daily, weekly, biweekly, monthly, quarterly, or annually. Each satisfaction score may correspond to score or rating given by a requestor for an assignee's performance of a particular task. In an embodiment, the satisfaction score section 2906 is similar to the achievement score board discussed in connection with FIG. 17.

In an embodiment, the calendar section 2908 provides a visual representation (e.g., a Gantt chart) of a timeline of one or more projects associated with the department with a comparison between the planned dates and the current date. In particular, the calendar section 2908 may illustrate the percentage of the current time used or lapsed for each project over the total time planned or allocated for the project. In an embodiment, the calendar section 2908 is similar to the calendar view discussed in connection with FIG. 25.

In an embodiment, the performance section 2910 provides a visual representation (e.g., a table) of performance indicators associated with a group of individuals, such as people in a particular department. For example, the performance section 2910 may display report submission rates, number of active tasks, achievement ratings and satisfaction scores for each person in the department. More detailed discussion of the performance board is provided in connection with FIG. 30.

In various embodiments, more or less performance information than illustrated may be provided. In some embodiments, various aspects of the department dashboard view 2900 such as content, format, layout and the like may be customizable, for example, by a user or an administrator. In some embodiments, the user interface may provide controls (e.g., links, buttons) for a user to export the performance information discussed herein in a predetermined or user-specified format (e.g., text file, HTML file, XML file, Microsoft Excel Sheet), to print the performance information or to perform other operations such as sharing the information via email or social media sites such as Facebook.

Figure 30:
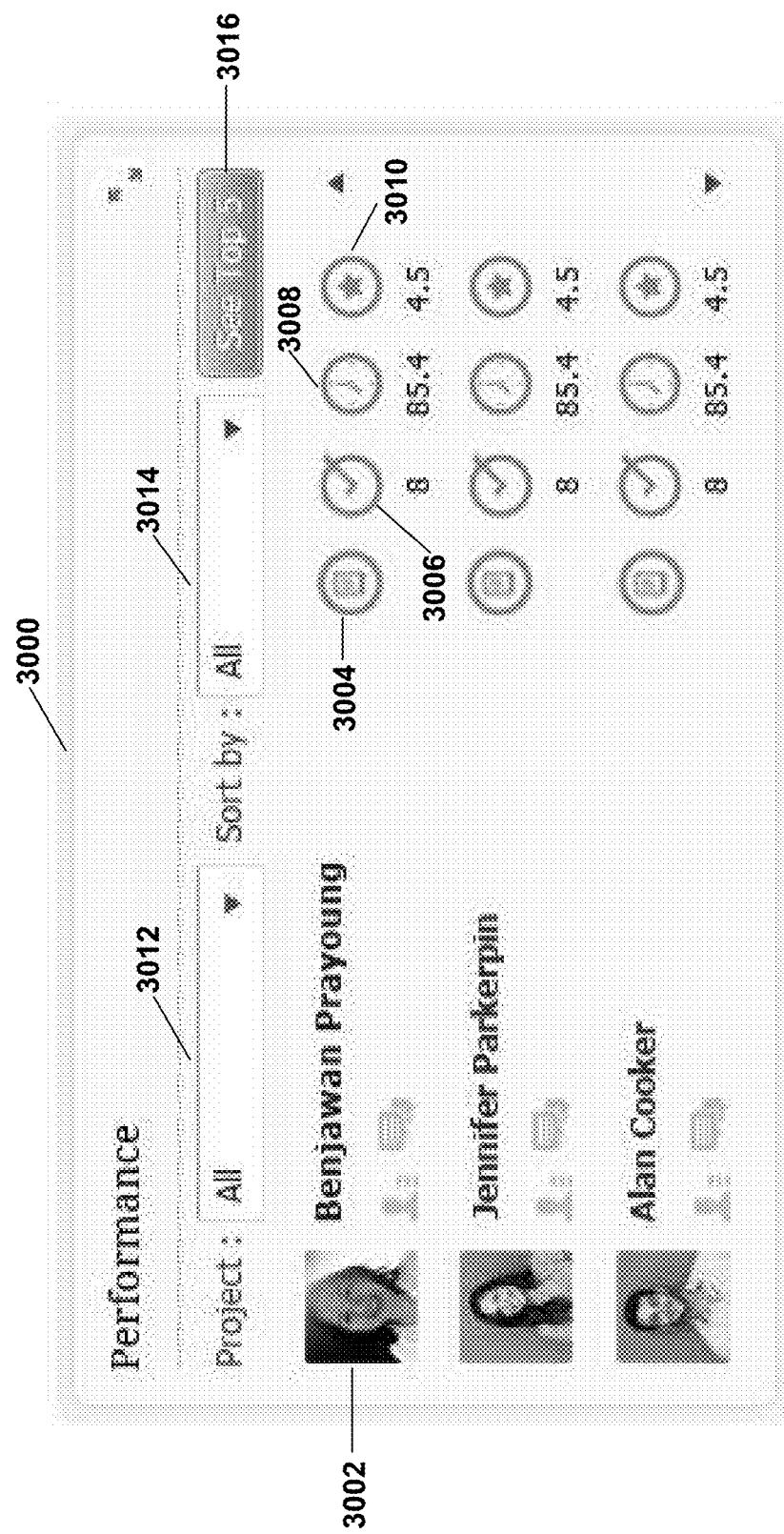
FIG. 30 shows an example performance view, in accordance with an embodiment of the invention.

FIG. 30 shows an example performance view 3000, in accordance an embodiment of the invention. The performance view 3000 may provide a visual representation of key performance indicators for a group of people sharing one or more common characteristics such as colleagues of a user (such as described in connection with FIG. 26), people in a department (such as described in connection with FIG. 29), people assigned to the same project (such as described in connection with FIG. 27) or the like. In an embodiment, the performance view 3000 list, for each person, a picture and/or name 3002 of the person, a report submission rate indicator 3004, a number of tasks indicator 3006, an achievement rating indicator 3008 and a satisfaction score indicator 3010. In some embodiments, the picture and/or name 3002 of a person may provide a link, for example, to view that person performance dashboard.

In some embodiments, the indicators may provide a visual representation of and/or a link to more detailed information for the corresponding performance indicator. For example, the report submission rate indicator 3004 may include an icon of a report and/or a percentage indicating the person's report submission rate. As another example, the number of tasks indicator 3006 may be represented by an icon and/or a link and a number that represents the active tasks associated with the person. The achievement rating indicator 3008 may be represented by an icon and/or a link and a number that represents an achievement rating (e.g., an average) associated with the person. The satisfaction score indicator 3010 may be represented by an icon and/or a link and a number that represents a satisfaction score (e.g., an average) associated with the person. In some embodiments, distinct icons are used for different performance indicators. In some embodiments, more or less performance indicators than illustrated herein may be provided. Additionally, each performance indicator may be represented in a different way than illustrated. For example, in some embodiments, each performance indicator is represented only by a corresponding value for the indicator or only by an icon or link.

In an embodiment, the performance view 3000 also includes controls to customize the content displayed in the view. For example, a dropdown list 3012 may be provided to select a particular project for which people's performance is displayed. In other embodiments, the people to be displayed may be qualified by other parameters such as project, account, position, job title, department, team, geographic region and the like. In addition, the people displayed may be sorted, for example, using a dropdown list 3014 by name, one or more values associated with one or more performance indicators (e.g., satisfaction score) and the like.

In an embodiment, the performance view 3000 also includes a control 3016 (such as a "See Top 5" button, a link or a similar control) to see performance information associated with top N performers. The number N may be predetermined (e.g., 5) and/or configurable. For example, a dropdown list or a text box may be provided for a user to enter the number.

In an embodiment, clicking on the control 3016 causes the information displayed in the performance view 3000 to be sorted according to predetermined or configurable parameters (e.g., satisfaction score). In another embodiment, clicking on the control 3016 causes a separate view to be displayed.

Figure 31:
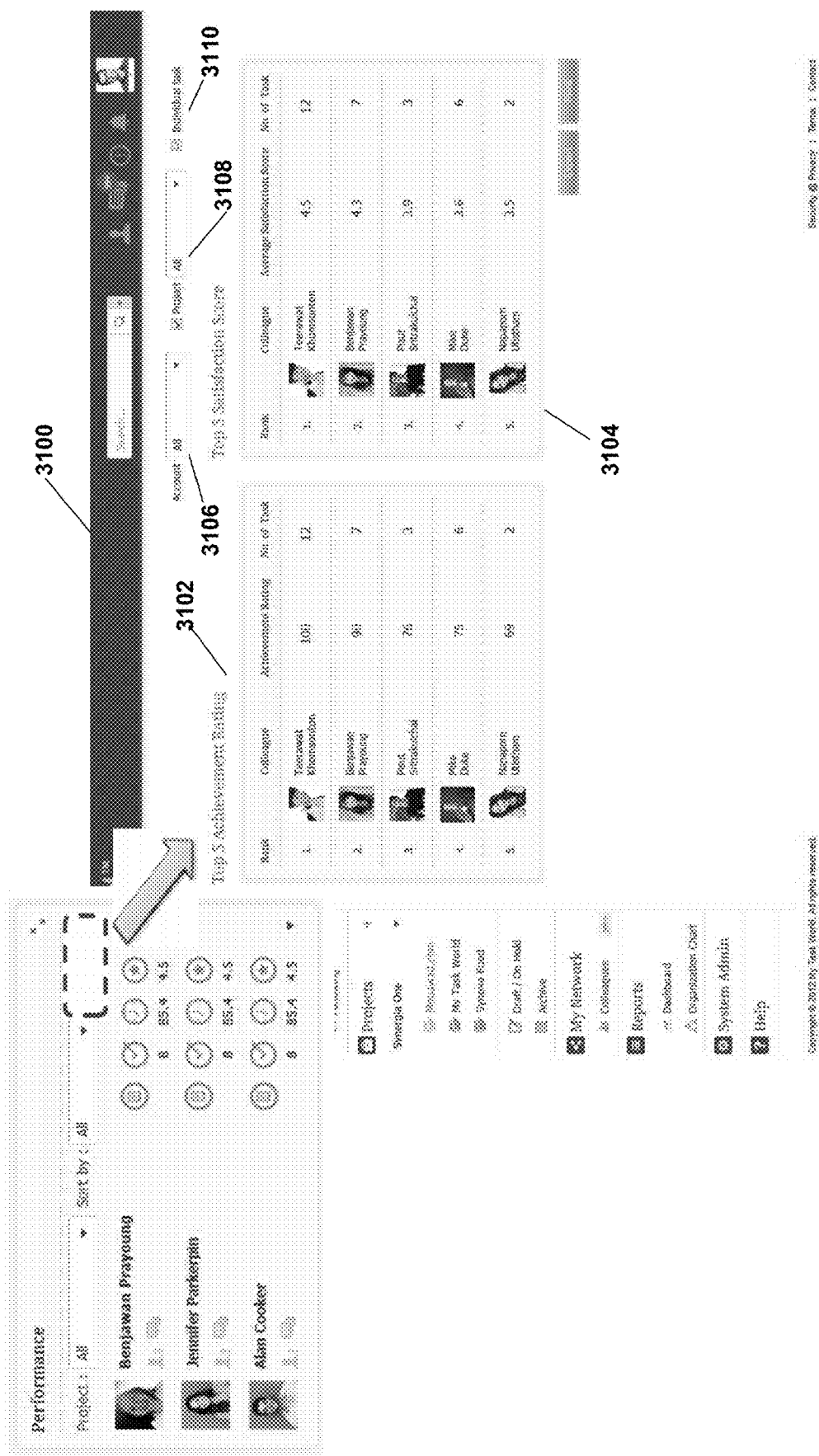
FIG. 31 shows an example top performance view, in accordance with an embodiment of the invention.

FIG. 31 shows an example top performance view 3100, in accordance with an embodiment of the invention. In an embodiment, the top performance view 3100 may be displayed in response to a user's clicking on a control in a performance view such as described above in connection with FIG. 30. In this example, the top performance view 3100 includes a top achievement rating view 3102 and a top satisfaction score view 3104. The top achievement rating view 3102 may list N performers according to their achievement ratings similar to described in connection with FIG. 18. The top satisfaction score view 3104 may list N performers according to their satisfaction score similar to described in connection with FIG. 19. In various embodiments, the performers may be ranked according to parameters other than achievement ratings or satisfaction scores, such as report submission rate, number of tasks and the like. Visual representation of such other rankings may be provided in a similar or dissimilar manner the top achievement rating view 3102 and the top satisfaction score view 3104 described herein.

In some embodiments, the top performance view 3100 may include controls for a user to select and/or filter performer displayed according to various parameters such as accounts 3106, projects 3108, whether to include individual tasks 3110 and other parameters.

Figure 32:
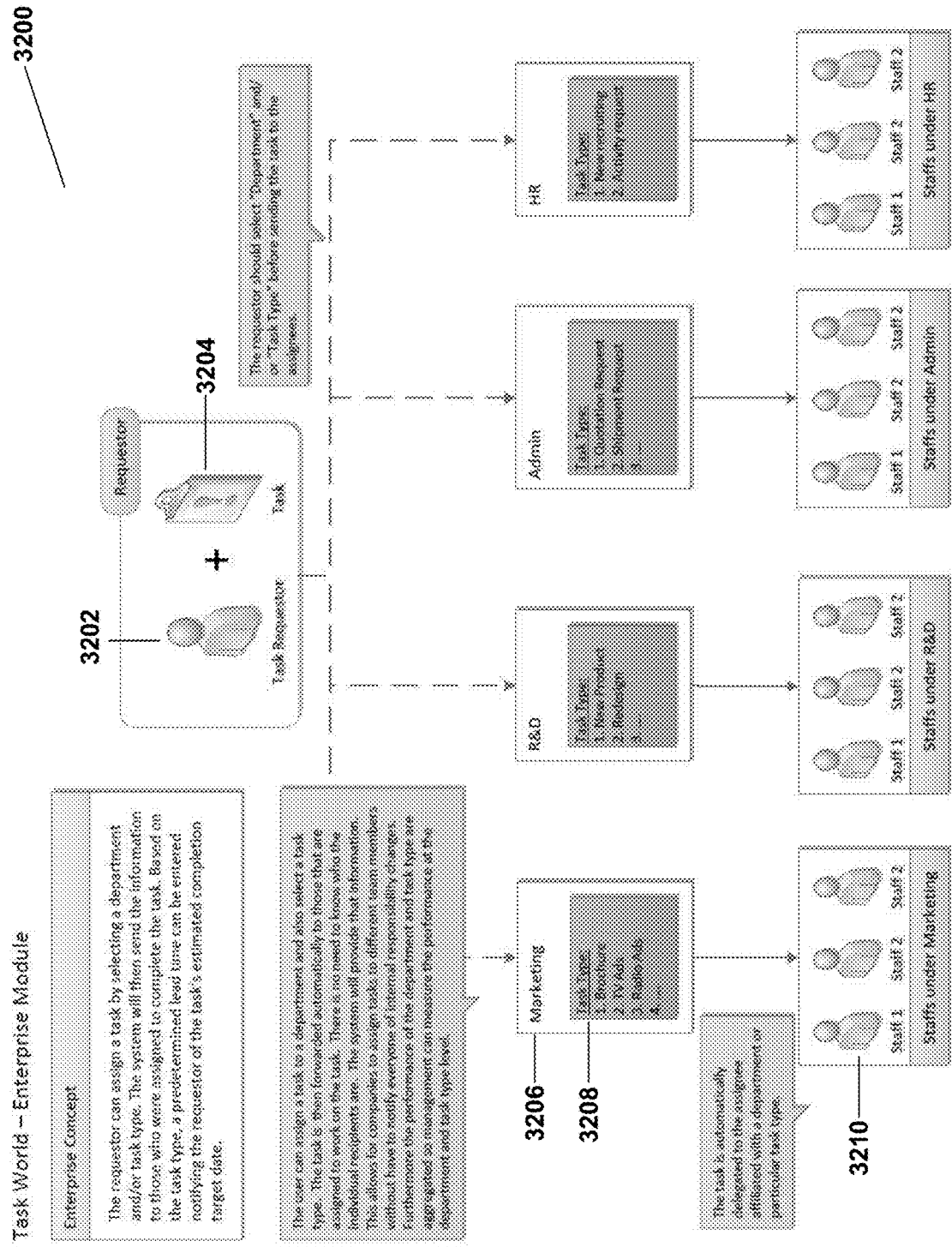
FIG. 32 shows an example flow chart illustrating a process of assigning tasks to assignees, in accordance with an embodiment of the invention.

In various embodiments, a requestor may assign a task to an assignee directly or indirectly. FIG. 32 shows an example flow chart illustrating a process of assigning tasks to assignees, in accordance with an embodiment of the invention. In this example, a requestor 3202 with a task 3204 to perform may cause the task 3204 to be automatically assigned by selecting a department 3206 and/or a task type 3208. Examples of departments may include marketing, research and development (R & D), admin, human resources (HR) and the like. A task type 3208 may or may not be specific to a department 3206. For example, task types within a marketing department may include brochure, TV advertisement, radio advertisement and the like. Task types within a R&D department may include new product development, redesign of existing products and the like. Tasks types within an admin department may include quotation request, shipment request and the like. Task types within an HR department may include new recruiting, activity request, payroll and the like.

In some embodiments, when a requestor selects a department and/or a task type for the task to be assigned, the requestor may also configure other information related to the task. For example, the requestor may specify or select a predetermined or arbitrary lead time to an estimated completion and/or target date such that the requestor may be notified within the lead time (e.g., of the approaching target date). As another example, the requestor may specify criteria for selecting an assignee for the task. Such criteria may include skills and expertise, job title, education background, language requirement and the like.

Subsequent to a requestor's configuration of task assignment such as described above (e.g., selection of a department and/or a task type), the task may be assigned automatically to one or more assignees 3210. In some embodiments, each department may be associated with one or more "receivers" for receiving a task assigned to the department. For example, a receiver may include a team leader, department head or the like. A receiver may assign the task to himself or herself and hence become an assignee of the task, and/or assign the task to one or more assignees, such as colleagues in the department. Ultimately, a task may be assigned to a receiver, a non-receiver assignee or a combination of both. In another embodiment, a department is associated directly with assignees that may or may not reassign a task assigned to them (indirectly via the selection of the department by the requestor).

In some embodiments, each department may be associated with one or more task types as discussed above. Each task type may be associated with one or more receivers and/or assignees associated with the department or outside the department. In such embodiments, task assignment may be further based on a selected task type (if any) for the task. In some embodiments, a system implementing the task assignment process may also apply other default and/or user-specified criteria in selecting an assignee for a task.

By assigning tasks based on department and/or task types, a requestor of a task may not have any knowledge of the underlying performer(s) of a task. In various embodiments, additional task selection criteria (such as subdivisions of a department, sub-task types) may be provided in a similar manner to facilitate finer control over task assignment.

In various embodiments, the indirect task assignment approach described herein may allow companies to assign tasks to different team members without having to notify everyone if internal responsibility changes. Furthermore, the performers of a department, task type and other assignment criteria may be aggregated so that management such as a department head can review and analyze the performance of task performers at various levels such as at department and/or task type level. For example, performance information may be provide by a department dashboard such as described in connection FIG. 29, with where managers and department heads can monitor and control tasks. They will be able to keep track of individual and department performance by utilizing different sections within the dashboard such as task status section, achievement rating section, and satisfaction score section such as discussed in connection with FIG. 29. In other words all the performances of the department and task type are aggregated for management to view.

Figure 33:
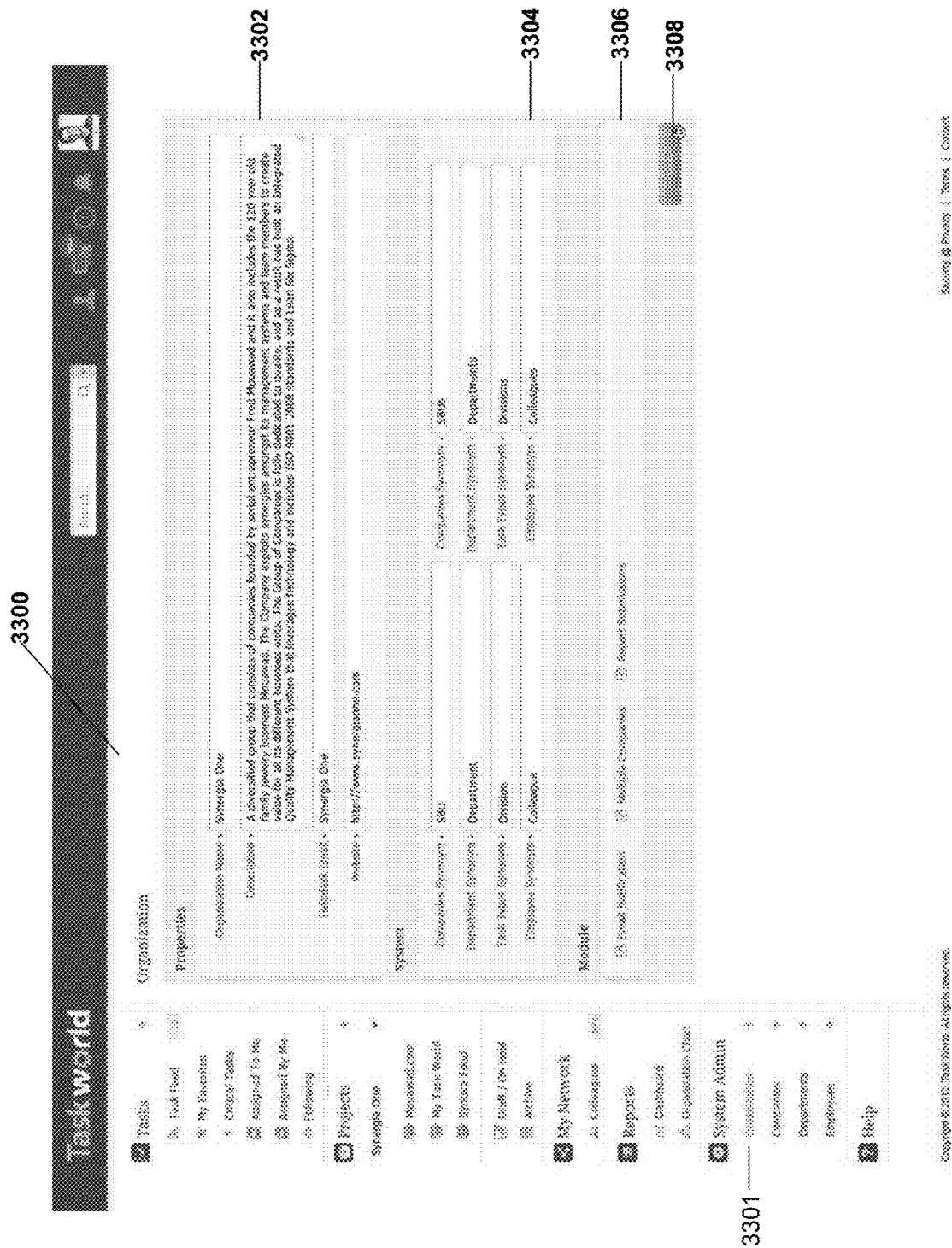
FIG. 33 shows an example organization view, where a user may create and configure information related to an organization, in accordance with an embodiment of the invention.

In an embodiment, the system described herein allows a customer to set up organization structures and define elements and relationships within the organization structures. In an embodiment, an organization may include one or more companies and each company includes one or more departments, each of which includes one or more employees. In other embodiments, the organization structure may include more or less levels than described herein. FIG. 33 shows an example organization view 3300 where a user (e.g., a system administrator) may create and configure information related to an organization, in accordance with an embodiment of the invention. In an embodiment, the organization view 3300 may be accessible via an "Organization" link 3301 provided in a navigation pane such as described in connection with FIG. 26. In an embodiment, such an "Organization" link 3301 and other similar links to administrative views may be visible and/or accessible only to users with administrative privileges.

In the illustrated example, the organization view 3300 includes a properties section 3302 where information about the organization may be entered. Such information may include an organization name, description, contact information such as address, website URL, email, phone number, fax number, and the like, and any other similar information.

The organization view 3300 may also include a system section 3304 where system-related information may be entered. For example, synonyms for companies, departments, task types and employees may be entered for display and/or localization (e.g., translation) purposes.

The organization view 3300 may also include a module section 3306 where various modules and/or features may be enabled and/or disabled. For example, the module section 3306 may include checkboxes to enable or disable functionalities such as email notification and report submission and to allow or disallow multiple companies to be configured. In various embodiments, more or less sections than illustrated herein may be provided. The organization view 3300 may also allow a user to save 3308 organization information, reset fields in the organization view 3300, cancel the creation of the organization or perform operations.

Figure 34:
FIG. 34 shows an example company view, where a user may view and edit information related to one or more companies, in accordance with an embodiment of the invention.

In some embodiments, an organization may include one or more companies that belong to the organization. FIG. 34 shows an example company view 3400 where a user (e.g., a system administrator) may view and edit information related to one or more companies, in accordance with an embodiment of the invention. In an embodiment, the company view 3400 may be accessible via a "Companies" link 3401 provided in a navigation pane such as described in connection with FIG. 26. In an embodiment, such a "Companies" link 3401 and other similar links to administrative views may be visible and/or accessible only to users with administrative privileges.

The company view 3400 may include a list of companies with corresponding information such as company name, contact name, email address, telephone, status, and the like. More or less information than illustrated in FIG. 34 may be provided. In addition, a user may be allowed add 3402, edit 3404 or remove 3406 one or more companies. For example, in an embodiment, upon a user's selection of a control for adding or editing a company, an add/edit company view 3408 pops up that displays editable fields for the company such as company name, contact name, telephone number, fax number, mobile phone number, email address, website URL, postal address and whether the company is active. More or less fields than illustrated may be provided. Some or all of the fields may be required. In some embodiments, the add/edit company view 3408 may provide options for a user to save 3410 or cancel changes to the company.

Figure 35:
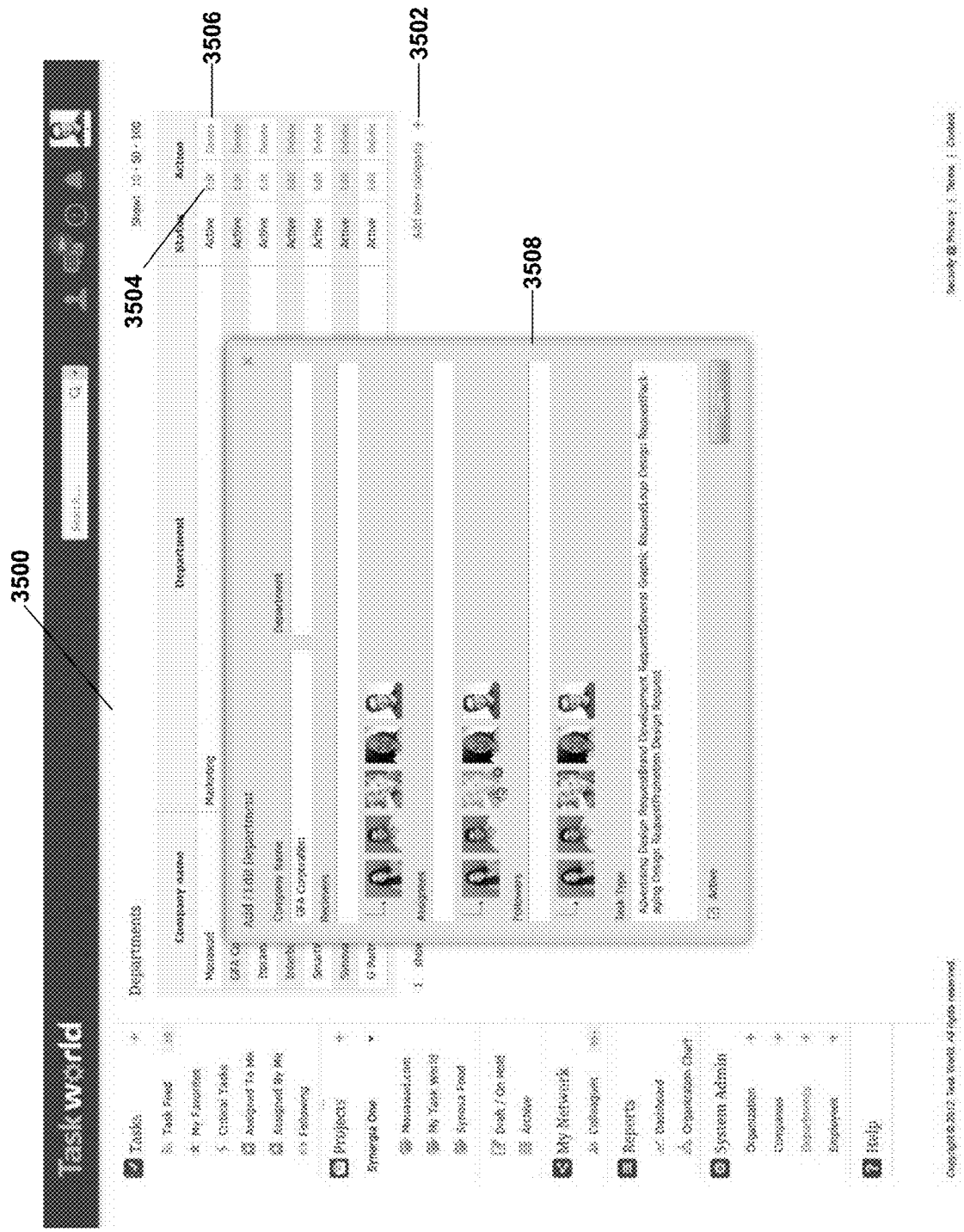
FIG. 35 shows an example department view, where a user may view and edit information related to one or more departments, in accordance with an embodiment of the invention.

In some embodiments, a company may include one or more departments. FIG. 35 shows an example department view 3500 where a user (e.g., a system administrator) may view and edit information related to one or more departments, in accordance with an embodiment of the invention. In an embodiment, the department view 3500 may be accessible via a "Departments" link 3501 provided in a navigation pane such as described in connection with FIG. 26A. In an embodiment, such a "Departments" link 3501 and other similar links to administrative views may be visible and/or accessible only to users with administrative privileges.

In an illustrative embodiment, the department view 3500 includes a list of departments with corresponding information such as company name, department name, status (e.g., active or inactive), and the like. In various embodiments, more or less information than illustrated in FIG. 35 may be provided. In addition, a user may be allowed add 3502, edit 3504 or remove 3506 one or more departments.

In an embodiment, an add/edit department view 3508 may be provided for adding or editing department information. Such a view 3508 may be provided in response to a user's selection of a control such as an "Add new department" link 3502 or an "Edit" link 3504 associated with a department. In an embodiment, the add/edit department view 3508 provides editable fields for department such as company name, department name, receivers, assignees, followers, task types, status and the like of the department. In an embodiment, some or all of the fields may be required and/or pre-populated. For example, the status field of the department may be pre-populated to be active. In an embodiment, the receivers, assignees, and/or followers field may enable selection and/or de-selection of receivers from a collection of candidates such as members of a department or people outside the department. For example, images and/or names of the candidates may be displayed to facilitate selection of a candidate. In another embodiment, candidates from outside the department may be provided as candidates. In various embodiments, the candidates for receivers, assignees and followers may be predetermined or configurable, for example, based on business rules.

In an embodiment, one or more task types may be entered into or deleted from the task type field of the department. In another embodiment, the task types may be selected from existing task types and/or provided by default. In various embodiments, more or less fields than illustrated may be provided. In some embodiments, information entered into the add/edit department view 3508 may be save or canceled.

Figure 36:
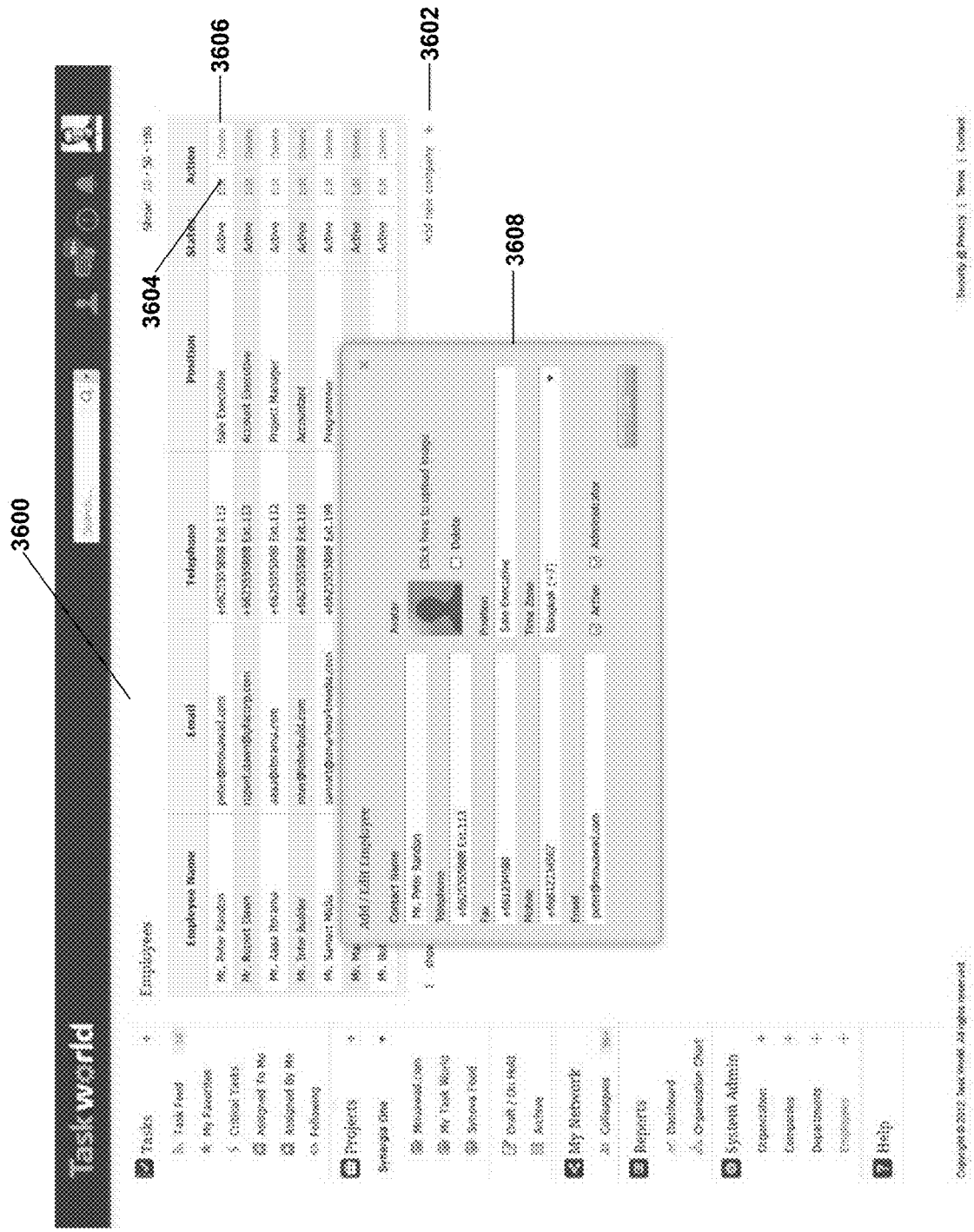
FIG. 36 shows an example employee view where a user may view and edit information related to one or more employees, in accordance with an embodiment of the invention.

In some embodiments, a department may include one or more employees. FIG. 36 shows an example employee view 3600 where a user (e.g., a system administrator) may view and edit information related to one or more employees, in accordance with an embodiment of the invention. In an embodiment, the employee view 3600 may be accessible via an "Employees" link 3601 provided in a navigation pane such as described in connection with FIG. 26. In an embodiment, such a "Employees" link 3601 and other similar links to administrative views may be visible and/or accessible only to users with administrative privileges.

In an illustrative embodiment, the employee view 3600 includes a list of employees with corresponding information such as employee name, email address, telephone number, position, status, and the like. In various embodiments, More or less information than illustrated in FIG. 36 may be provided. In addition, a user may be allowed add 3602, edit 3604 or remove 3606 one or more employees.

In an embodiment, an add/edit employee view 3608 may be provided for adding or editing employee information. Such a view may be displayed in response to a user's selection of a control such as an "Add new employee" link 3602 or an "Edit" link 3604 associated with a employee. In an embodiment, the add/edit employee view 3608 provides editable fields for employee such name, telephone number, fax number, mobile phone number, email address, position, time zone information, status (e.g., active or inactive), indication of whether the employee is an administrator, and other information for the employee. In an embodiment, one or more images may be uploaded for an employee in using the add/edit employee view 3608. In an embodiment, some or all of the fields may be required and/or pre-populated. For example, the status field of the employee may be pre-populated to be active. In various embodiments, more or less fields than illustrated may be provided. In some embodiments, information entered into the add/edit employee view 3608 may be save or canceled.

Figure 37:
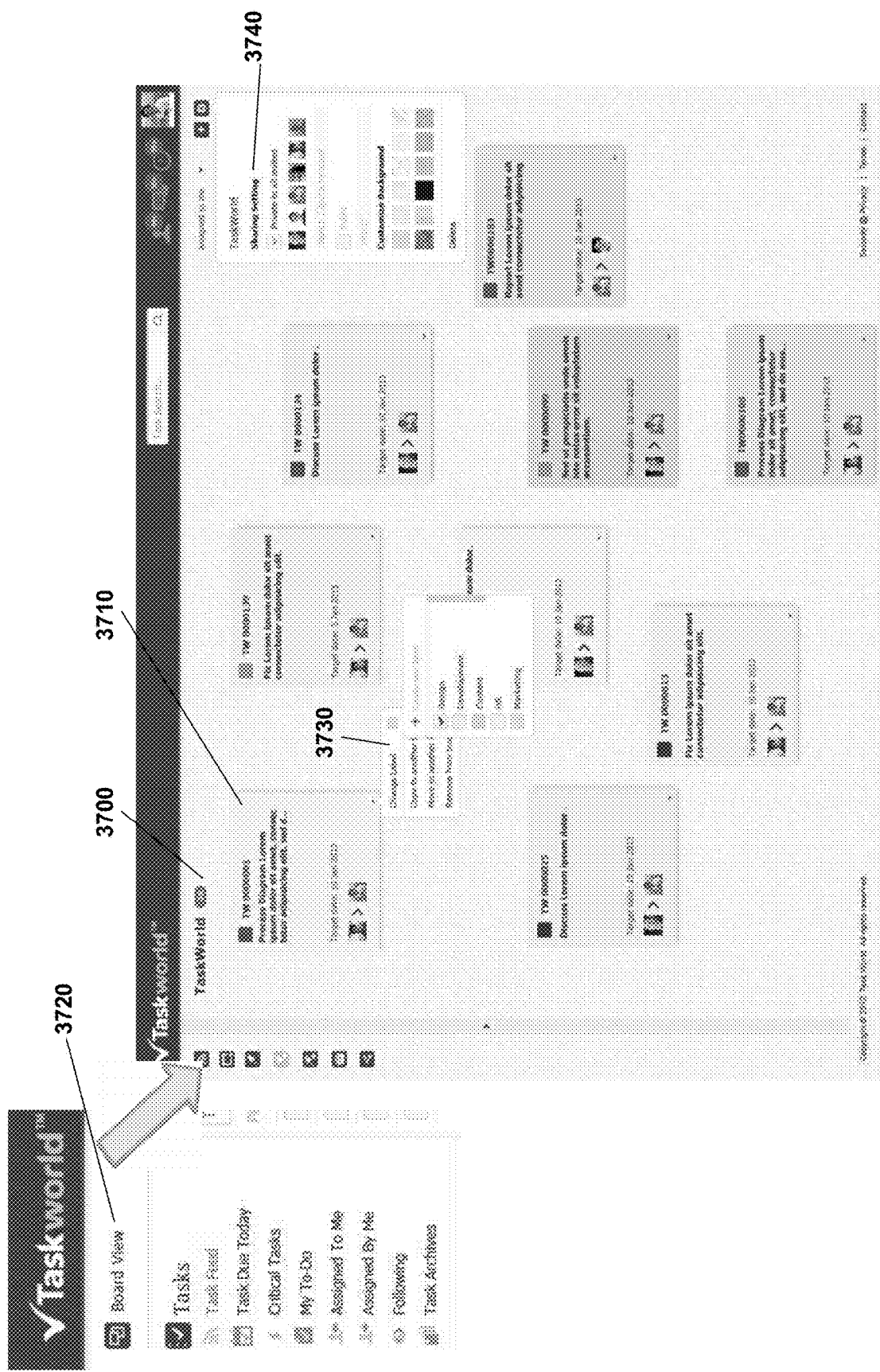
FIG. 37 provides an example of a user interface having a pinboard, in accordance with an embodiment of the invention.

FIG. 37 provides an example of a user interface having a pinboard in accordance with an embodiment of the invention. A pinboard may provide an alternate way of viewing tasks. A pinboard may be used in combination with any of the interfaces or embodiments described elsewhere herein, or may be standalone from the other interfaces or embodiments.

A pinboard may be a virtual board 3700 upon which users may arrange any task freely. The tasks may be displayed on one or more 'note' 3710. A task note may have any configuration. In some instances, a task note may have a discernible geometric shape, such as a square, rectangle, circle, ellipse, triangle, hexagon, octagon, trapezoid, or any other configuration. A task note may be opaque or transparent. A task note may or may not have a border surrounding a region. In some instances, a task note may have an aesthetic reminiscent of a sticky note. A user may be able to place a task note anywhere on the virtual board. The user may be able to place a task note without conforming the task note to predetermined locations or sizes. The user may be able to place the task note without regard to any pre-existing grids or markers on the board. The task notes may be freely arranged without having to conform to pre-existing columns or rows. The task notes may be placed anywhere on the board without being confined to a particular section of the board, regardless of the content of the task note. Alternatively, the user may place a task note on a board, and the task note may conform to a preexisting grid, column, line or marker. In some instances, once a task has been placed, a user may or may not be able to alter the location of the task. For example, a user may be able to click and drag a task from a first location to a second location. The user may be able to alter the location of the task note freely anywhere on the virtual board. In one example, users may use colored notes on boards with custom backgrounds. Users can pin tasks anywhere on the board and rearrange it the way they want.

A task note 3710 may have information about a task. For example, the task note may have a task name, task description, target date, and information about an assignor and/or assignee of the task. In some instances, an image of an assignor and assignee of the task may be displayed on the task note. In some instances, selecting a task note on the pinboard may permit a user to access more details about the task.

The pinboard may be used in combination with a default task feed, such as embodiments described elsewhere herein. In some embodiments, users can manage all tasks in the task feed with sorting/filtering options and color-coded progress status. A user may be able to switch views between a task feed style and a pinboard style. In one example, only one click is required to switch. For example a task feed style may have a button that a user may be able to click on, and switch the view of tasks between a list format and notes on a pinboard. For example, a 'Board View' option 3720 may be provided on the user interface that the user may select to switch to or from a pinboard view. Thus a user may be able to switch to or from a pinboard view using a single click or touch, or other interaction with the interface.

The pinboard may provide a view with a flexible approach. Users may customize their pinboard in the way they manage their tasks. The users may customize pinboards regarding location of the tasks. The users may also customize pinboards regarding color-coded or other coded labeling of tasks 3730 and background images to each board. Additionally, pinboards may be customized relating to size and/or shape of the task notes. A pinboard may permit users to work with other colleagues on different tasks and projects in a collaborative environment.

In some embodiments, users may be able to manage the pinboard accessibility by adjusting permission levels and privacy rights 3740. This is described in greater detail elsewhere herein.

Figure 38:
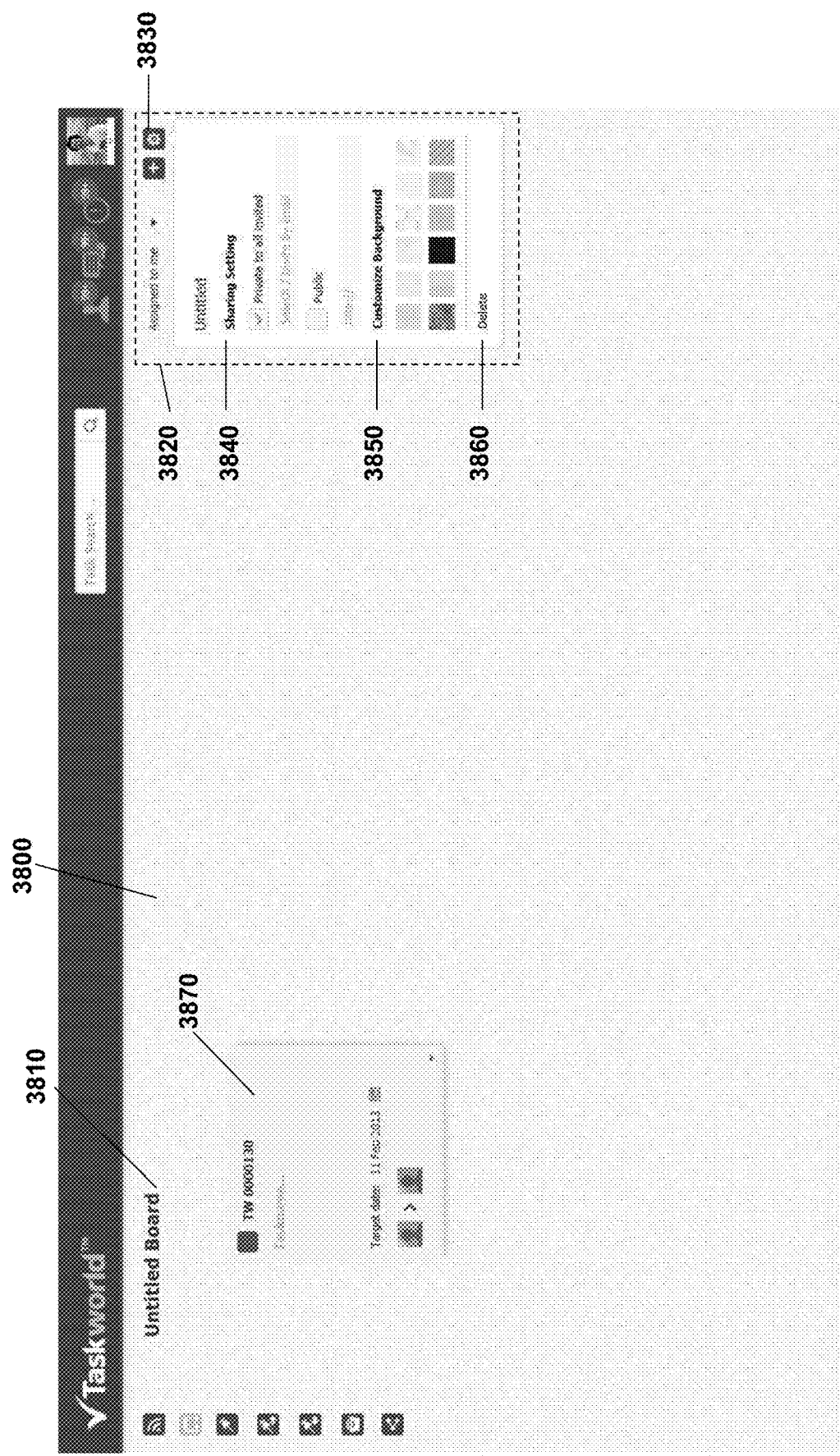
FIG. 38 provides an example of a user interface to create a new pinboard, in accordance with an embodiment of the invention.

FIG. 38 provides an example of a user interface to create a new pinboard in accordance with an embodiment of the invention. In some instances, a menu or portion of the user interface may have an option to create a new board 3800. For example, a user may click on a 'Create new board' option to start managing tasks on a pinboard.

The user may be presented with a board title region 3810 where the user can type the name of the board. The board title region may have a default title (e.g., 'Untitled Board') or may start off blank. The board title region may be fixed or may be alterable. A board title region may have an initial default location which the user may or may not be able to move.

The pinboard may have a settings menu 3820. For example, a user may be able to click on a visual marker, such as a gear icon 3830 to open the settings menu. The settings menu may include a section for sharing settings 3840. Users can share the board privately to all invited users or publicly to everyone with the link on the board. In other embodiments, other sharing level options may be presented. For example, the user may be able to share the board publicly to all, semi-privately to all within the same group or project, share the board privately with individually selected users, or keep the board private without sharing with anyone.

The settings menu may also include a section for customizing the board 3850. For example, a user may be able to choose one of the pre-set board backgrounds. The backgrounds may alter the look of the pinboard. In some instances, a user may be presented with an option to upload an image of the user's choosing as the background. The user may also be able to alter the appearance of the task notes or the font. Other visual looks or themes may be presented as options for customizing the board.

An option to delete the board 3860 may also be presented in a settings menu. Selecting a delete option may permanently close the board and all related tasks.

One or more task note 3870 may be created on the board. In some instances, when creating the board a single default task may be provided that a user may alter. Alternatively, no new tasks may be created at the default, and a user may add tasks as desired. In some instances, new tasks may be created in the task feed view as described elsewhere herein. New tasks may also be created in the pinboard view.

In one example, a new task may be created by selecting any empty area on the board to open a blank task note. For example, the area may be selected by double clicking the area. The user may provide any task information (e.g., task name, task description, target date, assignee). A task can be assigned to a colleague from a task note on the pinboard, and a target date can be set. This may carry through between different views (e.g., between pinboard and task feed list). Other techniques for creating new tasks may be employed, as described elsewhere herein.

The various boards associated with a user may be categorized. For example, a user may be presented with options to view all boards, the boards shared by the user, the boards shared with a user, and project boards. Selecting an option for all boards may cause a user to see all boards the user created and shared to the user. Selecting an option for boards shared by the user may filter all boards the user created and shared to others. Selecting an option for boards shared with the user may filter all boards shared by other users to the user. Selecting an option for project boards may filter all boards automatically created from the projects the user started. When a category of boards is selected, the appropriate boards may be displayed in a board summary list view, as described below. A menu showing the category of boards may be displayed. The appropriate boards may be displayed in a region adjacent to the menu. A visual indicator (e.g., highlighting, font color change, icon) may be provided indicating which category of boards has been selected.

Figure 39:
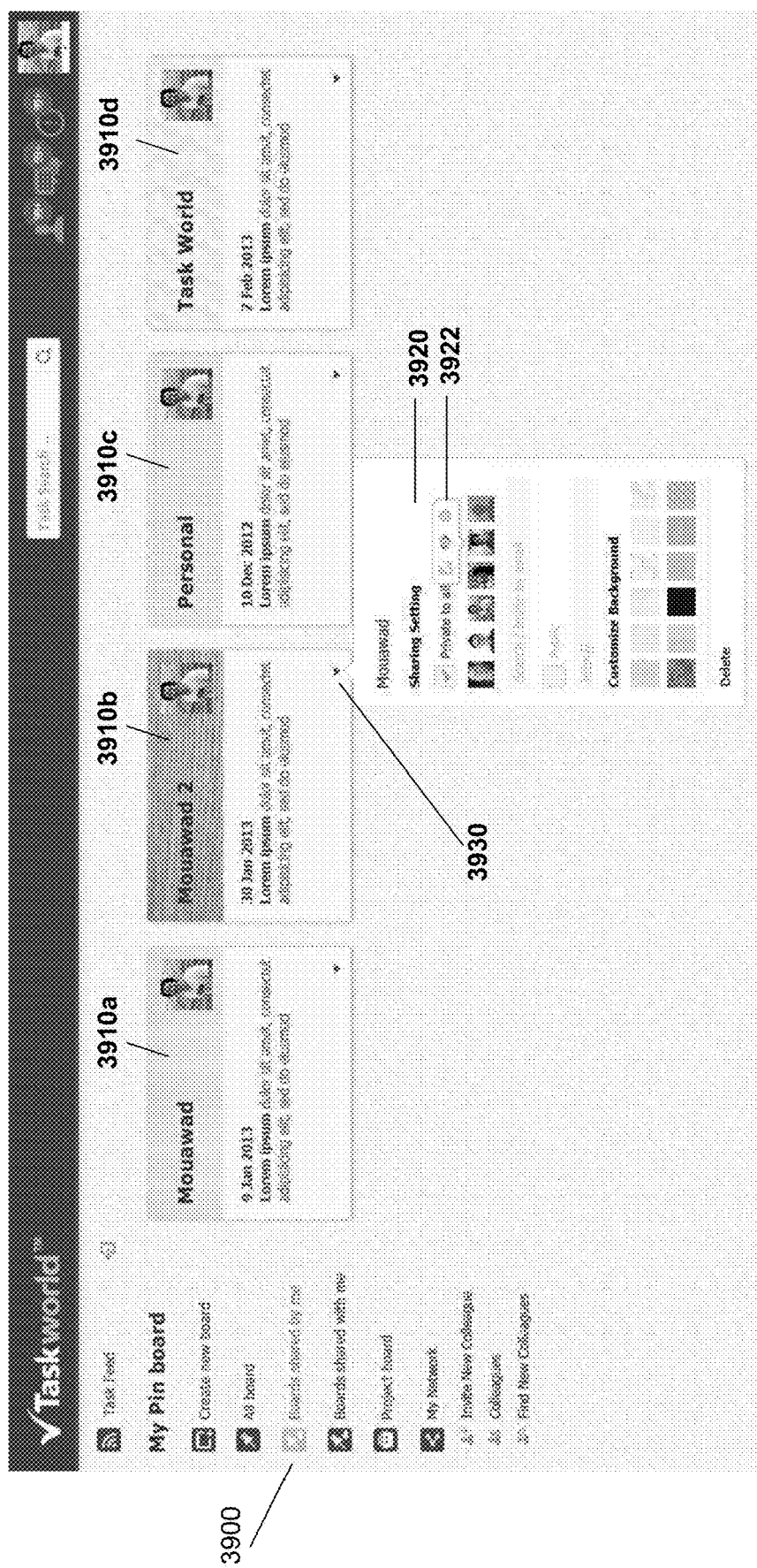
FIG. 39 shows an example of a pinboard list shared by a user, in accordance with an embodiment of the invention.

FIG. 39 shows an example of a pinboard list shared by a user in accordance with an embodiment of the invention. In some embodiments, in a menu, a user may select an option to view boards shared by the user 3900. A summary of the boards 3910a, 3910b, 3910c, 3910d shared by the user may be displayed. The board summaries may be shown in one or more row and/or columns. In some instances, the board summaries may be listed in a grid pattern. The board summaries may be listed in any order. For example, they may be listed alphabetically by board name, chronologically or reverse-chronologically by time of creation or upcoming due dates, or alphabetically by assignee. The board summaries may show relevant information and theme setting. The users may have a sneak peak at what the boards look like. The board summaries may include board title and a description. In some instances, the user's profile picture may be shown on all boards. The user's profile picture may be displayed as the creator and/or assignor of the board.

In some embodiments, a menu 3920 may be provided through which a user can customize an associated board. For example, each board summary may have a visual indicator 3930 that a user may select to access the settings menu for that board. The user may customize the board by changing the sharing settings, user permission level, privacy rights, and/or the board's background image. The user may be able to make these customizations without entering the board view. The user may be able to make these customizations from a list view of the board summaries. The users may delete any of the boards shared by the user.

For private sharing of a board, in some embodiments, the user may be the only one who can see the board by default. More users may be invited to collaborate on the board by search colleagues on the user's colleague network and/or by inviting other users via email. In some embodiments, an invitee's permission level may be set by clicking on the invitee's picture or name. For example, a invitee permission menu 3922 may be provided. The user may use the permission menu to set invitee-specific rights. For example, the invitee may have edit rights (e.g., as indicated by the pencil icon). An invitee with edit rights may have the rights to add, edit and/or arrange any task on the board. The invitee may be given viewing rights (e.g., as indicated by the eye icon). An invitee with viewing rights may only have the rights to view (but not edit) the board and tasks on it. The user may also remove any invitee, for example, by clicking on the "x" sign associated with the invitee.

For public sharing of the board, the user may select a "Public" checkbox or a similar control, copy the URL link associated with the board, and share the URL via email or social networks.

Figure 40:
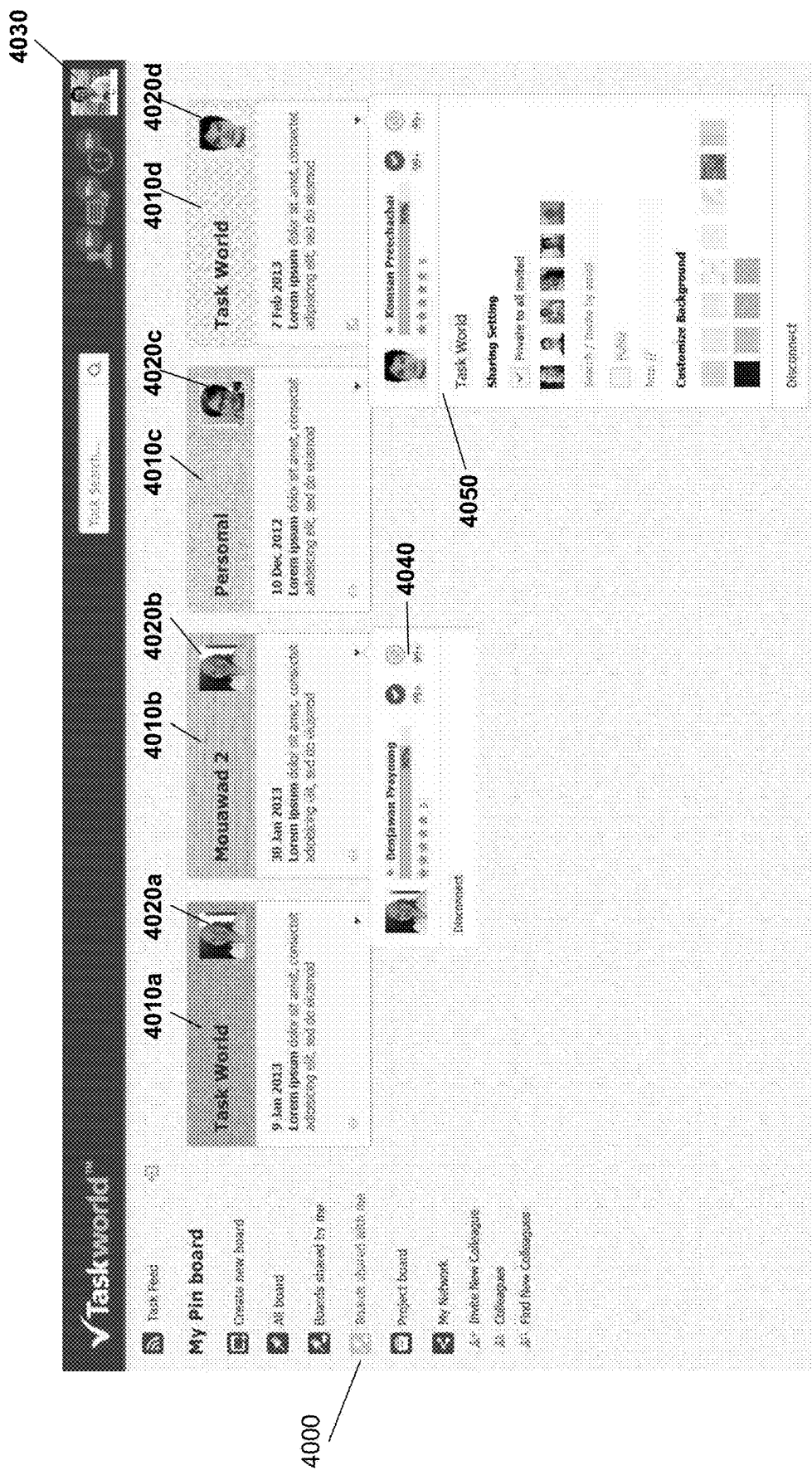
FIG. 40 shows an example of a pinboard list shared with a user, in accordance with an embodiment of the invention.

FIG. 40 shows an example of a pinboard list shared with a user in accordance with an embodiment of the invention. In some embodiments, in a menu, a user may select an option to view boards shared with the user 4000. A summary of the boards 4010a, 4010b, 4010c, 4010d shared with the user may be displayed. The board summaries may be shown in one or more row and/or columns. In some instances, the board summaries may be listed in a grid pattern. The board summaries may be listed in any order. For example, they may be listed alphabetically by board name, chronologically or reverse-chronologically by time of creation or upcoming due dates, or alphabetically by assignor. The board summaries may show relevant information and theme setting. The users may have a sneak peak at what the boards will look like. The board summaries may include board title and a description. In some instances, the profile pictures of the colleagues who created the boards may be shown 4020a, 4020b, 4020c, 4020d. The user's profile picture 4030 may be shown in the pinboard list view.

For a particular board, if a user only has view rights, the user may only view all tasks in it 4040. If the user has edit rights for a particular board, the user can add more people into the board, add or delete tasks, manage permission rights, and customize backgrounds 4050. Based on the level of rights that a user has, a user may be able to view certain information from the list view. For example, if a user selects a board summary 4010b for which a user only has view rights, the user may only view limited information, e.g., information about the assignor, such as name, image, and/or performance metrics 4040.

If the user selects a board summary 4010d for which the user has edit rights, the user may view more information (e.g., view information about the assignor plus additional information) and/or be provided with certain editing options 4050.

FIG. 41 shows an example of an interface to create a new task for a pinboard in accordance with an embodiment of the invention. As previously described a new task may be created on a pinboard. A new task note may be quickly created by double clicking on any portion of the pinboard, and entering in desired information such as task name, task description, target date, assignee, and the like. The quick task thus created may be similar to that shown in FIG. 42.

In another embodiment, a detailed task may be created by accessing a portion of the screen with a visual indicator. For example on an upper right hand part of the pinboard, a plus icon 4100 may be provided. Selecting the plus icon (e.g., clicking on or touching the icon) may cause a form 4110 to be opened up. The user may fill out detailed information about the task. The information may include task name, task description, assignee, project, start date, target date, followers, one or more tags, board, label, and/or comments.

In some embodiments, selecting an assignee 4120 may cause information about the assignee to be displayed. For example one or more performance metrics for the assignee can be viewed in the details of a note. The format for the performance metrics may be similar to the format that is provided in the task list. In one example, performance metrics of an assignee that may be displayed in a task view may include the assignee's name, image, average rating, average task completion, percentage of tasks completed on time, or any other performance metrics. The performance metrics may be displayed in a visual manner. One or more icons may be displayed, which may include one or more numerical values indicative of the user's performance metrics. The performance metrics of a particular individual, such as an assignee or assignor may be accessible in the pinboard view, via task note, when creating or modifying a task note, when viewing additional details about a task, or when adding an assignee. The performance metrics of a particular individual may also be accessible in a pinboard list view, via board summary or any other portion of the interface. Thus, performance metrics of individuals may be displayed simultaneously with project and/or task creation or organization.

Figure 42:
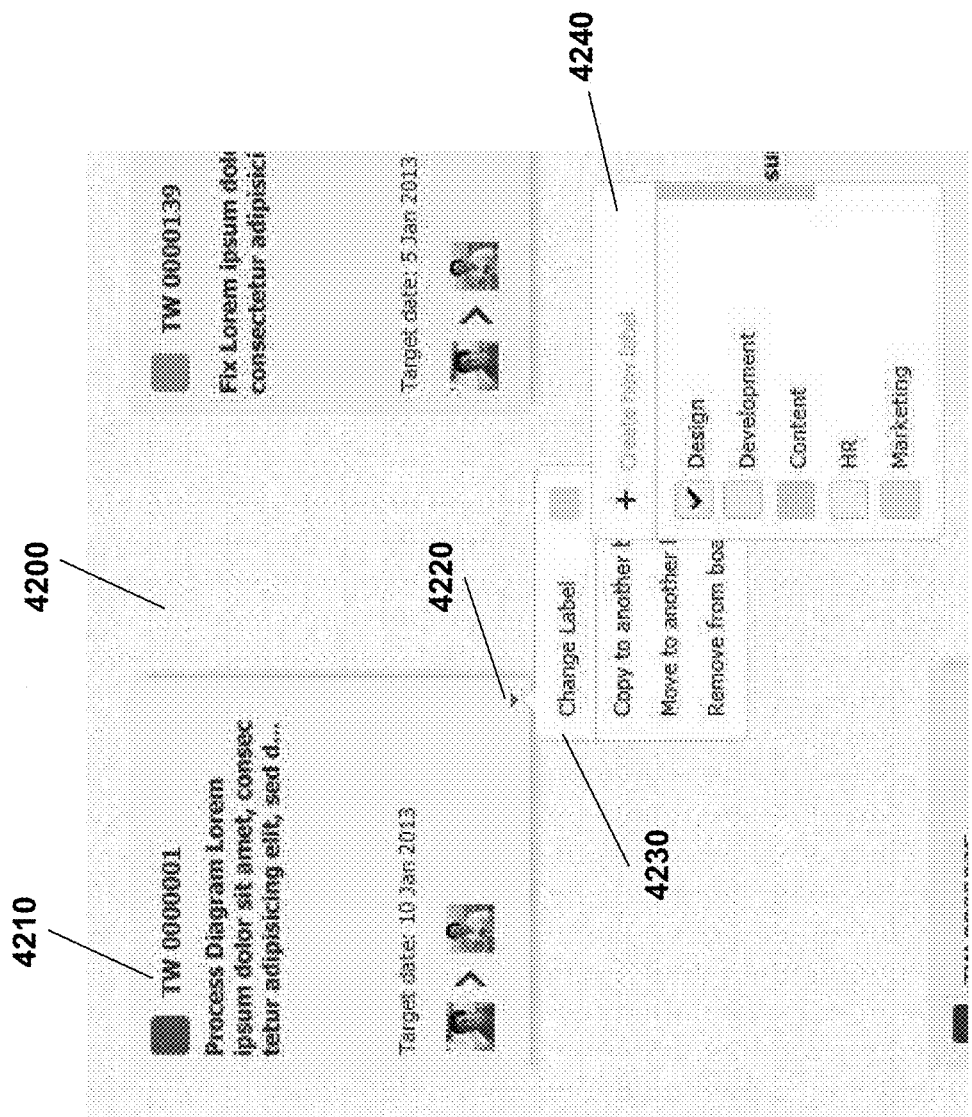
FIG. 42 shows an example of quick task settings, in accordance with an embodiment of the invention.

FIG. 42 shows an example of quick task settings in accordance with an embodiment of the invention. One or more task note 4210 may be displayed in a pinboard 4200. The task note may have information about the task, such as task name, description, target date, and assignor/assignee information. A visual indicator 4220 may be provided which a user may access to customize the task note and/or view more information about the task note. Selecting the visual indicator (e.g., clicking on or touching the visual indicator) may result in accessing quick task settings 4230. A popup menu may be provided showing one or more options. A user may be presented with an option to change the label. A user can assign a colored label to a particular task note. The user may be presented with options to visually alter the task note in any other manner (e.g., borders, font, shape, size, etc.). Selecting the change label option may cause a second pane or popup 4240 which may provide options for changing the label. For example, an option may be presented to create a new label, or select a color/label/category for the note. In some instances, the colors may correspond to categories of tasks. Thus, the user may have the ability to change the color of each task note and create a category label.

A user may also be presented with an option to copy to another board. Selecting this option may result in creating a duplicate copy of a task note from a current board to another board. A task setting menu may also include an option to move a task to another board. Selecting this option may result in moving a task note from a current board to another board. The user may specify the other board. A user may also be shown an option to remove a task from the board. The user may remove the task from the existing board. This may or may not result in the task being permanently deleted.

Figure 43:
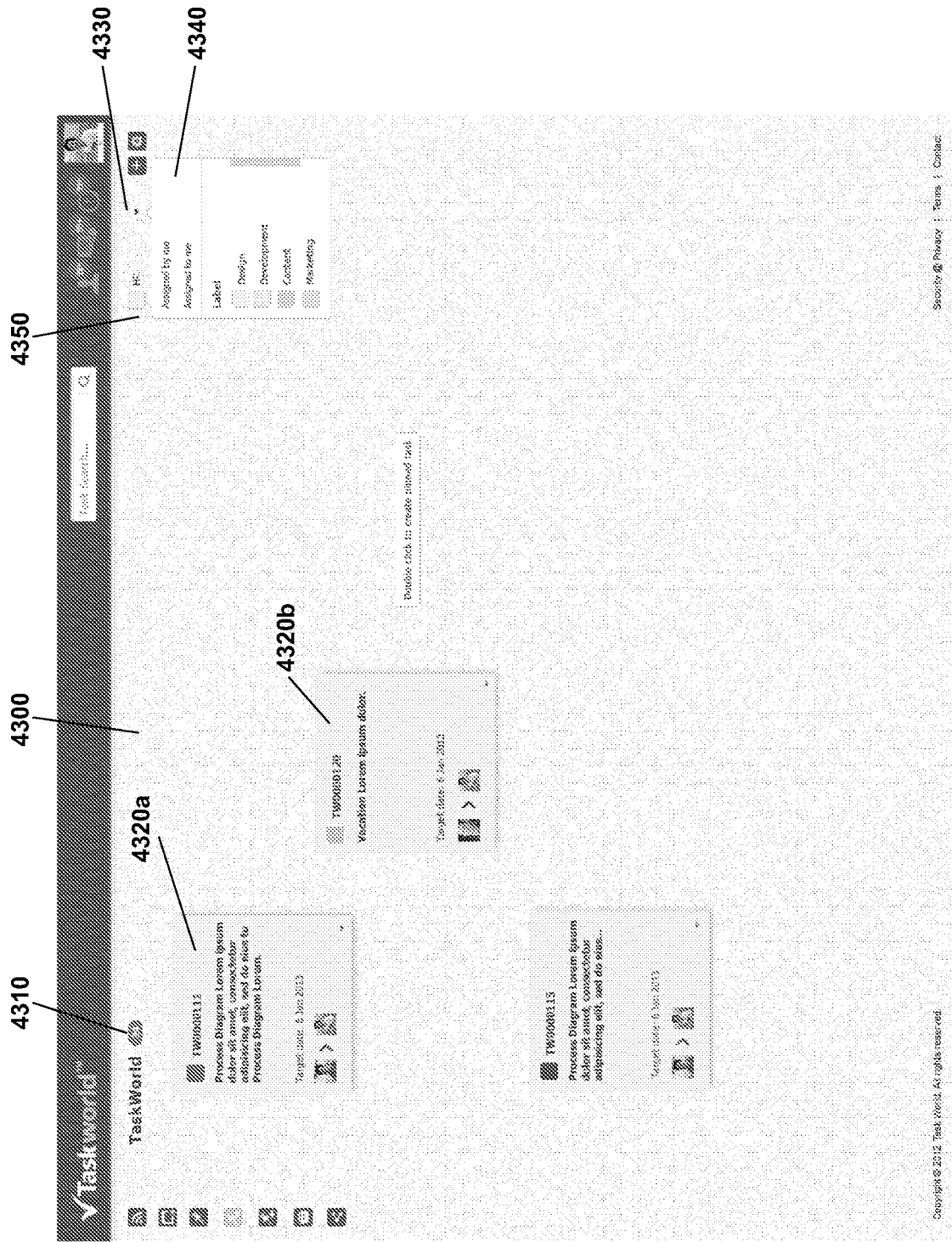
FIG. 43 shows an example of a pinboard with filtered tasks, in accordance with an embodiment of the invention.

FIG. 43 shows an example of a pinboard 4300 with filtered tasks in accordance with an embodiment of the invention. The pinboard may show the number of active tasks 4310. One or more task notes 4320a, 4320b may be shown on the pinboard. In some embodiments, all tasks for the project may be displayed on the board. Alternatively, the tasks may be filtered, and only the tasks passing the filter may be displayed on the board. For example, a visual indicator 4330 may be provided, that may be selectable by the user. The user may click on the visual indicator to show a drop down menu 4340. The drop down menu may provide options for filters. For example, the user can sort and/or filter tasks according to assignors, assignees, or color, label, and the like. For example, selecting an 'FIR' category (blue label) may filter all tasks not associated with HR so that all the blue tasks, and only the blue tasks will appear. A user may be able to select one filter at a time. Alternatively, a user may select multiple filters, so that any of the tasks meeting any of the filters may be displayed on the board. The selected filters 4350 may be shown at the top or outside of the drop down menu.

Figure 44:
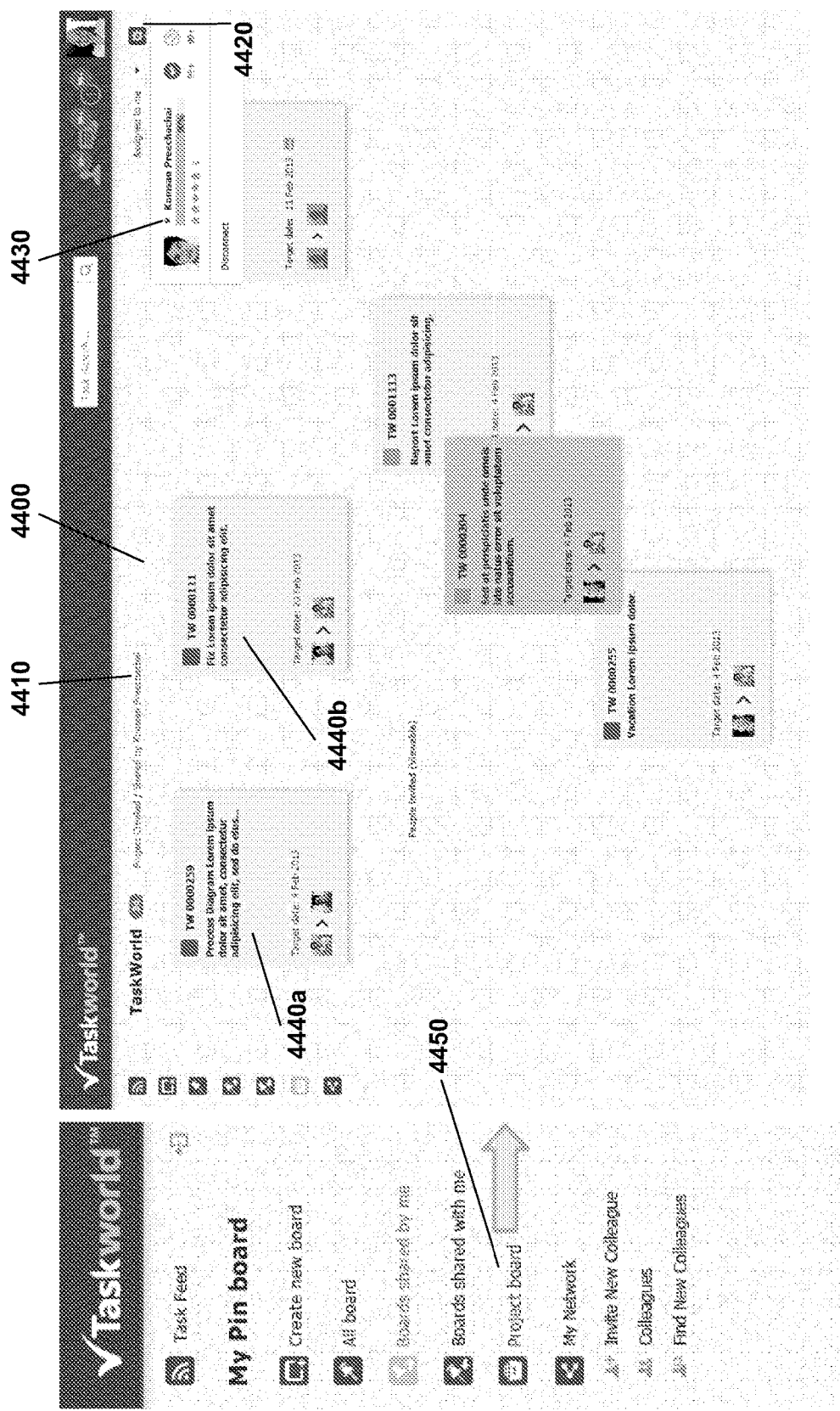
FIG. 44 shows an example of a project board, in accordance with an embodiment of the invention.

FIG. 44 shows an example of a project board in accordance with an embodiment of the invention. A pinboard may be organized under a project. A project owner or leader can set up a project board, wherein all tasks from a certain project are automatically added to a project pin board. In one example, when creating a project, an option may be available to pin all tasks to board. Selecting the option to pin all the tasks to the project board may permit tasks in a project board to be transferred to a custom board, but the user may not pin these tasks to another project board.

A project board 4400 may include information about the project creator 4410. For example, the project creator name may be displayed. In some instances, selecting a visual indicator, such as a gear icon 4420 may show information about the project creator 4430, including the project creator's performance metrics. One or more task notes 4440a, 4440b may be shown. The tasks notes may be arranged anywhere on the board. The task notes may relate to tasks for the project.

In some embodiments, a user may click on a portion of a menu indicative of a project board 4450. Selecting the project board option may permit a user to view the project's pinboard with the project's pinned tasks.

Figure 45:
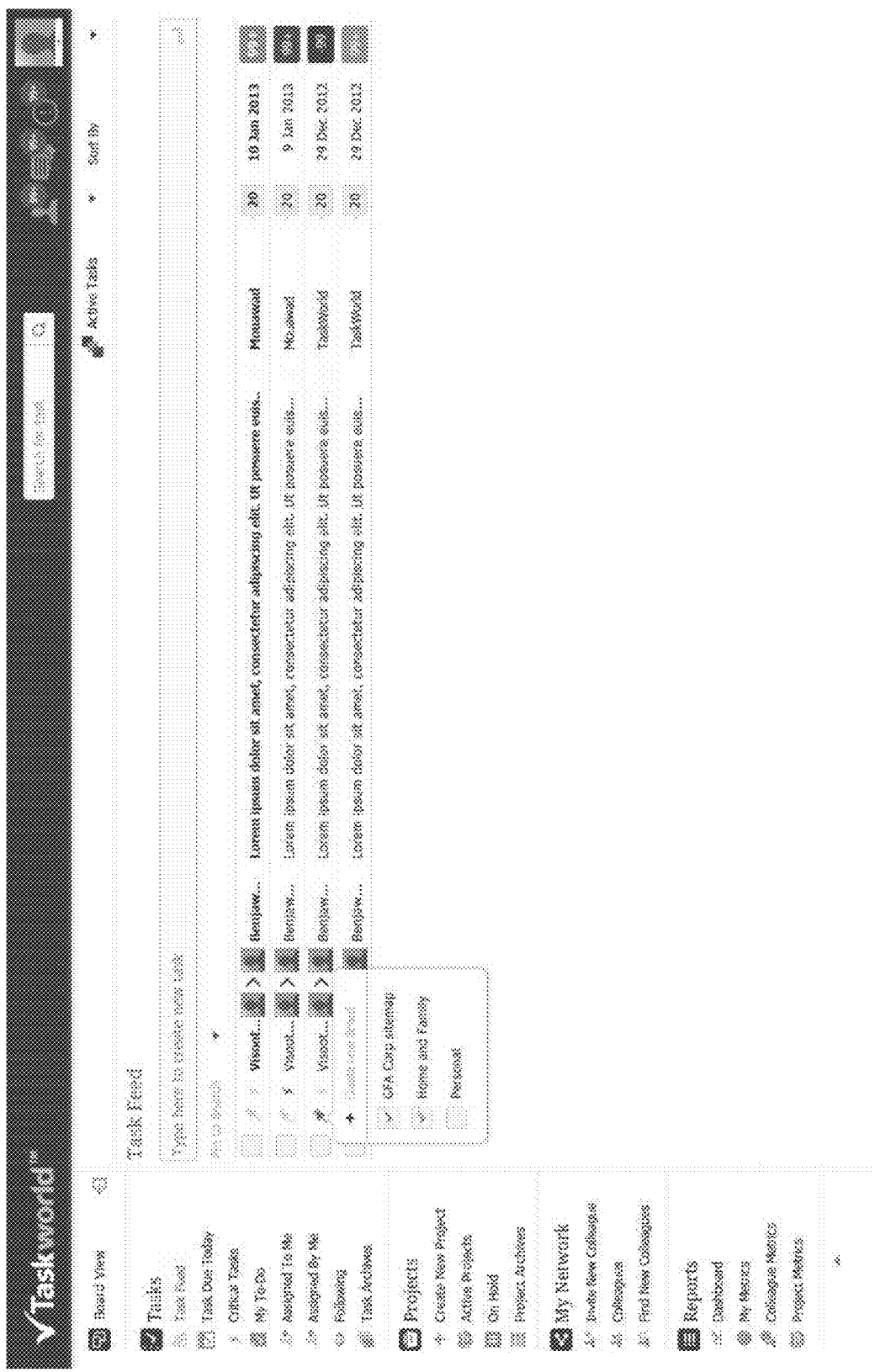
FIG. 45 shows an example user interface for pinning tasks to a pinboard, in accordance with an embodiment of the invention.

FIG. 45 shows an example user interface for pinning tasks to a pinboard, in accordance with an embodiment of the invention. In some instances, new tasks can also be added to a board via a task feed view. A user may select the task from a list of existing tasks that they would like to pin to a board. The user can easily pin a task into a pinboard by clicking on a pin icon to open a slide down menu with a list of existing boards. The user can also create custom boards to which to add the task on the fly. In some instances, multiple tasks may be added to a pinboard. For instance, from a task feed view listing tasks, a user may select all the tasks the user wishes to pin to a board. The user may then select an option to pin the selected tasks to a board (e.g., clicking on a pin to board button), and select one or more existing boards or create a new board.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A digital pinboard system for managing a project, comprising:
   a network of node devices each associated with a pinboard for a given user constituting a plurality of distinct users' pinboards, wherein the node devices each provide two or more switchable user interfaces for displaying a plurality of graphical note representations in a digital pinboard environment,
   wherein a plurality of tasks are organized in the digital pinboard environment and wherein each of the plurality of graphical note representations is configured to dynamically display one or more performance indicators associated with an assignee of a task of the plurality of tasks associated with the project corresponding to the graphical note representations, and wherein the assignee is one of a plurality of users; and
   a digital pinboard server configured to:
      create a first pin on a first pinboard note region on a first digital pinboard associated with the assignee, the pin being a graphical element on a first graphical note representation, wherein the pin is configured with a given task, and wherein responsive to the creating the pin, a processor of the digital pinboard server generates a plurality of mirrored pins on the plurality of graphical note representations on the plurality of different users' pinboards, which are logically linked to the first pin, and wherein the plurality of mirrored pins are dynamically configured with the given task;

receive, via the graphical element, a selection by the assignee indicating completion of the given task corresponding to the first pin, and wherein the first digital pinboard is viewable by the assignee via a first node device of the network of node devices;

in response to the selection by the assignee received within the first graphical note representation, automatically update, by the processor of the digital pinboard server, a status of the given task in a task log stored in a data store operatively coupled to the digital pinboard server by aggregating status information from each of the network of node devices in real time;

dynamically display an updated status indicator, based on real time updates from the digital pinboard server, within a second graphical note representation of the plurality of mirrored pins corresponding to the given task, wherein the second graphical note representation is displayed within a second pinboard note region on a second digital pinboard associated with an assignor of the task, and wherein the second digital pinboard is viewable by the assignor via a second node device of the network of node devices;

simultaneously update and display, in real time, both of the first and the second graphical note representations on the first node device and the second node device, respectively, among the plurality of other graphical note representations for uncompleted tasks associated with the project within the first and the second pinboard note regions of the first and second pinboards respectively, according to a pre-selected status category or visual arrangement independently selected by the assignee and the assignor, wherein both the first node device and the second node device receive real-time updates from the digital pinboard server, based on the task log stored in the data store; and in response to a selection by the assignor within the second graphical note representation indicating a performance rating for the given task:

update a value for one or more of the performance indicators associated with the assignee based at least in part on the status of the task and the performance rating, wherein at least one performance indicator is updated by aggregating the performance rating with at least one other performance rating associated with at least one other assignor of the plurality of users; and automatically update the one or more performance indicators for the given task for display on the first digital pinboard associated with the assignee.

2. The digital pinboard system of claim 1, wherein each of the plurality of node devices is associated with a user-configurable permission level.

3. The digital pinboard system of claim 1, wherein managing the plurality of tasks associated with the project includes adding, removing or editing at least one of the plurality of graphical note representations associated with the tasks.

4. The digital pinboard system of claim 1, wherein the status of the given task is updated in response to the user manipulating the plurality of graphical note representations in the digital pinboard environment.

5. The digital pinboard system of claim 1, wherein the performance indicators are generated based on historical data and real-time user input in the digital pinboard environment.

6. The digital pinboard system of claim 1, wherein the user is uniquely identified by a user identifier.

7. The digital pinboard system of claim 6, wherein the status of the given task or the value for one or more of the performance indicators associated with the user is updated in a database and mapped to the identifier of the user.

8. The digital pinboard system of claim 6, wherein the digital pinboard server is configured to provide a plurality of digital pinboard environments each is uniquely associated with the user identifier.

9. The digital pinboard system of claim 1, wherein the plurality of users includes at least one team or at least one department.

10. The digital pinboard system of claim 9, wherein an assignment of the task is indirect.

11. The digital pinboard system of claim 1 wherein the performance rating includes at least one of an achievement rating and a satisfaction score collected from the plurality of users on the network of node devices within a timeframe window, and wherein the aggregation of the performance rating with the at least one other performance rating is based upon time of task completion, competency in a given task, and training potential, thereby generating a performance trajectory for the assignee over time.

12. A method for a digital pinboard system including a digital pinboard server networked to a plurality of node devices each associated with a pinboard for a given user constituting a plurality of distinct users' pinboards, wherein the node devices each provide two or more switchable user interfaces for a plurality of users associated with a project, the method comprising:

displaying a plurality of graphical note representations in a digital pinboard environment, wherein a plurality of tasks is organized in the digital pinboard environment and wherein each of the plurality of graphical note representations is configured to dynamically display one or more performance indicators associated with an assignee of a task of the plurality of tasks associated with the project corresponding to the graphical note representations, and wherein the assignee is one of the plurality of users;

creating a first pin on a first pinboard note region on a first digital pinboard associated with the assignee, the pin being a graphical element on a first graphical note representation, wherein the pin is configured with a given task, and wherein responsive to the creating the pin, a processor of the digital pinboard server generates a plurality of mirrored pins on the plurality of graphical note representations on the plurality of different users' pinboards, which are logically linked to the first pin, and wherein the plurality of mirrored pins are dynamically configured with the given task;

receiving, via the graphical element, a selection by the assignee indicating completion of the given task corresponding to the first pin, and wherein the first digital pinboard is viewable by the assignee via a first node device of the network of node devices;

in response to the selection by the assignee received within the first graphical note representation, automatically update, by the processor of the digital pinboard server, a status of the given task in a task log stored in a data store operatively coupled to the digital pinboard server by aggregating status information from each of the network of node devices in real time;

dynamically displaying an updated status indicator, based on real time updates from the digital pinboard server, within a second graphical note representation of the plurality of pins corresponding to the given task, wherein the second graphical note representation is displayed within a second pinboard note region on a second digital pinboard associated with an assignor of the task, and wherein the second digital pinboard is viewable by the assignor via a second node device of the network of node devices;

simultaneously updating and displaying, in real time, both of the first and the second graphical note representations on the first node device and the second node device, respectively, among the plurality of other graphical note representations for uncompleted tasks associated with the project within the first and the second pinboard note regions of the first and second pinboards respectively, according to a pre-selected status category or visual arrangement independently selected by the assignee and the assignor, wherein both the first node device and the second node device receive real-time updates from the digital pinboard server, based on the task log stored in the data store; and in response to a selection by the assignor within the second graphical note representation, indicating a performance rating for the given task;

updating a value for one or more of the performance indicators associated with the assignee based at least in part on the status of the task and the performance rating, wherein at least one performance indicator is updated by aggregating the performance rating with at least one other performance rating associated with at least one other assignor of the plurality of users; and automatically updating the one or more performance indicators for the given task for display on the first digital Onboard associated with the assignee.

\* \* \* \* \*